United States Patent

Nakagaki et al.

[11] Patent Number: 5,857,077
[45] Date of Patent: Jan. 5, 1999

[54] TRACING SYSTEM HAVING FOLLOW-UP DISTRIBUTION SECTION FOR DISTRIBUTING INFORMATION BASED ON A DISTRIBUTION HISTORY OF PRIOR DISTRIBUTED INFORMATION STORED IN DISTRIBUTION HISTORY STORING SECTION

[75] Inventors: Juhei Nakagaki; Kazuo Saito, both of Ashigarakami-gun; Yasuko Toju, Minato-ku; Noriyuki Kamibayashi, Ashigarakami-gun, all of Japan

[73] Assignee: Fuji Xerox Co., Ltd., Tokyo, Japan

[21] Appl. No.: 824,540

[22] Filed: Mar. 26, 1997

Related U.S. Application Data

[63] Continuation-in-part of Ser. No. 654,668, May 29, 1996.

[30] Foreign Application Priority Data

Jun. 1, 1995 [JP] Japan .................................... 7-134894
May 14, 1996 [JP] Japan .................................... 8-119060

[51] Int. Cl.[6] .................................................... G06F 13/00
[52] U.S. Cl. ................................ 395/200.68; 395/200.36
[58] Field of Search ........................ 395/200.37, 200.36, 395/200.7, 200.33, 200.68; 380/23; 364/400

[56] References Cited

U.S. PATENT DOCUMENTS 5,040,141 8/1991 Yazima et al. .................... 395/200.36
5,261,052 11/1993 Shimamoto et al. .............. 395/200.36
5,339,361 8/1994 Schwalm et al. .......................... 380/23
5,483,466 1/1996 Kawahara et al. ................. 395/200.33
5,594,872 1/1997 Kawano et al. ..................... 395/200.7
5,627,764 5/1997 Schutzman et al. ............... 395/200.37
5,642,478 6/1997 Chen et al. ......................... 395/183.21

FOREIGN PATENT DOCUMENTS

A-2-236629 9/1990 Japan .
A-2-297288 12/1990 Japan .
A-4-268849 9/1992 Japan .
A-5-63728 3/1993 Japan .

*Primary Examiner*—Le Hien Luu
*Attorney, Agent, or Firm*—Oliff & Berridge, PLC

[57] ABSTRACT

When information held in an information holding section is distributed from an information distribution section to another information intervention system, a distribution sensing section senses the information distribution and records a distribution history thereof in a distribution history holding section. When an instruction for tracing information is given, a history collection section reads out the distribution history related to the information to be traced from the distribution history holding section, detects the distribution destination of the information, and instructs the information intervention system of the distribution destination to trace the information. History information is collected from the instructed information intervention system and is stored in a collected history holding section. The collected history information is analyzed by a tracing analysis section. For example, distribution routes, etc., are displayed on a tracing result display section.

5 Claims, 52 Drawing Sheets

FIG. 8

| TARGET INFORMATION IDENTIFIER (12 BYTES) | DESTINATION SYSTEM IDENTIFIER (8 BYTES) | DISTRIBUTION TIME (7 BYTES) |
|---|---|---|
| 679840-176 | 800287 | 1995031012090441 |
| - | - | - |
| - | - | - |

| SOURCE SYSTEM IDENTIFIER (8 BYTES) | TARGET INFORMATION IDENTIFIER (12 BYTES) | DESTINATION SYSTEM IDENTIFIER (8 BYTES) | DISTRIBUTION TIME (7 BYTES) |
|---|---|---|---|
| 679840 | 679840-176 | 800287 | 1995031012090441 |
| 800287 | 679840-176 | 028765 | 1995031322233489 |
| 800287 | 679840-176 | 380987 | 1995031417455534 |
| 028765 | ... | ... | ... |
| 380987 | ... | ... | ... |

FIG. 26

| COLLECTION SOURCE SYSTEM IDENTIFIER (8 BYTES) | OPERATION TYPE (6 BYTES) | TARGET INFORMATION IDENTIFIER (12 BYTES) | ORIGINAL INFORMATION IDENTIFIER (12 BYTES) | DESTINATION SYSTEM IDENTIFIER (8 BYTES) | TIME (7 BYTES) |
|---|---|---|---|---|---|
| 679840 | CREATE | 679840-176 | NULL | - | 1995031012090441 |
| 679840 | SEND | 679840-176 | - | 800287 | 1995031322233489 |
| 800287 | SEND | 679840-176 | - | 028765 | 1995031417455534 |
| 800287 | SEND | 679840-176 | - | 380987 | 1995031513282543 |
| 800287 | CREATE | 800287-123 | 380987-015 | - | 1995032015232111 |
| 800287 | SEND | 800287-123 | - | 028765 | 1995032018214533 |
| 028765 | - | - | - | - | - |
| 380987 | CREATE | 380987-015 | 679840-176 | - | 1995031709354213 |
| 380987 | SEND | 380987-015 | - | 800287 | 1995031710283456 |

FIG. 45

| TRANSMISSION/ RECEPTION FLAG (1 BIT) | TARGET INFORMATION IDENTIFIER (12 BYTES) | DISTRIBUTION DESTINATION/ SOURCE SYSTEM IDENTIFIER (8 BYTES) | DISTRIBUTION TIME (7 BYTES) |
|---|---|---|---|
| 1 | 679840-176 | 800287 | 1995031012090441 |
| - | - | - | - |
| - | - | - | - |

TRACING SYSTEM HAVING FOLLOW-UP DISTRIBUTION SECTION FOR DISTRIBUTING INFORMATION BASED ON A DISTRIBUTION HISTORY OF PRIOR DISTRIBUTED INFORMATION STORED IN DISTRIBUTION HISTORY STORING SECTION

This application is a continuation-in-part application of patent application Ser. No. 08/654,668 filed on May 29, 1996; now pending.

BACKGROUND OF THE INVENTION

1. Field of the Invention

This invention relates to an information processing method and an information processing system capable of tracing distribution information of an information distribution route, distribution range, distribution amount, etc.

2. Description of the Related Art

We are about to open an age of digitalizing all information and distributing it through networks with the recent digital information technology development, information highway initiative, etc. Distribution of various pieces of information such as images, moving pictures, voice, and programs as well as text information has already begun through network media such as internets and personal computer communication. As such an age comes, all users will be both information originators (issuers) and receivers although information originators or issuers and receivers are distinguished clearly from each other with information media like conventional broadcasting. Therefore, it becomes possible for everybody to readily distribute various pieces of information in various forms. Since digitalized information has a feature of easy copying, it is distributed through a number of users who copy and redistribute the information, whereby the information distribution range and speed will be accelerated.

In such a situation, once information is passed from one person to the hands of another person, who will get the information and how the information will be used are unknown. Demands are made for knowing whether or not the once distributed information has been passed to the person as intended by the information distributor, what point on the distribution route the information has been distributed to, what route the information has been distributed via, etc. Further, in recent years, programs into which computer viruses are mixed, information containing a violation of privacy is received, and the like have often been illegally distributed unconsciously. A demand is also made for determining the originator (issuer) of the information and locating the distribution route of the information when such illegal information is distributed. However, such demands are not fully satisfied and only some demands are met.

For example, in an electronic mail communication network described in Japanese Patent Unexamined Publication No. Hei 4-268849, at the node which receives electronic mail, information concerning the sender name and passed-through nodes added to the received electronic mail can be compared with information concerning the network configuration held in the node to see if the electronic mail sender name is false. In transfer of electronic mail, the sender prepares transmission and reception logs together with information to be sent to the receiver and transfers both as a unit to the receiver.

However, in the electronic mail communication network, the route of the passed-through nodes when information is transmitted from user A to user B is only recorded. When the information is transmitted from user B to user C, information on user A is not left and cannot be used for tracing across users. The electronic mail communication network depends on a specific mechanism of electronic mail. Thus, for example, if information is simply copied from a storage of one person to a storage of another person, the route of distribution (in this case, copy) of the information is not recorded and the distribution route of the information cannot be known later. Further, the sender cannot trace the information route to know what point his or her transmitted information arrives at now.

In an office information processing system described in Japanese Patent Unexamined Publication No. Hei 5-63728, control information indicating what processing can be performed after reception is added to electronic mail and history information on operation performed on received mail is stored. By referencing the history information, the sender can know whether or not transmitted electronic mail has been processed, for example. However, in the system, what route the information has been distributed through cannot be known from received electronic mail although the original sender of the received electronic mail can be known. The electronic mail sender knows the distribution route of electronic mail distributed over his or her preset distribution route, but cannot grasp any other route. For example, if a person receiving electronic mail distributes the electronic mail to somebody, who in turn distributes it to somebody, and so forth, the electronic mail sender cannot grasp the whole image of the information distribution destinations. Further, like the above-mentioned electronic mail system, the office information processing system does not consider any distribution route other than the electronic mail system. Thus, in the office information processing system, the distribution route of received information cannot be known.

Further, in an electronic document preparation/approval system with an electronic authorization function described in Japanese Patent Unexamined Publication No. Hei 2-297288, authorization data created by a authorization process at approval is registered in a authorization logging file, thereby enabling tracing a document approval state. Since the electronic document preparation/approval system is a system which enables the approval requester to know the current approval state, even if a document is distributed to a person who is not involved in an approval process, the fact cannot be known. As with the electronic mail communication network, if information not related to approval is simply copied from a storage of one person to a storage of another person, the route of distribution (in this case, copy) of the information is not recorded and the distribution route of the information cannot be known later.

As we have discussed, when various types of information are distributed by various methods through the hands of various persons without using a special system such as the electronic mail or approval system, the distribution routes of once distributed information cannot be traced. When illegal information is distributed, the originator (issuer) and distribution route of the information cannot be located either.

In the situation in which once information is passed from one person to the hands of another person, who will get the information and how the information will be used are unknown, if the person who distributes information wants to come in contact with persons getting the information, he or she cannot make contact with them. For example, if a person finds bugs in his or her created and distributed freeware product, he or she cannot make contact because there is a high possibility that the once distributed product may be furthermore distributed secondarily and tertiarily and it is impossible to find out who own the product. If a patch for correcting the bugs is created, it cannot be distributed all persons involved.

As another example, if a person wants to know comments, thoughts, etc., from persons reading one distributed document, he or she cannot well make contact with the document readers. Further, when a person finds a software product containing computer viruses, if he or she wants to make contact with persons who use or have the software product at present, he or she cannot make contact because he or she does not know who owns the software product.

To overcome such problems, in a conventional method, when a created software product or document is distributed, distribution destinations are previously limited and are managed by manual work. Then, when software bugs or document errors are found, the original distributor may make contact with the limited range of the destinations. In this method, however, if one person receiving the software product or document distributes it to another person, the original distributor cannot grasp the distribution and cannot make contact with all persons involved. Such a tendency is pronounced in freeware software often unlimited in distribution destinations and it is becoming extremely difficult for the original distributor to manage the distribution destinations.

As another method, in commercial software, etc., after a software product is sold, the purchasers of the software product are requested to enter user registration and the software house makes later contact with the users entering user registration. However, this method is not compulsory for the purchasers; not all the purchasers enter user registration and the software house cannot grasp-all the purchasers.

As another method, public relations means may also be taken for persons in a far wider possible range containing the information distribution range. For example, media such as radio and TV broadcasts and newspaper advertisements are used for the purpose; they are at very high costs and the persons involved do not necessarily get the information. Further, the information is only garbage for a large number of persons not related to the information. However, such a method is only a method available for informing computer viruses, etc., and it is also difficult to suppress the widening range of damage.

Thus, when various types of information are distributed by various methods through the hands of various persons, it is not possible to make contact with the persons getting once distributed information or distribute another piece of information to the persons.

SUMMARY OF THE INVENTION

It is an object of the invention to provide an information processing method and an information processing system for recording information concerning distribution when information is distributed, thereby enabling a route of the information to be traced later and different information to be sent later to persons getting that information.

In an information processing system according to the present invention, a distribution sensing section senses information distribution from a first information processing system as an information distribution source to a second information processing system as an information distribution destination; a plurality of distribution history storing sections stores histories related to information distribution sensed by the distribution sensing section; a history acquiring section acquires the histories stored in other distribution history storing section in response to the history stored in one of the distribution history storing section; and an analyzing section analyzes an information distribution route in response to the histories acquired by the history acquiring section.

An information processing method according to the present invention comprises the steps of: sensing information distribution from a first information processing system as an information distribution source to a second information processing system as an information distribution destination; storing a history related to the sensed information distribution in a storage of the second information processing system; in response to the history stored on the storage in the second information processing system, acquiring the histories stored on storage in other information processing systems; and analyzing an information distribution route in response to the acquired histories.

According to the system and the method according to the present invention as described above, distribution of information from a distribution source to a distribution destination is sensed and information concerning the sensed information distribution is stored. Based on the stored information concerning distribution, information concerning different distribution related to that distribution is gotten, and a distribution route is analyzed based on the gotten information concerning the different distribution. The distribution route is a concept containing the information source, transfer route, distribution range, distributed information amount, etc. Thus, for example, distribution information of information distribution, the distribution route, distribution range, distribution amount, etc., can be traced later. At this time, the information transfer route can be traced in the information transmission direction from the information source or in the reverse direction to how the information was transmitted from the information reception party to the information source. It can also be traced in the information transmission direction from a midpoint on the transfer route or in the reverse direction to how the information was transmitted from the midpoint to the information source. Further, all distribution routes of information can also be traced from a midpoint on the transfer route.

In another information processing system according to the present invention, a distribution sensing section senses information distribution from a first information processing system as an information distribution source to a second information processing system as an information distribution destination; a plurality of distribution history storing section stores histories related to information distribution sensed by the distribution sensing section; and a follow-up distribution section distributes second information following first information based on a distribution history of the first information stored in the distribution sensing section.

Another information processing method according to the present invention comprises the steps of: sensing distribution of information from a first information processing system as a distribution source to a second information processing system as a distribution destination; storing information concerning the distribution; and distributing information different from the information following the information based on the stored information concerning the distribution.

According to the another system and method according to the present invention, distribution of information from a distribution source to a distribution destination is sensed and information concerning the distribution of the information sensed is stored. Different information is distributed following the information based on stored information concerning distribution. The stored information concerning distribution contains information concerning the information distribution destination or source and using the information, the different information is distributed as follow-up information. The information processing systems repeat the process one after another, whereby to all persons receiving distribution of one information item, any other information item can be distributed following that information item.

BRIEF DESCRIPTION OF THE DRAWING

In the accompanying drawings:

FIG. 8 is an illustration of an example of a distribution history held in the distribution history holding section in the first embodiment of the information processing system of the invention;

FIG. 26 is an illustration of an example of the contents of a collected history holding section in the fourth embodiment of the information processing system of the invention;

FIG. 45 is an illustration of an example of the distribution history held in a distribution history holding section in the ninth embodiment of the information processing system of the invention;

PREFERRED EMBODIMENTS OF THE INVENTION

Figure 1:
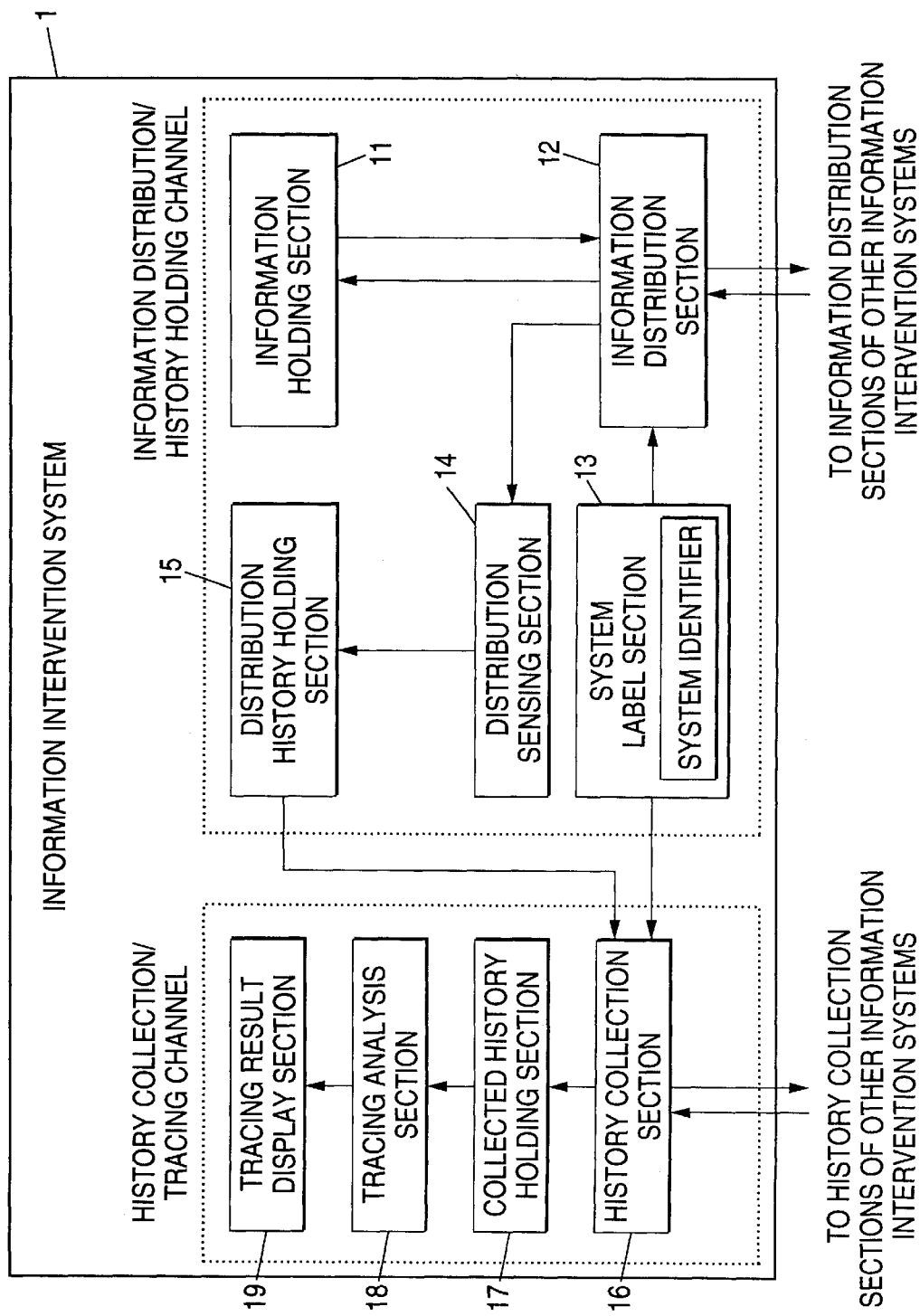
FIG. 1 is a block diagram to show a first embodiment of an information processing system of the invention.

Referring now to the accompanying drawings, preferred embodiments of the present invention will be described.
First embodiment:

FIG. 1 is block diagrams to show a first embodiment of an information processing system capable of tracing distribution information of an information distribution route, distribution range, distribution amount, etc. of the invention. In the figure, numeral 1 designates an information intervention system; 11, an information holding section; 12, an information distribution section; 13, a system label section; 14, a distribution sensing section; 15, a distribution history holding section; 16, a history collection section; 17, a collected history holding section; 18, a tracing analysis section; and 19, a tracing result display section.

The information intervention system 1, which intervenes in information transfer and distribution, has the information holding section 11, the information distribution section 12, the system label section 13, the distribution sensing section 14, the distribution history holding section 15, the history collection section 16, the collected history holding section 17, the tracing analysis section 18, and the tracing result display section 19.

The information intervention system 1 mentioned in the invention refers to a system for intervening in information transfer in a broad sense; specifically, it contains not only a system dedicated to information transfer, such as a gateway in a network or an exchange in a telephone network, but also a system resultantly distributing information, such as an information processing system like a workstation or personal computer connected to a network. It also contains a mail server, etc., for distributing electronic mail on a network. Further, it contains an electronic information machine such as a disk drive for reading and writing information storage media such as hard disk or floppy disk; information copying, etc., between information storage media or within a single information storage medium corresponds to information distribution.

The information holding section 11 stores information processed by the information intervention system 1, for example, information to be distributed or distributed. In fact, it is made of a memory or a magnetic disk unit.

The information distribution section 12 exchanges information with other information intervention systems, whereby information can be distributed. For example, it is made up of a network interface, a modem, etc., for transmitting and receiving information to and from other information intervention systems via a network.

The system label section 13 holds a system identifier for uniquely identifying the information intervention system 1. The system identifier is given when the information intervention system is manufactured; it may be inhibited from being changed later, or when the system is constructed, a unique identifier may be given.

The distribution sensing section 14 always monitors to sense whether or not the information distribution section 12 exchanges information with another information intervention system. When the information distribution section 12 exchanges information, the distribution sensing section 14 senses information on the exchange and records it in the distribution history holding section 15 as a distribution history related to information distribution. For example, if the information distribution section 12 is made of a network interface, the information exchange can be sensed if the network interface is monitored. The information to be sensed includes the information identifier of transferred information, the associated transfer system identifier, the distribution time of day, and the like are to be sensed. In addition, the source/destination user identifier, the information type, etc., may be sensed and recorded. The distribution time of day may be specified with a timer or clock contained in each information intervention system 1.

The distribution history holding section 15 records distribution histories related to information distribution sensed by the distribution sensing section 14. For example, it is made of an external storage such as a magnetic disk unit or a memory. The held contents will be discussed later.

When a tracing instruction for one information is issued, the history collection section 16 reads the distribution histories related to the specified information from the distribution history holding section 15, and sends an information tracing instruction to other information intervention systems based on the distribution histories. Further, it receives reports from the information intervention systems to which the instruction was sent, and stores the reports in the collected history holding section 17. If a tracing instruction is given from another information intervention system and information is traced, the history collection section 16 returns the tracing result to the information intervention system giving the tracing instruction. It can be made up of a network, a telephone line, a modem, etc., for example. However, it is not limited to them and any other means may be used if it can accomplish a similar purpose, needless to say. The history collection section 16 may share a part of the configuration of the network interface, modem, etc., with the information distribution system 12.

The collected history holding section 17 stores the distribution histories collected by the history collection section 16 from other information intervention systems. The collected distribution histories are stored together with the system identifiers of the systems from which the histories are collected, which will be described in detail later.

The tracing analysis section 18 analyzes the distribution histories collected from other information intervention systems and stored in the collected history holding section about the item specified by a command of the user, etc. It analyzes various pieces of information on distribution such as information transfer, distribution route, distribution range, etc., as to how information was distributed via which information intervention systems. A specific analysis algorithm will be described later.

The tracing result display section 19 produces output such as display of the analysis result of the tracing analysis section 18 in the format that can be understood by the user, etc. In the embodiment, the tracing result display section 19 is used for visualizing the analysis result of the trace information in the format that can be understood by human beings, but the invention is not limited to it. For example, if the analysis result is used by a computer, etc., for performing automatic processing, the tracing result display section can be replaced with another component.

Figure 2:
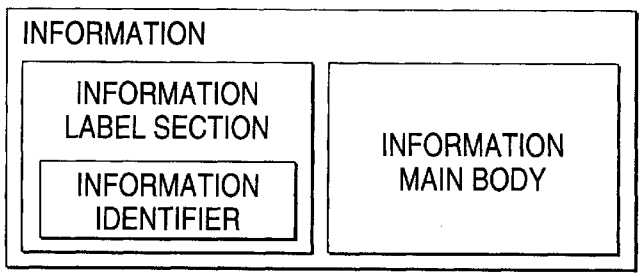
FIG. 2 is an illustration to show an example of the format of information in the first embodiment of the information processing system of the invention.

FIG. 2 is an illustration of an example of the format of information in the first embodiment of the information processing system of the invention. As shown in the drawing, the information has an information main body and an information label section for holding an information identifier to identify the information. The information main body is information having essential meanings and contains various kinds of information such as images, programs, texts, and moving pictures. The information label section contains the information identifier to uniquely identify the information. The information identifier may be any if it can distinguish the information from any other information, such as a label represented by a pair of machine name and file name as well as such an identifier represented by digits, etc.

Although the information label section is used for holding only the information identifier in the embodiment, generally it may store attributes concerning the information, such as the information creator and creation date. In such a system charging for the service in response to the use amount of information, information on the charge is also stored in the information label section. If only the information identifier is stored in the information label section, it may be attached to the information main body without providing the information label section. In any way, the information identifier or such information stored in the information label section has no meaning if it is separated from the information main body. Thus, generally it is encrypted so as not to be separated at the distribution time, for example.

Figure 3:
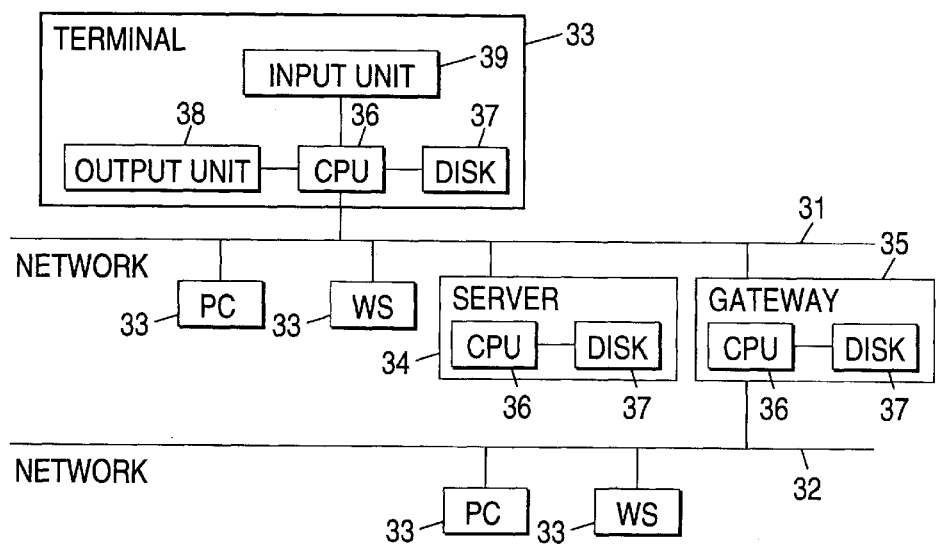
FIG. 3 is a hardware block diagram to show an example for providing the first embodiment of the information processing system of the invention.

FIG. 3 is a hardware block diagram to show an example for providing the first embodiment of the information processing system of the invention. In the figure, 31 and 32 designate networks; 33, a terminal; 34, a server; 35, a gateway; 36, a CPU; 37, a disk; 38, an output unit; and 39, an input unit. The example shown in FIG. 3 is made up of machines connected through some communication means, such as the terminals 33 of workstations, personal computers, etc., and the server 34 connected through communication means such as the networks 31 and 32 and the gateway 35 for connecting the networks. The terminals 33 are made of general workstations, personal computers, etc., each of which consists of a CPU 36, a disk 37, an output unit 38 such as a display, and an input unit such as a keyboard and a mouse. The server 34 and the gateway 35 are also general machines each consisting of a CPU 36, a disk 37, etc. The information intervention systems 1 can be related to all or some of the machines shown in FIG. 3.

Figure 4:
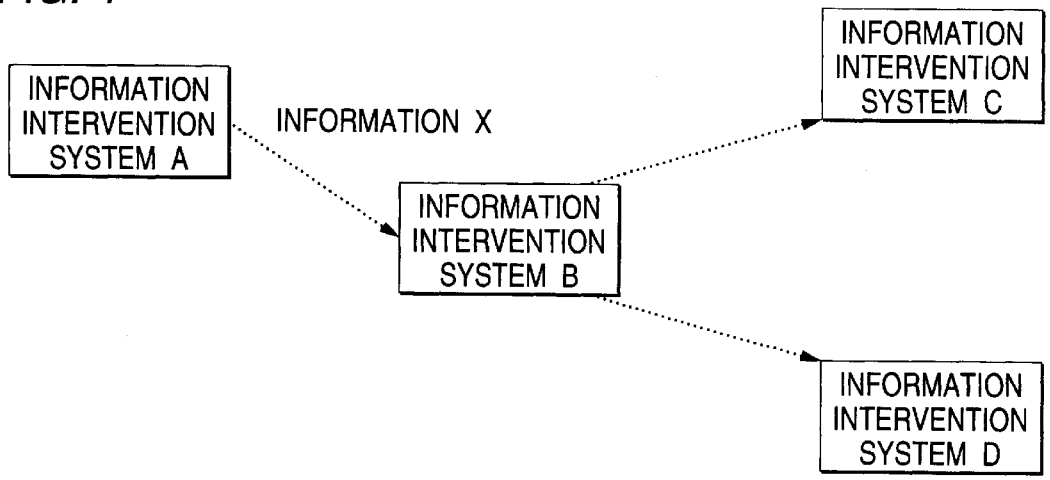
FIG. 4 is an illustration of an example of information flows in the first embodiment of the information processing system of the invention.

Next, the operation in the first embodiment of the information processing system of the invention will be described. FIG. 4 is an illustration of an example of information flows in the first embodiment of the information processing system of the invention. It shows four information intervention systems A–D and gives an example in which information X is distributed from information intervention system A to information intervention system B from which the information X is distributed to information intervention systems C and D.

The information intervention system A senses distribution of the information X to the information intervention system B and records its distribution history in the distribution history holding section 15. Likewise, the information intervention system B senses distribution of the information X to the information intervention systems C and D and records two distribution histories in the distribution history holding section 15.

When an instruction for tracing the distribution route of the information X is given in the information intervention system A, the distribution history of the information X is fetched from the distribution history holding section 15 of the information intervention system A and the information intervention system B to which the information X was distributed is instructed to trace the distribution route of the information X. Upon reception of the instruction for tracing the distribution route of the information X from the information intervention system A, the information intervention system B fetches the distribution history of the information X from its distribution history holding section 15 and instructs the information intervention systems C and D to which the information X was distributed to trace the distribution route of the information X. The information intervention systems C and D, which do not hold the distribution history of the information X, return a message to the effect that the distribution history related to the information X does not exist to the information intervention system A. The information intervention system B returns the distribution histories recorded when the information X was distributed to the information intervention systems C and D to the information intervention system A, whereby the information intervention system A can know that the information X was distributed as shown in FIG. 4. Thus, the information intervention system A can analyze the distribution route, distribution range, etc., of the information X.

Figure 5:
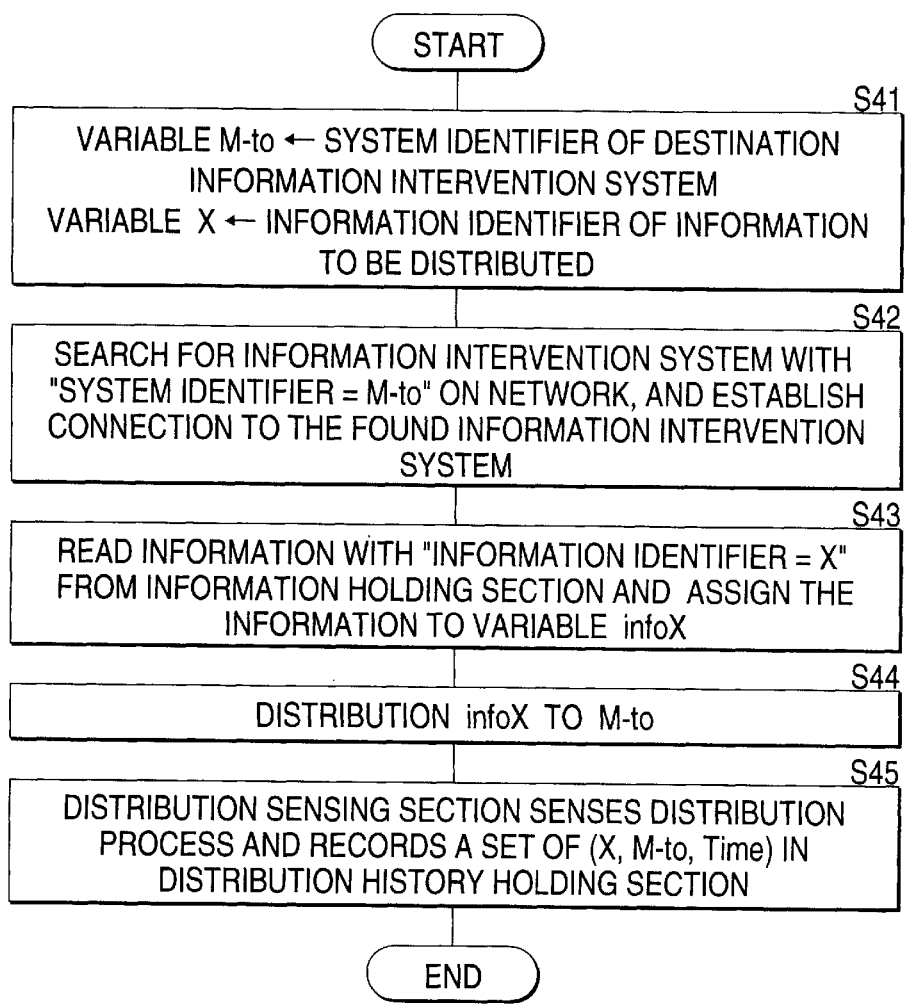
FIG. 5 is a flowchart to show an example of processing in an information mediation system of a distribution source at the information distribution time in the first embodiment of the information processing system of the invention.

A processing flow as described above will be described in detail. First, the information distribution operation will be described. FIG. 5 is a flowchart to show an example of processing in a source information intervention system when information is distributed in the first embodiment of the information processing system of the invention. At step S41, the source information intervention system assigns the system identifier of the destination information intervention system to variable M-to and the information identifier of the information to be distributed to variable X. Next, at step S42, the information distribution section 12 of the information intervention system A searches for the information intervention system having the system identifier equal to that stored in the variable M-to on the network and establishes a connection to the found information intervention system. At step S43, it reads the information having the information identifier equal to that stored in the variable X from the information holding section 11, and assigns the read information to variable InfoX. At step S44, the information distribution section 12 distributes the information stored in the variable InfoX to the information intervention system having the system identifier stored in the variable M-to. At step S45, the distribution sensing section 14 senses the distribution process and records a set of (X, M-to, Time), where Time denotes the distribution time of day, in the distribution history holding section 15 as a distribution history. The information distribution process in the source information intervention system is now complete.

Figure 6:
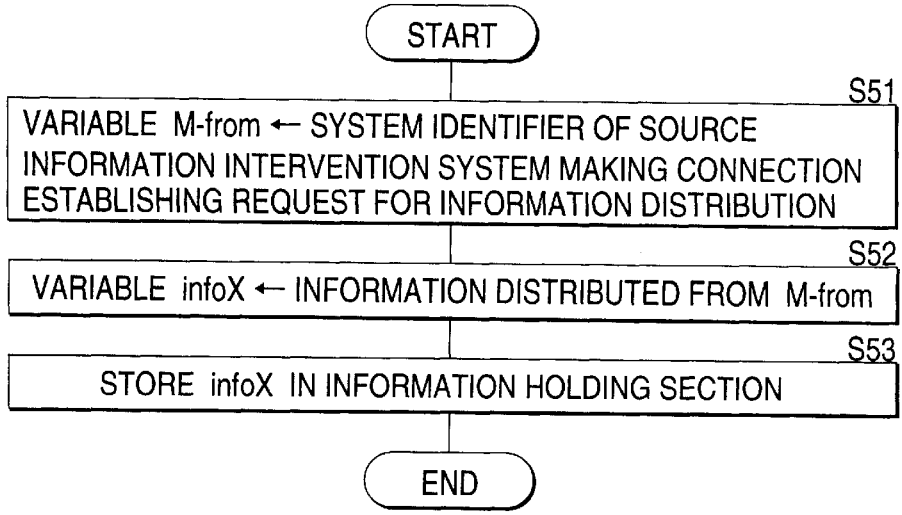
FIG. 6 is a flowchart to show an example of processing in an information mediation system of a distribution destination at the information distribution time in the first embodiment of the information processing system of the invention.

FIG. 6 is a flowchart to show an example of processing in a destination information intervention system when information is distributed in the first embodiment of the information processing system of the invention. First, at step S51, the destination information intervention system assigns the system identifier of the source information intervention system making a connection establishing request for information distribution to variable M-from. Next, at step S52, the information distributed from the information intervention system having the system identifier stored in the variable M-from is assigned to variable InfoX. At step S53, the information distribution section 12 stores the information assigned to the variable InfoX in the information holding section 11. The information distribution process in the destination information intervention system is now complete.

Figure 7:
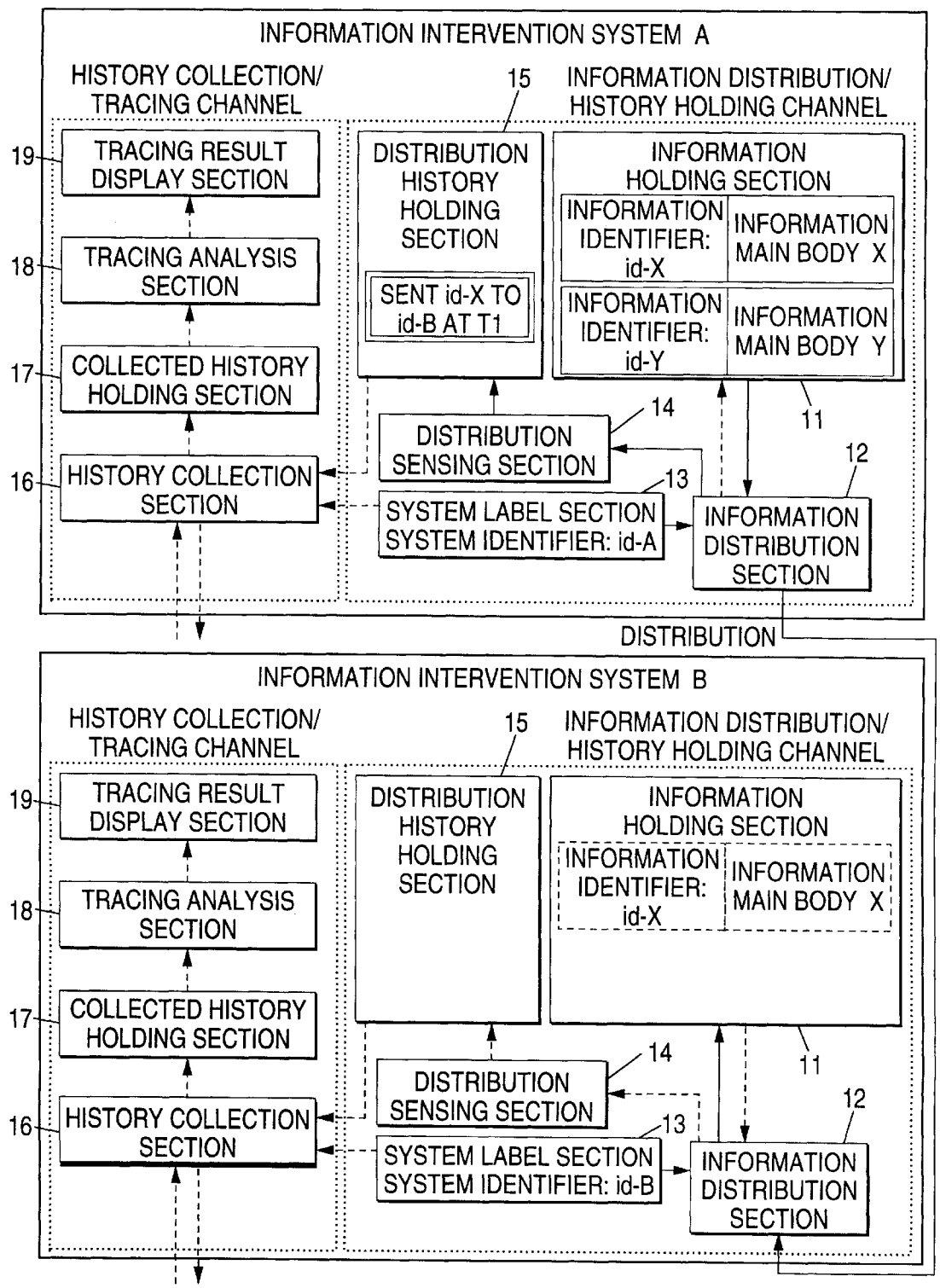
FIG. 7 is an illustration of an example of the information distribution operation in the first embodiment of the information processing system of the invention.

FIG. 7 is an illustration of an example of the information distribution operation in the first embodiment of the information processing system of the invention. An example of the operation shown in FIGS. 5 and 6 will be discussed based on a specific example. Here, distribution of information having information identifier id-X from information intervention system A to information intervention system B will be discussed. At this time, the source information intervention system is the information intervention system A and the destination information intervention system is the information intervention system B. Let the system identifiers of the information intervention systems A and B be id-A and id-B respectively. In the example shown in FIG. 7, assume that the information holding section 11 of the information intervention system A stores information having information identifier id-X and information having information identifier id-Y.

First, processing in the source information intervention system A will be discussed with reference to FIGS. 5 and 7. In the example, the information intervention system A is going to distribute the information having the information identifier id-X to the information intervention system B, thus at step S41, it assigns the system identifier id-B of the destination information intervention system B to the variable M-to and the information identifier id-X of the information to be distributed to the variable X. Next, at step S42, the information distribution section 12 of the information intervention system A searches the network for the information intervention system B having the system identifier id-B and establishes a connection to the information distribution section 12 of the information intervention system B. At step S43, the information distribution section 12 of the information intervention system A reads the information having the information identifier id-X from the information holding section 11 and assigns the information to the variable InfoX. Further, at step S44, it distributes the information assigned to the variable InfoX to the information distribution section 12 of the information intervention system B. At step S45, the distribution sensing section 14 of the information intervention system A senses the distribution process and records a set of (information identifier id-X, destination system identifier id-B, Time)

in the distribution history holding section 15 of the information intervention system A. In FIG. 7, this record is represented as sent id-X to id-B at T1 where T1 is the distribution time of day. The record denotes that the information having the information identifier id-X was sent to the information intervention system having the information identifier id-B at the time T1. Thus, the information intervention system A distributes the information and records the distribution history in the distribution history holding section 15.

Next, processing in the destination information intervention system B will be discussed with reference to FIGS. 6 and 7. First, at step S51, upon reception of the connection establishing request from the information intervention system A at step S42 in FIG. 5, the information intervention system B establishes a connection and assigns the system identifier id-A of the source information intervention system A to the variable M-from. Next, at step S52, the information distribution section 12 of the information intervention system B receives the information having the information identifier id-X distributed from the information distribution section 12 of the information intervention system A at step S44 in FIG. 5, and assigns the information to the variable InfoX. At step S53, the information distribution section 12 of the information intervention system B stores the information assigned to the variable InfoX in the information holding section 11 of the information intervention system B. The process in which the information intervention system A distributes the information to the information intervention system B is now complete.

FIG. 8 is an illustration of an example of distribution histories held in the distribution history holding section in the first embodiment of the information processing system of the invention. In FIG. 7, the distribution history is, for example, shown as sent id-X to id-B at T1

The actual contents recorded in the distribution history holding section 15 may be thus recorded as a character string, but can also be recorded as binary data. FIG. 8 shows representation of a distribution history as binary data. The target information identifier corresponds to "id-X," the destination system identifier to "id-B," and the reception time to "T1."

One row in FIG. 8 represents one distribution history. For example, the information on the top row means that information having information identifier "679840-176" was sent to information intervention system having identifier "800287" at 12 hours 9 minutes 4 seconds 41 on Mar. 10, 1995. Each time one information is distributed, such a distribution history will be added to the distribution history holding section 15. In the description to follow, basically the representation sent id-X to id-B at T1 is used for the history contents.

Figure 9:
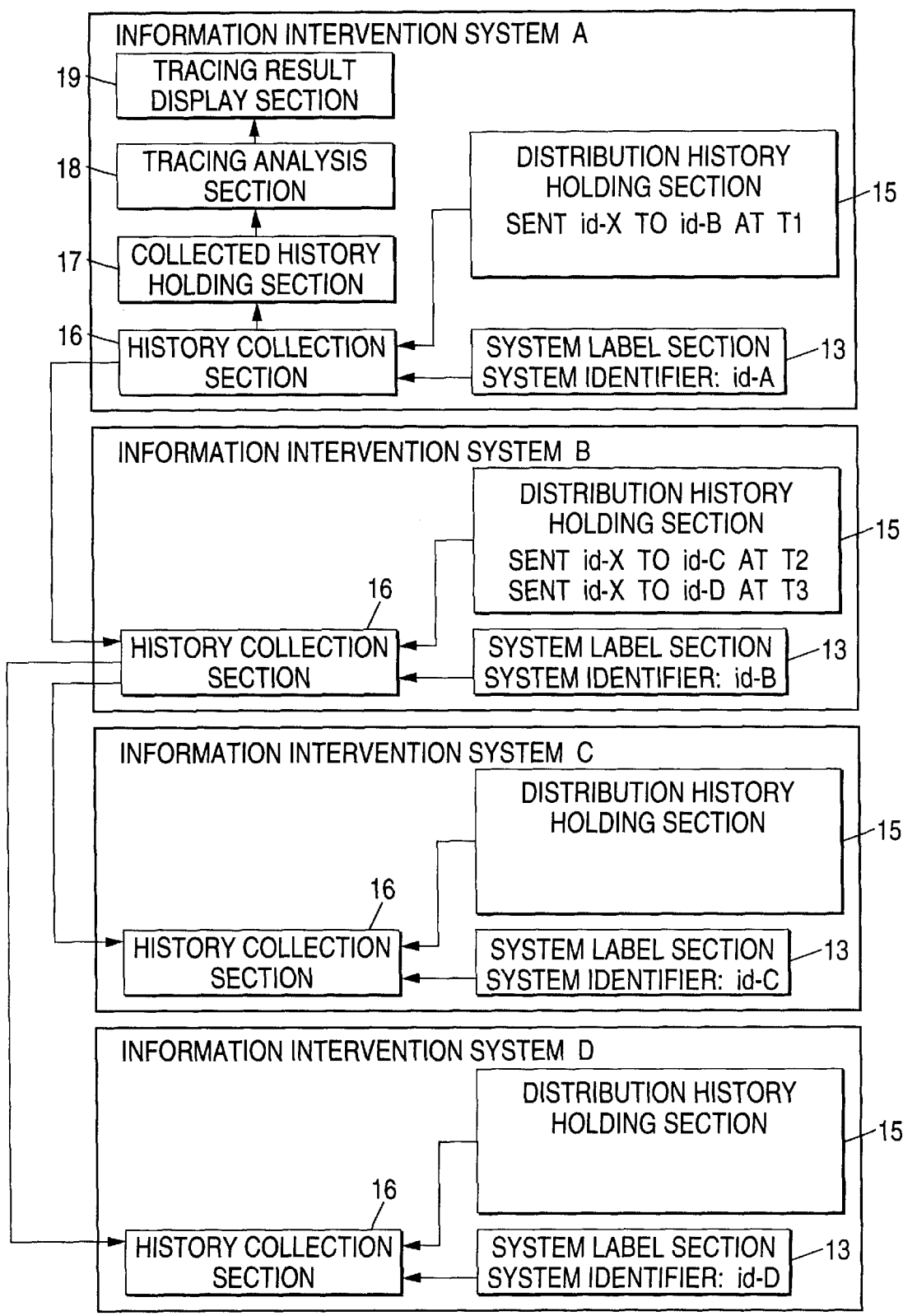
FIG. 9 is an illustration of an example after information distribution in the first embodiment of the information processing system of the invention.

FIG. 9 is an illustration of an example after information distribution in the first embodiment of the information processing system of the invention. As described above, the information having the information identifier id-X was distributed from the information intervention system A to the information intervention system B. After this, if the information flows, for example, as shown in FIG. 4, it is furthermore distributed from the information intervention system B to the information intervention systems C and D. FIG. 9 shows the distribution history holding sections 15 of the information intervention systems A–D after the information is distributed as shown in FIG. 4. Here, the system identifiers of the information intervention systems C and D are id-C and id-D respectively. FIG. 9 shows only a part of the configuration in each information intervention system.

As in the information distribution process from the information intervention system A to the information intervention system B, the information is distributed from the information intervention system B to the information intervention system C. Resultantly, the distribution history sent id-X to id-C at T2 is recorded in the distribution history holding section 15 of the information intervention system B. Likewise, the information is distributed from the information intervention system B to the information intervention system D and resultantly, the distribution history sent id-X to id-D at T3 is recorded in the distribution history holding section 15 of the information intervention system B. Thus, each time information is distributed, its distribution history is recorded in the distribution history holding section 15 of the source information intervention system.

Figure 10:
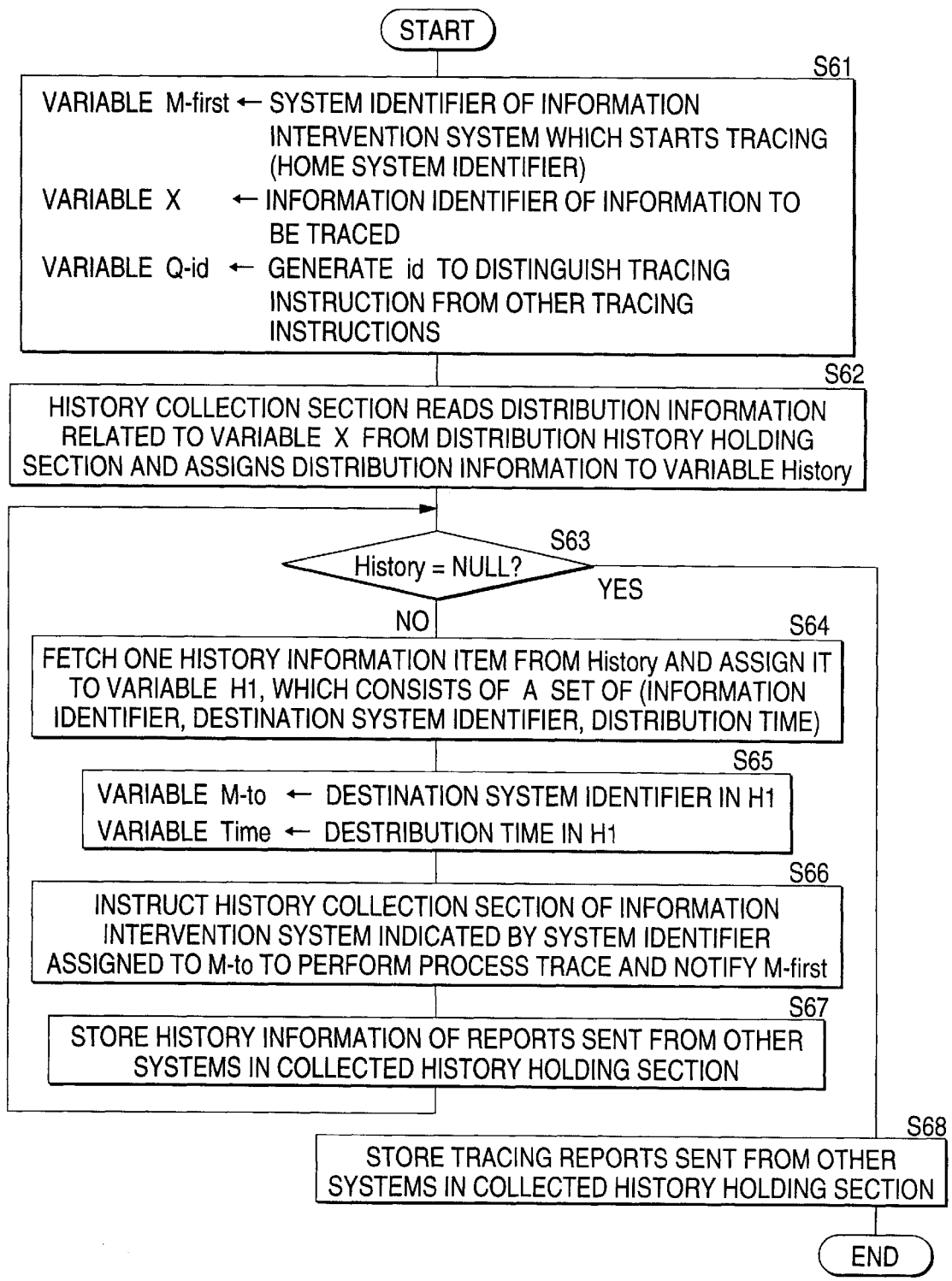
FIG. 10 is a flowchart to show an example of processing of a history collection section at the information trace time in the information mediation system starting information trace processing in the first embodiment of the information processing system of the invention.

Next, information tracing processing will be discussed. FIG. 10 is a flowchart to show an example of processing of the history collection section when information is traced in an information intervention system which starts information tracing processing in the first embodiment of the information processing system of the invention. Now, when an information transfer and distribution route tracing instruction is given in one information intervention system, first at step S61 the history collection section 16 gets the system identifier of the home information intervention system which starts tracing from the system label section 13 and assigns the system identifier to variable M-first. It also assigns the information identifier of the information to be traced to variable X. Further, it generates id for distinguishing this tracing from another tracing and assigns it to variable Q-id, which is used to identify tracing instructions to avoid an instruction loop when the information intervention systems communicate with each other. If there is no loop possibility or an alternative method can be used, the variable Q-id need not be used.

Next, at step S62, the history collection section 16 reads the distribution histories related to the information identifier assigned to the variable X from the distribution history holding section 15 and assigns the distribution history to variable History. At S63, whether or not the variable History is null is checked. If it is null, control goes to step S68; if not null, control goes to step S64.

At step S64, one history information entry is fetched from the variable History and is assigned to variable H1. As described above, the history information contains sets of (information identifier, destination system identifier, distribution time) and such a set is also assigned to the variable H1. At step S65, from the variable H1, the destination system identifier is fetched and assigned to variable M-to and the distribution time is fetched and assigned to variable Time. At step S66, the history collection section 16 instructs the history collection section 16 of the information intervention system indicated by the system identifier assigned to the variable M-to to perform process TRACE and notify M-first. The process TRACE is a process shown in flowcharts in FIGS. 12 and 13 discussed later. It is executed in other information intervention systems than the information intervention system starting the tracing. Since the home system identifier is assigned to the variable M-first, the instruction requests the process TRACE execution result to be returned to the home information intervention system. At step S67, the history collection section 16 stores (variable M-first, variable H1) pair in the collected history holding section 17 and moves the distribution history recorded in the home distribution history holding section 15 to the collected history holding section 17. Then, control returns to step S63.

If the variable History is null at step S63, the tracing instruction process of the history collection section 16 in the information intervention system starting the tracing is terminated; after this, the history collection section 16 stores tracing reports sent from other systems in the collected history holding section 17 one after another at step S68.

Figure 11:
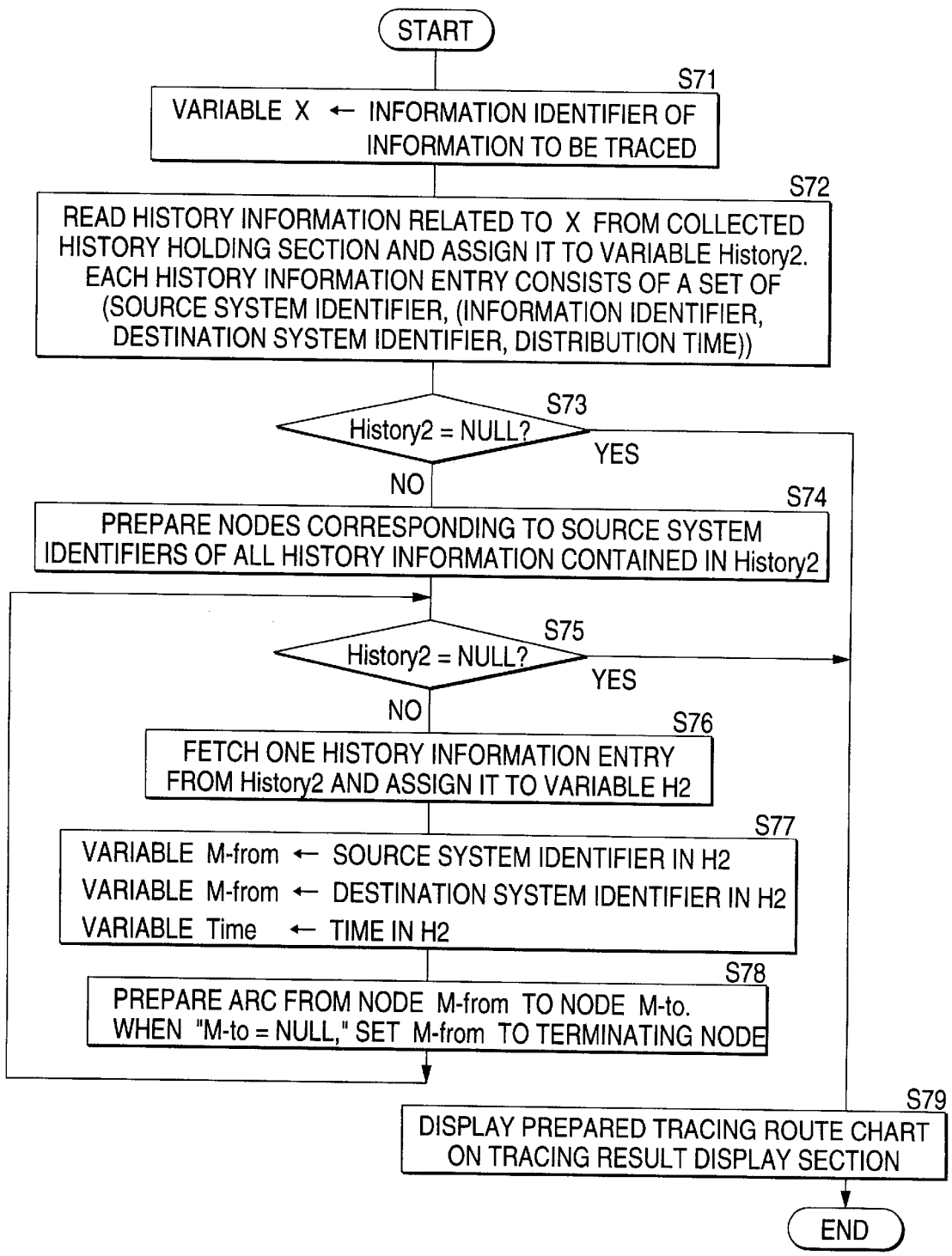
FIG. 11 is a flowchart to show an example of processing of a tracing analysis section at the information trace time in the information mediation system starting information trace processing in the first embodiment of the information processing system of the invention.

FIG. 11 is a flowchart to show an example of processing of the tracing analysis section when information is traced in the information intervention system which starts information tracing processing in the first embodiment of the information processing system of the invention. The tracing analysis section 18 operates subsequently to the processing of the history collection section 16. Here, processing after all reports for the instruction issued by the history collection section 16 to any other information intervention system are returned will be discussed.

First, at step S71, the tracing analysis section 18 assigns the information identifier of the information to be traced to variable X. Next, at step S72, it reads the history information related to the information identifier assigned to the variable X from the collected history holding section 17, and assigns the history information to variable History2. At step S73, whether or not the variable History2 is null is checked. If it is null, control goes to step S79; if not null, control goes to step S74.

At step S74, nodes corresponding to the system identifiers of the source systems of all history information contained in the variable History2 are prepared. At step S75, whether or not the variable History2 is null is checked. If it is null, control goes to step S79; if not null, control goes to step S76. At step S76, one history information entry is fetched from the variable History2 and is assigned to variable H2. At step S77, the source system identifier, destination system identifier, and time in the variable H2 are assigned to variables M-from, M-to, and Time respectively. At step S78, an arc from the node of variable M-from to the node of variable M-to is prepared. Then, control returns to step S75.

If the variable History2 is null at step S73 or S75, a prepared tracing route chart is displayed on the tracing result display section 19 at step S79.

Figure 12:
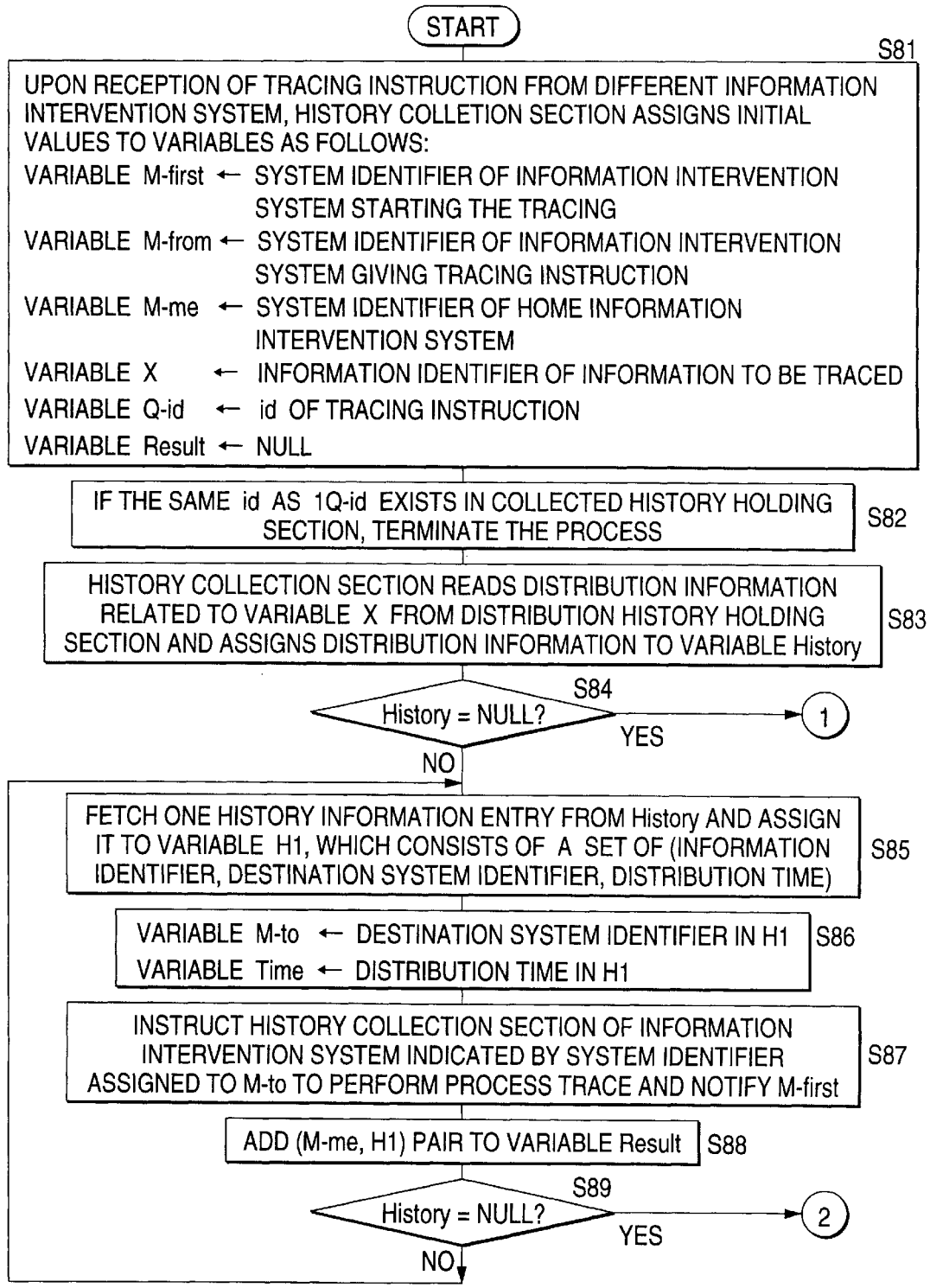
FIG. 12 is a flowchart to show an example of processing of the history collection section at the information trace time in any other information mediation system than the information mediation system starting information trace processing in the first embodiment of the information processing system of the invention.
Figures 13, 14:
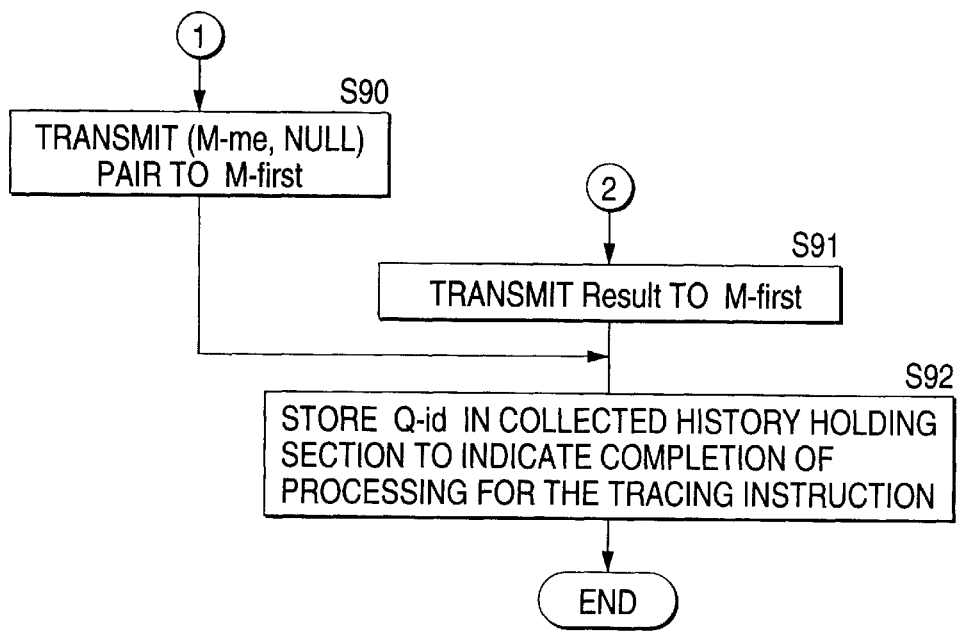
FIG. 13 is a flowchart (continued) to show an example of processing of the history collection section at the information trace time in any other information mediation system than the information mediation system starting information trace processing in the first embodiment of the information processing system of the invention.
FIG. 14 is an illustration of an example of the contents held in the collected history holding section in the first embodiment of the information processing system of the invention.

FIGS. 12 and 13 are a flowchart to show an example of processing of the history collection section when information is traced in any other-information intervention system than the information intervention system which starts information tracing processing in the first embodiment of the information processing system of the invention. This processing is the TRACE process whose execution instruction is given by the information intervention system starting the tracing at step S66 in the flowchart shown in FIG. 10. A TRACE process execution instruction is given to another information intervention system from within the TRACE process.

Upon reception of a tracing instruction from a different information intervention system, first at step S81, the history collection section 16 assigns initial values to variables as follows: The system identifier of the information intervention system starting the tracing to variable M-first, the system identifier of the information intervention system giving the tracing instruction to variable M-from, the system identifier of the home information intervention system to variable M-me, the information identifier of the information to be traced to variable X, id of the tracing instruction to variable Q-id, and null to variable Result. At step S82, if the same id as the id assigned to the variable Q-id exists in the collected history holding section 17, the instruction loops, thus the process is terminated. At step S83, the history collection section 16 reads the-distribution histories related to the information identifier assigned to the variable X from the distribution history holding section 15 and assigns the distribution history to variable History. At S84, whether or not the variable History is null is checked. If it is null, control goes to step S90; if not null, control goes to step S85.

At step S85, one history information entry is fetched from the variable History and is assigned to variable H1. At step S86, the destination system identifier in the variable H1 is assigned to variable M-to and the time in the variable H1 is assigned to variable Time. At step S87, the information intervention system indicated by the system identifier assigned to the variable M-to is instructed to perform process TRACE and notify M-first. This instruction requests the history collection section 16 of the destination information intervention system to execute process TRACE and return the result to the information intervention system starting the tracing. At step S88, (variable M-me, variable H1) pair is added to the variable Result, whereby the distribution history recorded in the distribution history holding section 15 is added as the information to be returned to the information intervention system starting the tracing. At step S89, whether or not the variable History is null is checked. If it is null, control goes to step S91; if not null, control returns to step S85.

If the variable History is null at step S84, it indicates that the information is not distributed to any information intervention systems following the information intervention system. In this case, at step S90, (variable M-me, null) pair is transmitted to the variable M-first of the information intervention system giving the TRACE process execution instruction.

If the variable History is null at step S89, namely, processing for the history information stored in the variable History is complete at steps 85–88, a home system identifier and history information pair list is stored in the variable Result. At step S91, the contents of the variable Result of the TRACE process execution result are transmitted to the information intervention system starting the tracing assigned to the variable M-first.

To indicate completion of processing for the tracing instruction at step S92 following steps S90 and S91, the id of the tracing instruction assigned to the variable Q-id is stored in the collected history holding section 17. The process TRACE of the history collection section 16 in any other information intervention system than the information intervention system starting information tracing processing is now complete.

The information tracing processing described above will be discussed with the specific example shown in FIG. 9. As previously discussed, FIG. 9 shows the contents of the distribution history holding sections 15 of the information intervention systems after distribution of the information having the information identifier id-X from the information intervention system A to the information intervention system B and from the information intervention system B to the information intervention systems C and D. In the example, assume that an instruction is given for tracing the information having the information identifier id-X from the information intervention system A. In this case, the history collection section 16 of the information intervention system A performs the processing shown in FIG. 10 described above, the tracing analysis section 18 of the information intervention system A performs the processing shown in FIG. 11 described above, and the tracing analysis sections 16 of the information intervention systems B, C, and D perform the processing shown in FIG. 12 described above.

The transfer and distribution route tracing processing flow of the information having the information identifier id-X from the information intervention system A is as follows: First, the processing of the history collection section 16 in the information intervention system A starting the tracing will be discussed with reference to FIGS. 9 and 10.

When an instruction for tracing the transfer and distribution route of the information having the information identifier id-X is issued in the information intervention system A, first at step S61, the history collection section 16 of the information intervention system A assigns the system identifier id-A of the home information intervention system starting the tracing to the variable M-first and the information identifier of the information to be traced, id-X, to the variable X. Here, assuming that id "A0001" is prepared, the id of the tracing instruction is assigned to the variable Q-id.

At step S62, the history collection section 16 of the information intervention system A reads the distribution histories related to the information identifier id-X assigned to the variable X from the distribution histories stored in the distribution history collection section 15. In the example, only one distribution history related to the information identifier id-X sent id-X to id-B at T1 is found. This distribution history is assigned to the variable History. At step S63, whether or not the variable History is null is checked. Since it is not null, control goes to step S64.

At step S64, one history information entry is fetched from the variable History. In the example, the distribution history sent id-X to id-B at T1 is fetched and assigned to the variable H1. This distribution history indicates that the information having the information identifier id-X was distributed to the information intervention system having the system identifier id-B at the time T1. The variable History from which the history-information is fetched becomes null. At step S65, from the variable H1, the destination system identifier id-B is assigned to the variable M-to and the time T1 is assigned to the variable Time.

At step S66, the history collection section 16 of the information intervention system A instructs the history collection section 16 of the information intervention system having the system identifier id-B, namely, the information intervention system B to perform process TRACE and notify M-first. Since the system identifier id-A of the information intervention system A is stored in the variable M-first, the instruction requests the history collection section 16 of the information intervention system B to trace the transfer and distribution route of the information having the information identifier id-X following the information intervention system B and return a report of the tracing result to the information intervention system A.

At step S67, the history collection section 16 of the information intervention system A stores the following (variable M-first, variable H1) pair:

(id-A, sent id-X to id-B at time T1)

in the collected history holding section 17. Then, control returns to step S63.

When control returns to step S63, the variable History is null, thus the condition at step S63 "variable History=null" is true. Then, control goes to-step S68 at which the history collection section 16 of the information intervention system A stores the reports concerning the tracing sent from the information intervention system B in the collected history holding section 17 one after another.

Next, the processing of the history collection sections 16 in other information intervention systems than the information intervention system A starting the tracing will be discussed with reference to FIGS. 9 and 12. At step S66, the history collection section 16 of the information intervention system A instructed the history collection section 16 of the information intervention system B to perform the process TRACE and notify M-first. The history collection section 16 of the information intervention system B executes the process TRACE shown in FIG. 12 in response to the instruction.

The history collection section 16 of the information intervention system B, which receives the tracing instruction from the history collection section 16 of the information intervention system A, initializes the variables at step S81 as follows: The system identifier of the information intervention system A starting the tracing, id-A, is assigned to the variable M-first and the system identifier of the information intervention system A giving the tracing instruction, id-A, is assigned to the variable M-from. In this example, the tracing starting system and the instruction giving system happen to be the same; generally, different values are assigned to the variables. Further, the system identifier of the home information intervention system B, id-B, is assigned to the variable M-me, the information identifier of the information to be traced, id-X, to the variable X, the id of the tracing instruction, "A0001," to the variable Q-id, and null to the variable Result.

At step S82, whether or not the same id as the id "A0001" of the tracing instruction assigned to the variable Q-id exists in the collected history holding section 17 is determined. In the example, the same tracing instruction id does not exist in the collected history holding section 17 and control goes to the following step.

At step S83, the history collection section 16 of the information intervention system B reads the distribution histories related to the information identifier id-X from the distribution history holding section 15. As shown in FIG. 9, two distribution histories related to the information identifier id-X are stored in the distribution history holding section 15 of the information intervention system B. The history collection section 16 reads the two distribution histories and assigns them to the variable History. Now, the following distribution histories are stored in the variable History:
 sent id-X to id-C at T2
 sent id-X to id-D at T3

At S84, whether or not the variable History is null is checked. Since it is not null, control goes to step S85 at which one distribution history is fetched from the variable History and is assigned to the variable H1. Here, assume that
 sent id-X to id-C at T2
is fetched and assigned to the variable H1. The fetched distribution history is deleted from the variable History. At step S86, the destination system identifier id-C in the variable H1 is assigned to the variable M-to and T2 is assigned to the variable Time.

At step S87, the history collection section 16 of the information intervention system B instructs the history collection section 16 of the information intervention system having the destination system identifier id-C assigned to the variable M-to, namely, the information intervention system C to perform process TRACE and notify M-first. Since the system identifier id-A of the information intervention system A is stored in the variable M-first, the instruction requests the history collection section 16 of the information intervention system C to trace the transfer and distribution route of the information having the information identifier id-X following the information intervention system C and return a report of the tracing result to the information intervention system A.

At step S88, the (variable M-me, variable H1) pair, namely, (id-B, (sent id-X to id-C at T2)) is added to the variable Result. At step S89, whether or not the variable History is null is checked. In this case, it is not null, and control returns to step S85.

At step S85, one distribution history is fetched from the variable History and is assigned to the variable H1. Here,
 sent id-X to id-D at T3
is fetched and assigned to the variable H1. The variable History becomes null. At step S86, the destination system identifier id-D in the variable H1 is assigned to the variable M-to and T3 is assigned to the variable Time.

At step S87, the history collection section 16 of the information intervention system B instructs the history collection section 16 of the information intervention system D to perform process TRACE and notify M-first. That is, the instruction requests the history collection section 16 of the information intervention system D to trace the transfer and distribution route of the information having the information identifier id-X following the information intervention system D and return a report of the tracing result to the information intervention system A.

At step S88, the pair
 (id-B, (sent id-X to id-D at T3))
is added to the variable Result. At step S89, whether or not the variable History is null is checked. In this case, processing for all distribution histories in the variable History is complete and the variable History is null, thus control goes to step S91.

When control goes to step S91, the two information entries
 (id-B, (sent id-X to id-C at T2)); and
 (id-B, (sent id-X to id-D at T3))
are stored in the variable History. At step S91, the information is transmitted to the information intervention system having the system identifier id-A stored in the variable M-first, namely, the information intervention system A.

Last, to indicate completion of processing for the tracing instruction at step S92, the id "A0001" of the tracing instruction is stored in the collected history holding section 17. The process TRACE in the history collection section in the information intervention system B is now complete. In the example, after all, steps S85–S88 are repeated twice and the history collection section 16 of the information intervention system B instructs the history collection sections 16 of the information intervention systems C and D to trace the transfer and distribution route of the information having the information identifier id-X and return a report of the tracing result to the information intervention system A, and transmits the information
 id-B: sent id-X to id-C at T2
 id-B: sent id-X to id-D at T3
to the information intervention system A, then completes the process.

At step S87, the history collection section 16 of the information intervention system B instructed the history collection sections 16 of the information intervention systems C and D to perform the process TRACE and notify the information intervention system A. The history collection sections 16 of the information intervention systems C and D execute the process TRACE shown in FIG. 12 in response to the instruction as the history collection section 16 of the information intervention system B does.

The history collection section 16 of the information intervention system C performs initialization at step S81 and checks the tracing instruction id at step S82, then attempts to read the distribution histories related to the information identifier id-X from the distribution history holding section 15 at step S83, but does not find any. Thus, the variable History becomes null. The determination at step S84 becomes true and control goes to step S90 at which the history collection section 16 transmits a pair of (M-me, null), for example,
 id-C: null
to the information intervention system A, then completes the process.

Like the history collection section 16 of the information intervention system C, the history collection section 16 of the information intervention system D executes similar steps and transmits
 id-D: null
to the information intervention system A, then completes the process.

Finally, from the information intervention systems B, C, and D, the following information
 id-B: sent id-X to id-C at T2
 id-B: sent id-X to id-D at T3
 id-C: null
 id-D: null
is sent to the information intervention system A.

FIG. 14 is an illustration of an example of the contents of the collected history holding section in the first embodiment of the information processing system of the invention. The history information collected in the collected history holding section 17 of the information intervention system A as described above may be recorded as character strings as shown above, but can also be recorded as binary data as shown in FIG. 8, for example. FIG. 14 shows representation of history information collected in the collected history holding section 17 as binary data. A field for storing the system identifier of the collection source (distribution source) information intervention system is provided in addition to the fields of the distribution history shown in FIG. 8.

For example, the information on the second top row in FIG. 14 is a distribution history collected from the information intervention system whose system identifier is "800287" and indicates that the information whose information identifier is "679840-176" was distributed from the information intervention system whose system identifier is "800287" to the information intervention system whose system identifier is "028765" at the time "1995031322233489." In the example, the system identifier "800287" is id-B, the system identifier "028765" is id-C, the information identifier "679840-176" is id-X, and the time "1995031322233489" is T2. That is, the information indicates id-B: sent id-X to id-C at T2

This means that it is a history collected from the information intervention system whose system identifier is id-B and denotes that the information whose information identifier is id-X was distributed from the information intervention system whose system identifier is id-B to the information intervention system whose system identifier is id-C at the time T2.

When the history collection section 16 of the information intervention system A executed the processing shown in FIG. 10, it stored the distribution history fetched from the home distribution history holding section 15 in the home collected history holding section 17 as the history information on the top row in FIG. 14.

Next, the processing of the tracing analysis section 18 in the information intervention system A starting the tracing will be discussed with reference to FIGS. 9 and 11. The tracing analysis section 18 operates subsequently to the processing of the history collection section 16. Here, processing after reports for the instruction issued by the history collection section 16 to the information intervention system B are returned will be discussed. The collected history holding section 17 of the information intervention system A stores the history information sent from the information intervention systems B, C, and D as described above.

First, at step S71, the tracing analysis section 18 in the information intervention system A assigns the information identifier of the information to be traced, id-X, to the variable X. Next, at step S72, it reads the history information related to the information identifier id-X from the collected history holding section 17, and assigns the history information to the variable History2. The following five history information entries are assigned to the variable History2:

id-A: sent id-X to id-B at T1
id-B: sent id-X to id-C at T2
id-B: sent id-X to id-D at T3
id-C: null
id-D: null At step S73, whether or not the variable History2 is null is checked. Since it is not null, control goes to step S74 at which four nodes corresponding to the source system identifiers id-A, id-B, id-C, and id-D of all history information contained in the variable History2 are prepared.

At step S75, whether or not the variable History2 is null is checked. At this point in time, it is not null, and control goes to step S76 at which one history information entry is fetched from the variable History2 and is assigned to the variable H2. Here, assume that id-A: sent id-X to id-B at T1 is fetched. It is assigned to the variable H2. At step S77, the source system identifier id-A, the destination system identifier id-B, and the time T1 in the variable H2 are assigned to the variables M-from, M-to, and Time respectively. At step S78, an arc from the node M-from to the node M-to, namely, an arc from the node id-A to the node id-B is prepared. Then, control returns to step S75.

At this point in time, the variable History2 is not yet null. Then, at step S76, one of the history information entries id-B: sent id-X to id-C at T2 is fetched from the variable History2 and is assigned to the variable H2. At steps S77 and S78, an arc from the node id-B to the node id-C is prepared. Likewise, an arc from the node id-B to the node id-D is prepared from the history information entry id-B: sent id-X to id-D at T3

For the remaining history information entries id-C: null
id-D: null, the nodes id-C and id-D are set to the terminating nodes at step S78.

Since the variable History2 is now null, the condition at step S75 becomes true and control goes to step S79. When control goes to step S79, the four nodes for id-A, id-B, id-C, and id-D, the three arcs "id-A→id-B," "id-B→id-C," and "id-B→id-D," and the terminating nodes at id-C and id-D are already prepared, thus the chart thereof is displayed on the tracing result display section 19.

Figure 15:
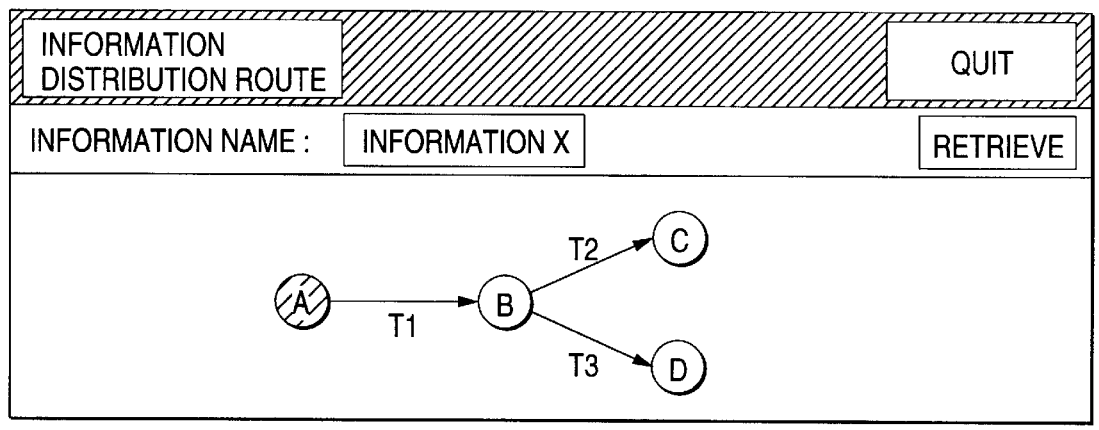
FIG. 15 is an illustration of an example of display produced by a tracing result display section in the first embodiment of the information processing system of the invention.

FIG. 15 is an illustration of an example of display of the tracing result display section in the first embodiment of the information processing system of the invention. The four nodes, the three arcs, and the two terminating nodes have been prepared as described above, based on which a graph, for example, as shown in FIG. 15 can be displayed.

In the display example shown in FIG. 15, a QUIT button for closing the window, an information name input area, and a RETRIEVE button are displayed on the top of the window of the tracing result display section 19. The user enters the name of the information whose tracing result is to know in the input field to the right of the INFORMATION NAME indication. The user can give an information analysis command to the history collection section 16 by pressing the RETRIEVE button. Here, assume that the user is to know the distribution route of information X having information identifier id-X and enters information X as the information name-. After entering the information name, he or she presses the RETRIEVE button. Since the RETRIEVE button is a virtual button; the user can click a mouse button on the position of the RETRIEVE button, for example.

In the example shown in FIG. 15, the nodes prepared as described above are indicated by circles and the arcs are indicated by arrows. The distribution time of day is displayed near each arrow. The node indicating the information intervention system starting the tracing differs from other nodes in display method. The node is hatched in FIG. 15 for convenience of the illustration; in fact, it can be displayed by changing the color, brightness, etc. Such graphical distribution route display enables the user to know the information distribution route in a visual form.

Thus, the first embodiment enables the user to trace the transfer and distribution route and distribution range of information following one information intervention system.

In the description, in the information tracing processing, each information intervention system instructed to check history information and return a report sends a report directly to the information intervention system first starting the tracing processing, but the invention is not limited to the configuration. A report may be sent to the information intervention system giving the instruction for checking history information and returning a report and be passed in the reverse order to the information distribution order.

In the description, the history information contains the distribution time of day in addition to the information identifier and the system identifiers. However, to know only the distribution route, etc., the distribution time of day is not necessarily required and may be omitted. However, to obtain information on the information transfer time or to know which distribution was first executed, for example, when the same information was distributed or received from more than one information intervention system, it is convenient to also contain the distribution time of day in the history information. Of course, other information pieces may be recorded as history information.

Second embodiment:

Next, a second embodiment of the information processing system capable of tracing distribution information of an information distribution route, distribution range, distribution amount, etc. of the invention will be discussed. The embodiment is configured so that information can be traced as to what transfer and distribution route the information was distributed on to one system.

Like the first embodiment, the basic configuration in the second embodiment is shown in FIG. 1 and therefore the sections will not be discussed again in detail. The second embodiment differs from the first embodiment basically in the distribution history contents recorded in a distribution history holding section 15 when information is distributed and in the tracing request direction when information is traced. Specifically, when information is distributed, the system identifier of the information destination is recorded in the distribution history holding section 15 of the source information intervention system in the first embodiment; whereas the system identifier of the information source is recorded in a distribution history holding section 15 of the destination information intervention system in the second embodiment. When information is traced, it is traced in the same order as the information was distributed in the first embodiment; whereas it is traced in the reverse order to how the information was distributed in the second embodiment. Such a configuration enables the user to know what route the received information was distributed via, for example.

When information is distributed (received), a distribution sensing section 14 records the information identifier of the information in the distribution history holding section 15 together with the system identifier of the source information intervention system.

A history collection section 16 reads a distribution history from the distribution history holding section 15 and based on the distribution history, requests the source information intervention system to collect the distribution histories of the information preceding the source information intervention system in order and return the distribution histories to the information intervention system giving the collection instruction. Of course, it may request the information intervention system to return the distribution histories to the information intervention system starting the tracing.

Figure 16:
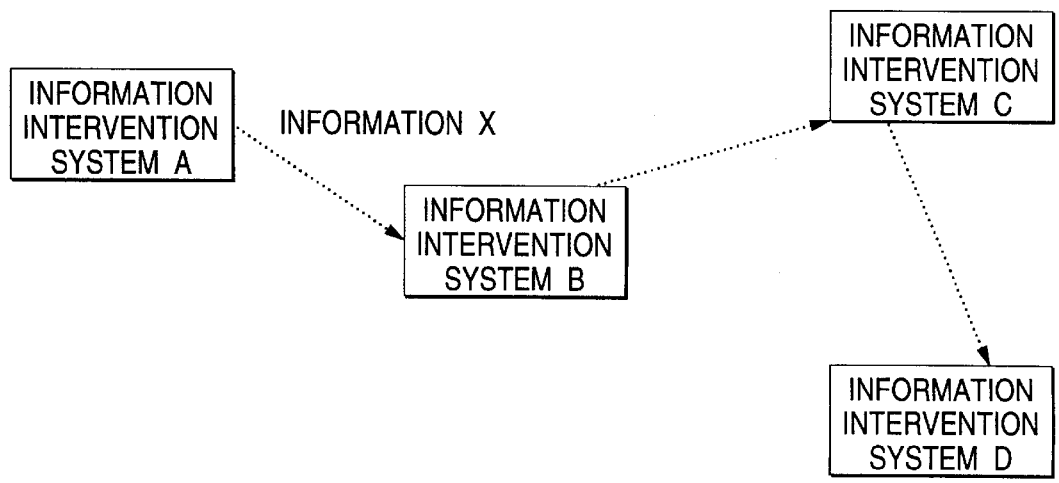
FIG. 16 is an illustration of an example of an information flow in a second embodiment of the information processing system of the invention.

Next, the operation in the second embodiment of the information processing system of the invention will be outlined. FIG. 16 is an illustration of an example of an information flow in the second embodiment of the information processing system of the invention. It shows four information intervention systems A–D and gives an example in which information X is distributed from information intervention system A to information intervention system B to information intervention system C to information intervention system D.

The information intervention system B senses distribution of the information X from the information intervention system A and records its distribution history in the distribution history holding section 15. Likewise, the information intervention system C (D) also senses distribution of the information X from the information intervention system B (C) and records its distribution history in the distribution history holding section 15.

When an instruction for tracing the distribution route of the information X is given in the information intervention system D, the distribution history of the information X is fetched from the distribution history holding section 15 of the information intervention system D and the information intervention system C from which the information X was distributed is instructed to trace the distribution route of the information X. Here, a method of passing the histories in the reverse order to how the information was distributed is adopted as the tracing result reporting method. Upon reception of the instruction for tracing the distribution route of the information X from the information intervention system D, the information intervention system C fetches the distribution history of the information X from its distribution history holding section 15 and instructs the information intervention system B from which the information X was distributed to trace the distribution route of the information X. Likewise, the information intervention system B also fetches the distribution history of the information X from its distribution history holding section 15 and instructs the information intervention system A from which the information X was distributed to trace the distribution route of the information X. The information intervention system A, which does not hold the distribution history of the information X, does not give an additional tracing instruction and returns a message to the effect that the distribution history related to the information X does not exist to the information intervention system B. The information intervention system B returns the distribution history when the information X was distributed from the information intervention system A and a message to the effect that the distribution history related to the information X does not exist in the information intervention system A to the information intervention system C. The information intervention system C returns the distribution history when the information X was distributed from the information intervention system B, the distribution history when the information X possessed by the information intervention system B was distributed from the information intervention system A, and a message to the effect that the distribution history related to the information X does not exist in the information intervention system A to the information intervention system D, whereby the information intervention system D can know that the information X was distributed as shown in FIG. 16. Thus, the information distribution route, distribution range, etc., can be analyzed.

Figure 17:
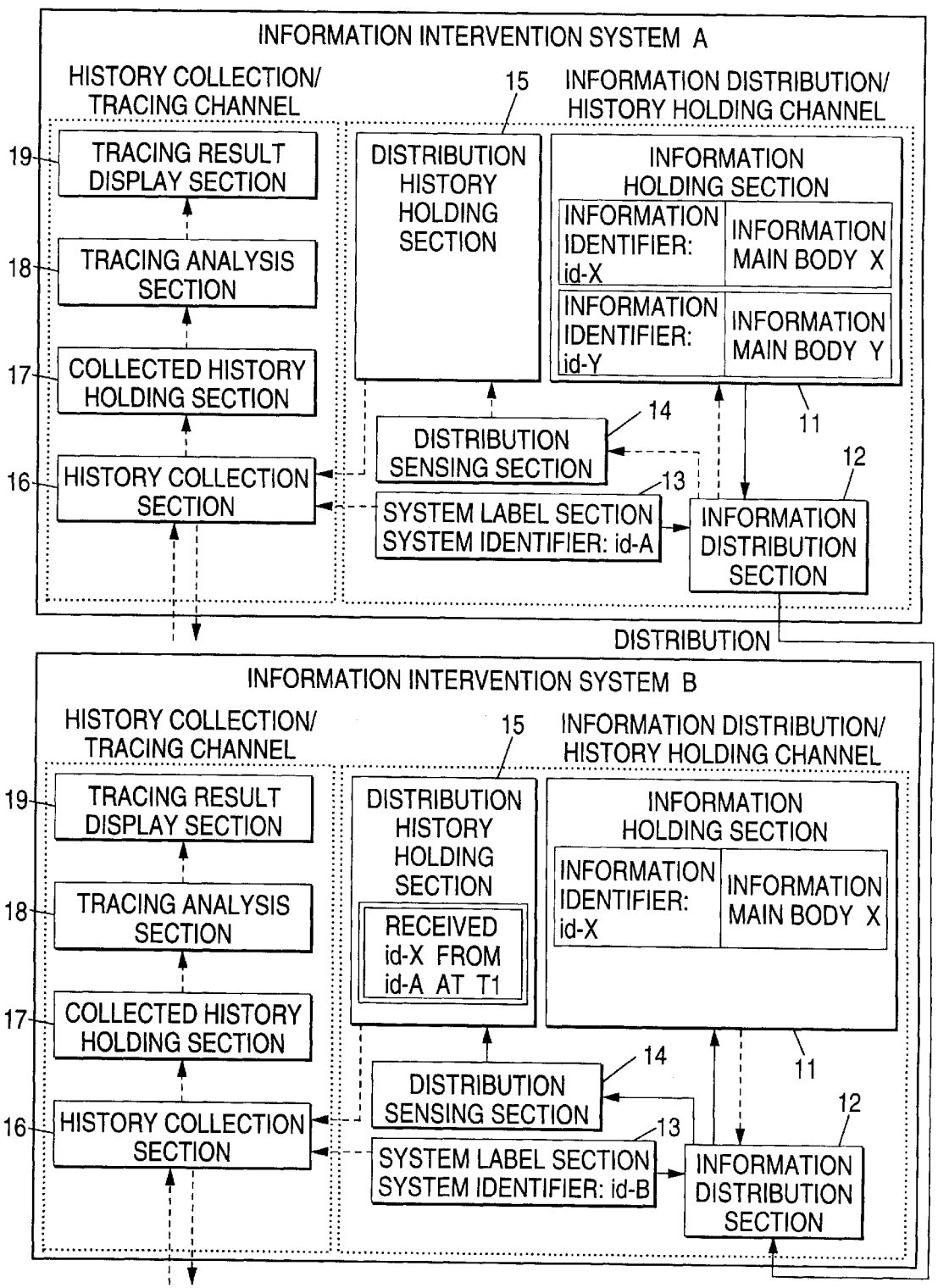
FIG. 17 is an illustration of an example of the information distribution operation in the second embodiment of the information processing system of the invention.

A processing flow as described above will be discussed in detail. First, the information distribution operation will be discussed. FIG. 17 is an illustration of an example of the information distribution operation in the second embodiment of the information processing system of the invention. Sections identical with or similar to those previously described with reference to FIG. 1 are denoted by the same reference numerals in FIG. 17. Here, a processing flow when information having information identifier id-X is distributed from information intervention system A to information intervention system B will be discussed.

As in FIG. 7 in the first embodiment, the information intervention system A has the system identifier id-A. An information holding section 11 of the information intervention system A stores information having information identifier id-X (information X) and information having information identifier id-Y. The information intervention system B has system identifier id-B.

The processing flow when the information intervention system A distributes information to the information intervention system B is also the same as that in the first embodiment except for the distribution history entering location and contents. In the first embodiment, the information identifier id-X of the distributed information is recorded in the distribution history holding section 15 of the information intervention system A together with the destination system identifier id-B. In the second embodiment, the information identifier id-X of the distributed information is recorded in the distribution history holding section 15 of the information intervention system B together with the source system identifier id-A.

Specifically, first an information distribution section 12 of the information intervention system A searches the network for the information intervention system B based on the system identifier id-B thereof and establishes a connection to an information distribution section 12 of the information intervention system B. Next, the information distribution section 12 of the information intervention system A reads the information X from the information holding section 11 and distributes the information to the information distribution section 12 of the information intervention system B. Upon reception of the information X, the information distribution section 12 of the information intervention system B stores the information in the information holding section 11.

The distribution sensing section 14 of the information intervention system B senses the distribution process, namely, the reception process and records the information identifier id-X of the distributed information in the distribution history holding section 15 of the information intervention system B together with the source system identifier id-A. In the example shown in FIG. 17, the distribution time T1 is added to the record as received id-X from id-A at T1

This record denotes that the information having the information identifier id-X was received from the information intervention system having the information identifier id-A at the time T1.

Figure 18:
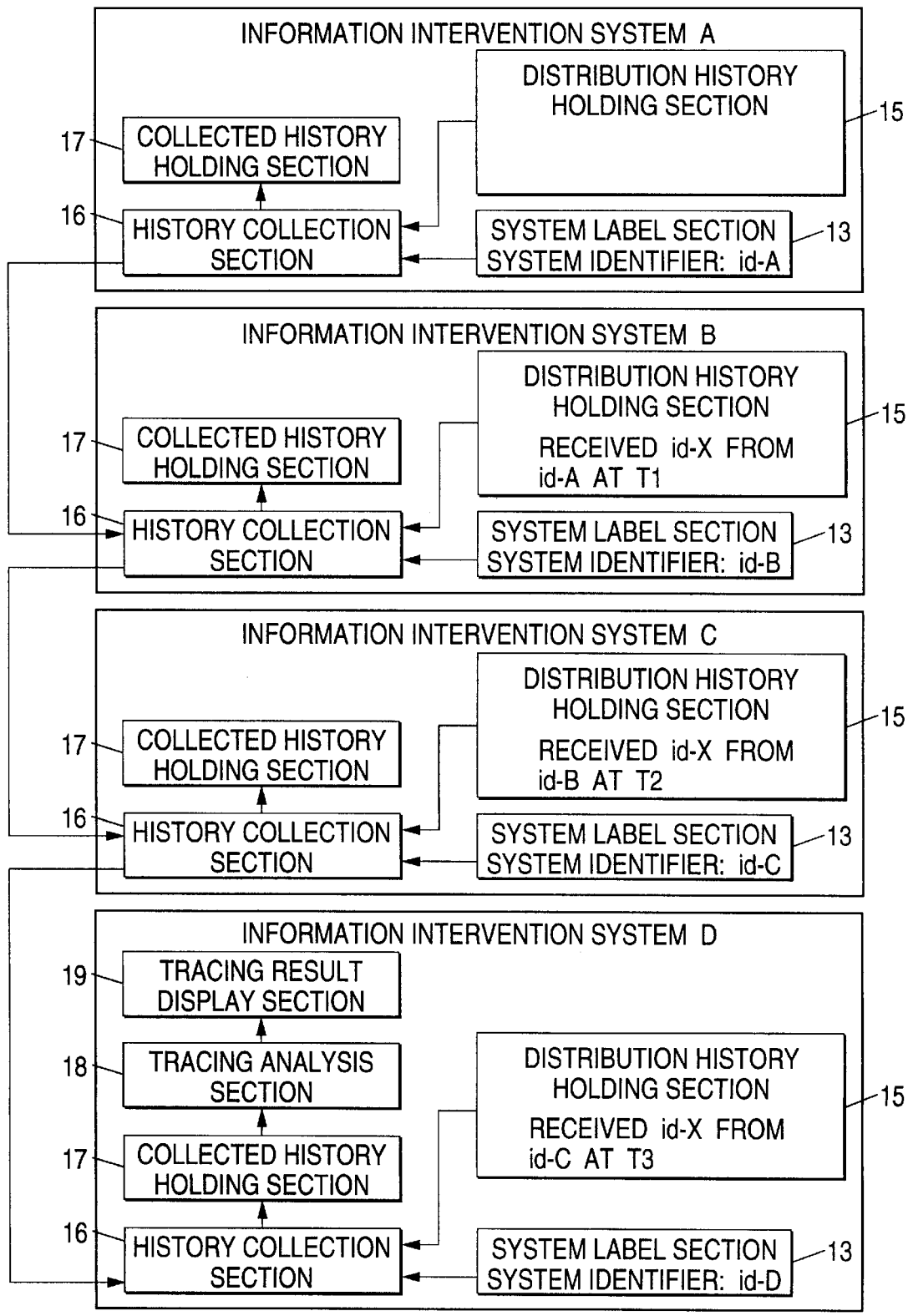
FIG. 18 is an illustration of an example after information distribution in the second embodiment of the information processing system of the invention.

FIG. 18 is an illustration of an example after information distribution in the second embodiment of the information processing system of the invention. As described above, the information X was distributed from the information intervention system A to the information intervention system B. If the information flows, for example, as shown in FIG. 16, it is furthermore distributed from the information intervention system B to the information intervention system C to the information intervention system D. FIG. 18 shows the distribution history holding sections 15 of the information intervention systems A–D after the information is distributed as shown in FIG. 16. Here, the system identifiers of the information intervention systems C and D are id-C and id-D respectively. FIG. 18 shows only a part of the configuration in each information intervention system.

As in the information distribution process from the information intervention system A to the information intervention system B, the information is distributed from the information intervention system B to the information intervention system C. Resultantly, the distribution history received id-X from id-B at T2 is recorded in the distribution history holding section 15 of the information intervention system C. Likewise, the information is distributed from the information intervention system C to the information intervention system D and resultantly, the distribution history received id-X from id-C at T3 is recorded in the distribution history holding section 15 of the information intervention system D. Thus, each time information is distributed, its distribution history is recorded in the distribution history holding section 15 of the source information intervention system.

Next, information tracing processing will be discussed with FIG. 18. In the description, a method of passing the histories in the reverse order to how the information was distributed is adopted as the tracing result reporting method. Of course, the method of returning all reports to the information intervention system starting the tracing may be adopted as in the first embodiment.

First, when an information X transfer and distribution route tracing instruction is given in the information intervention system D, the history collection section 16 of the information intervention system D reads the distribution histories related to the information identifier id-X of the information X from the distribution histories stored in the distribution history holding section 15. In the example, only one distribution history received id-X from id-C at T3 is found. This distribution history indicates that the information X was distributed from the information intervention system C having the system identifier id-C at the time T3. Then, the history collection section 16 of the information intervention system D requests the history collection section 16 of the information intervention system C to trace the transfer and distribution route of the information X and report the tracing result to the information intervention system D. In addition, it stores a pair of the distribution history and the system identifier id-D of the information intervention system D, namely, the following history information id-D: received id-X from id-C at time T3 in a collected history holding section 17 of the information intervention system D.

The history collection section 16 of the information intervention system C, which receives the request from the information intervention system D, reads the distribution histories related to the information identifier id-X of the information X from the distribution histories stored in the distribution history holding section 15. In the example, the following distribution history received id-X from id-B at T2 is found. The history collection section 16 of the information intervention system C stores a pair of the distribution history and the home system identifier id-C, namely, the following history information id-C: received id-X from id-B at time T2 in a collected history holding section 17 of the information intervention system C. Further, the distribution history indicates that the information X was distributed from the information intervention system B having the system identifier id-B at the time T2. Then, the history collection section 16 of the information intervention system C requests the information intervention system B to trace the transfer and distribution route of the information X and report the tracing result to the information intervention system C.

Likewise, the history collection section 16 of the information intervention system B reads the distribution histories related to the information identifier id-X of the information X from the distribution history-holding section 15 and stores the following history information id-B: received id-X from id-A at time T1 in a collected history holding section 17 of the information intervention system B and requests the information intervention system A to trace the transfer and distribution route of the information X and report the tracing result to the information intervention system B.

Likewise, the history collection section 16 of the information intervention system A attempts to read the distribution histories related to the information identifier id-X of the information X from the distribution history holding section 15, but the distribution history holding section 15 of the information intervention system A does not store any distribution history related to the information identifier id-X of the information X. Thus, the history collection section 16 of the information intervention system A reports the following information id-A: null to the information intervention system B.

The history collection section 16 of the information intervention system B, which receives the report from the history collection section 16 of the information intervention system A, fetches the history information id-B: received id-X from id-A at time T1 from the collected history holding section-17, adds it to the history information received from the information intervention system A, and reports the information to the information intervention system C.

Likewise, the history collection section 16 of the information intervention system C, which receives the report from the history collection section 16 of the information intervention system B, fetches the history information from the collected history holding section 17, adds it to the history information received from the information intervention system B. and reports the information to the information intervention system D.

The history collection section 16 of the information intervention system D, which receives the report from the history collection section 16 of the information intervention system C, stores the received history information in the collected history holding section 17 of the information intervention system D. Finally, the following history information id-A: null
id-B: received id-X from id-A at time T1
id-C: received id-X from id-B at time T2
id-D: received id-X from id-C at time T3 is stored in the collected history holding section 17 of the information intervention system D.

A tracing analysis section 18 of the information intervention system D analyzes the history information and determines that the information X was distributed from the information intervention system A to the information intervention system B to the information intervention system C to the information intervention system D. It displays the analysis result on a tracing result display section 19.

Figure 19:
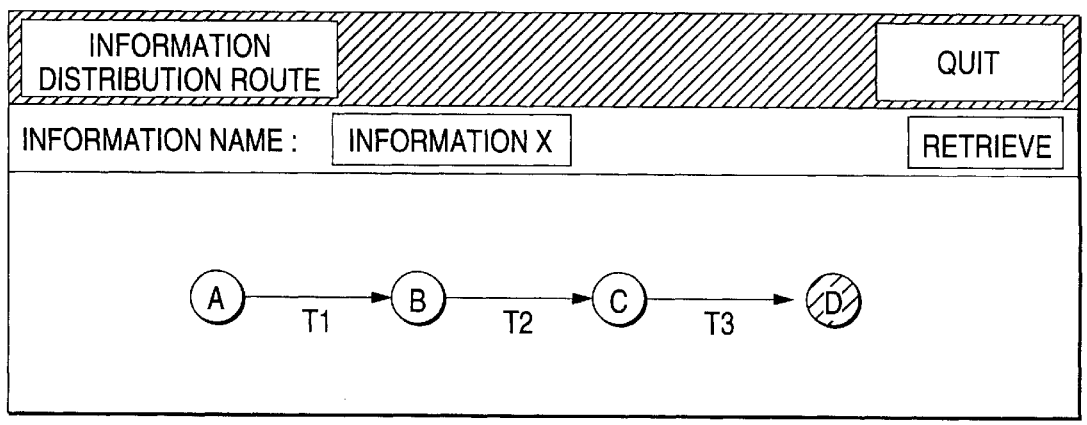
FIG. 19 is an illustration of an example of display produced by a tracing result display section in the second embodiment of the information processing system of the invention.

FIG. 19 is an illustration of an example of display of the tracing result display section in the second embodiment of the information processing system of the invention. The display form in FIG. 19 is similar to that in FIG. 15. According to the history information collected in the collected history holding section 17 of the information intervention system D as described above, the existing information intervention systems A, B, C, and D are indicated by circles as nodes and the three arcs "id-A→id-B," "id-B→id-C," and "id-C→id-D" are prepared and indicated by arrows. The distribution time of day is displayed near each arrow. In the display example shown in FIG. 19, the node indicating the information intervention system D starting the tracing differs from other nodes in display way.

Third embodiment:

Next, a third embodiment of the information processing system capable of tracing distribution information of an information distribution route, distribution range, distribution amount, etc. of the invention will be discussed. The embodiment enables tracing of all transfer and distribution routes and all distribution ranges of information. Basically, it is provided by combining the first and second embodiments, wherein information can be traced in the same order as and the reverse order to how it was distributed from one information intervention system, and all transfer and distribution routes and all distribution ranges of information can be traced. The second embodiment is the same as the first embodiment in basic configuration, shown in FIG. 1 and therefore the sections will not be discussed again in detail.

When receiving information distribution from any other information intervention system, a distribution sensing section 14 records the information identifier of the information in a distribution history holding section 15 together with the system identifier of the source information intervention system. When distributing information to any other information intervention system, it records the information identifier of the information in the distribution history holding section 15 together with the system identifier of the destination information intervention system.

A history collection section 16 reads distribution histories from the distribution history holding section 15 and based on the read distribution histories, requests the destination and source information intervention systems to collect the distribution histories of the information preceding and following the information intervention systems in order and return the distribution histories to the information intervention system starting the tracing. Of course, it may request the information intervention systems to return the distribution histories to the information intervention system receiving the tracing instruction.

Figure 20:
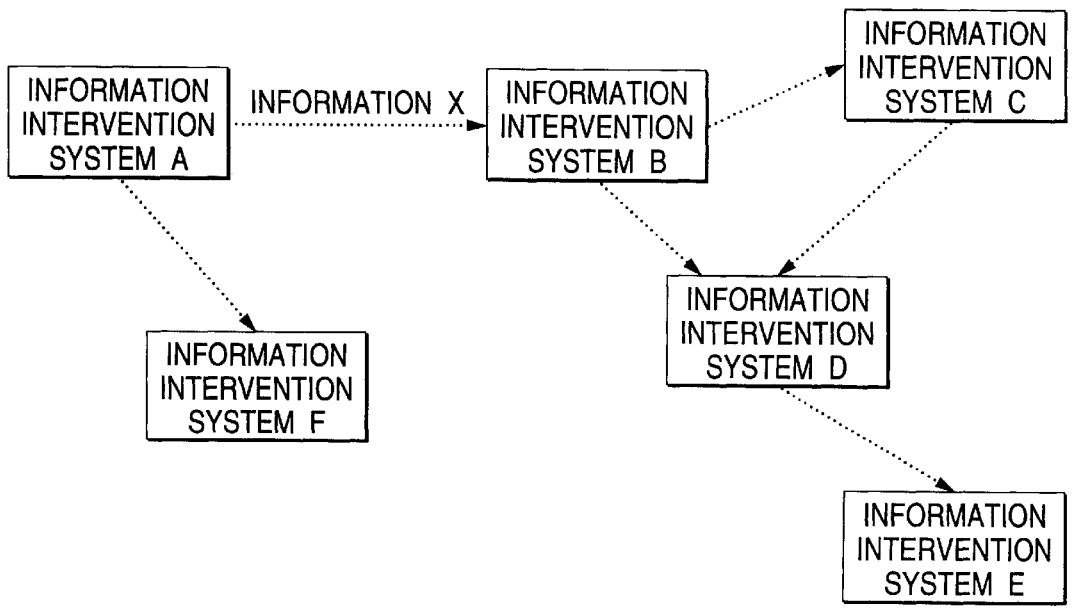
FIG. 20 is an illustration of an example of an information flow in the third embodiment of the information processing system of the invention.

Next, the operation in the third embodiment of the information processing system of the invention will be outlined. FIG. 20 is an illustration of an example of an information flow in the third embodiment of the information processing system of the invention. It shows six information intervention systems A–F and gives an example in which information X is distributed from information intervention system A to information intervention systems B and F, from information intervention system B to information intervention systems C and D, from information intervention system C to information intervention system D, and from information intervention system D to information intervention system E.

The information intervention system A records distribution histories of distribution of the information X to the information intervention systems B and F in the distribution history holding section 15. The information intervention system B records distribution histories of distribution of the information X from the information intervention system A and distribution of the information X to the information intervention systems C and D in the distribution history holding section 15. Likewise, the information intervention system C records distribution histories of distribution of the information X from the information intervention system B and distribution of the information X to the information intervention system D in the distribution history holding section 15; the information intervention system D records distribution histories of distribution of the information X from the information intervention systems B and C and distribution of the information X to the information intervention system E in the distribution history holding section 15; the information intervention system E records a distribution history of distribution of the information X from the information intervention system D in the distribution history holding section 15; and the information intervention system F records a distribution history of distribution of the information X from the information intervention system A in the distribution history holding section 15.

When an instruction for tracing the distribution route of the information X is given in the information intervention system B, the distribution histories of the information X are fetched from the distribution history holding section 15 of the information intervention system B. In this case, since the distribution histories of distribution of the information x from the information intervention system A and distribution of the information X to the information intervention systems C and D are recorded, the information intervention system B instructs the information intervention systems to trace the distribution routes of the information X. It can know all distribution routes and distribution ranges of the information as shown in FIG. 20 by carrying out an analysis on the history information collected from the information intervention systems. Thus, the third embodiment enables the user to trace all distribution routes of information from any information intervention system to which analysis information was distributed.

A processing flow as described above will be discussed in detail. First, the information distribution operation will be discussed. Information distribution processing is a combination of the processing shown in the first embodiment and that in the second embodiment. Distribution of the information X from the information intervention system A to the information intervention system B is considered. In this case, as shown in FIG. 7, the distribution history sent id-X to id-B at T1 is recorded in the distribution history holding section 15 of the source information intervention system A. As shown in FIG. 17, the distribution history received id-X from id-A is recorded in the distribution history holding section 15 of the destination information intervention system B. At this time, the distribution time of day may be recorded in either of them; in the example, it is recorded only in the distribution history recorded in the source information intervention system. It can also be recorded only in the distribution history recorded in the destination information intervention system or in the distribution histories recorded in both the source and destination information intervention systems.

Figure 21:
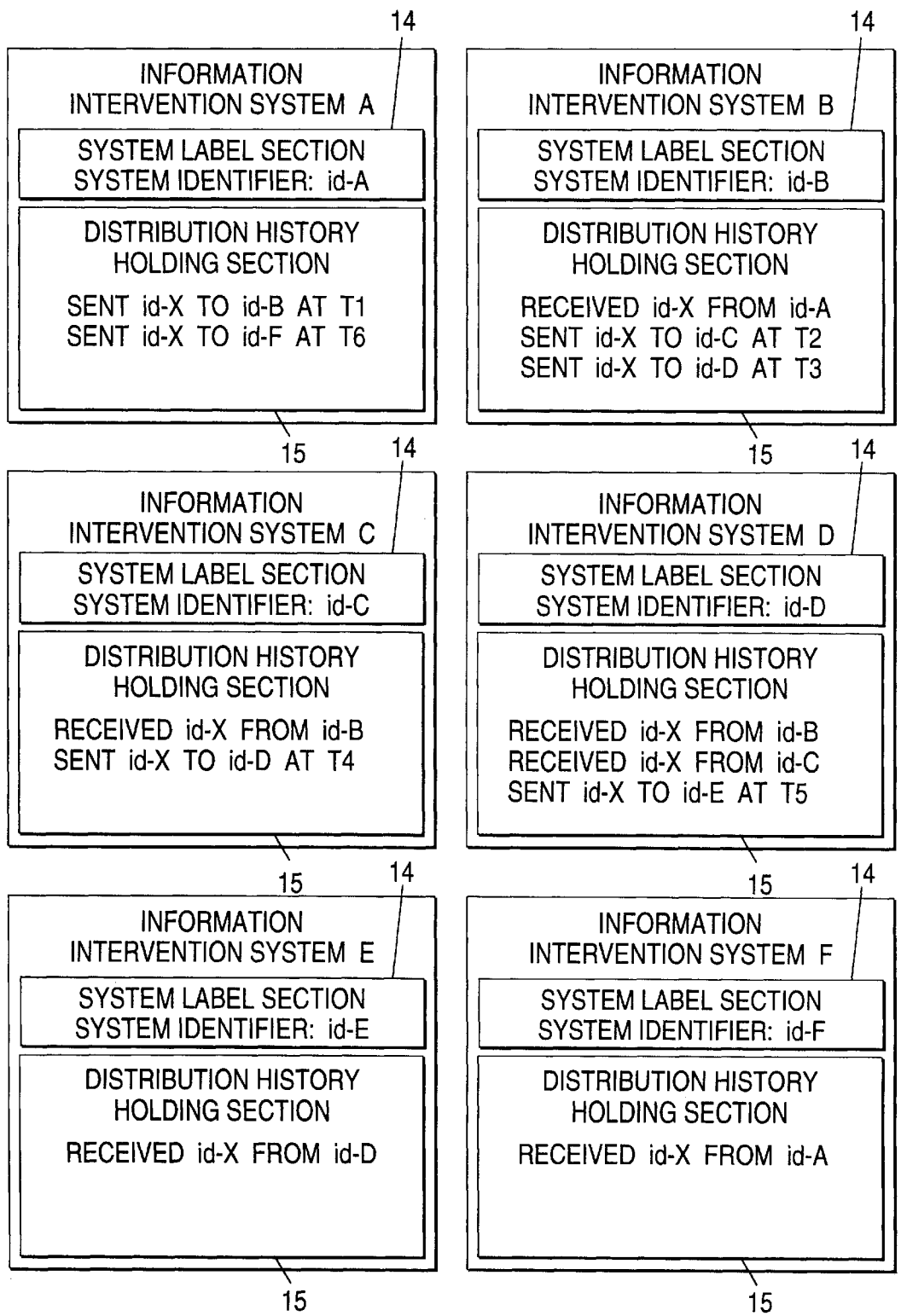
FIG. 21 is an illustration of an example after information distribution in the third embodiment of the information processing system of the invention.

FIG. 21 is an illustration of an example after information distribution in the third embodiment of the information processing system of the invention. As described above, the information X was distributed from the information intervention system A to the information intervention system B. If the information flows, for example, as shown in FIG. 20, further the distribution history sent id-X to id-F at T6 indicating that the information X was distributed to the information intervention system F is recorded in the distribution history holding section 15 of the information intervention system A. When the information X was distributed to the information intervention system F, the distribution history received id-X from id-A is recorded in the distribution history holding section 15 of the information intervention system F.

Further, the distribution histories sent id-X to id-C at T2 sent id-X to id-D at T3 indicating that the information X was distributed to the information intervention systems C and D are recorded in the distribution history holding section 15 of the information intervention system B. When the information X was distributed to the information intervention systems C and D, the distribution history received id-X from id-B is recorded in the distribution history holding sections 15 of the information intervention systems C and D. Since the information intervention system C further distributes the information X to the information intervention system D, further the distribution history sent id-X to id-D at T4 is recorded in the distribution history holding section 15 of the information intervention system C. In response to this, the distribution history received id-X from id-C is recorded in the distribution history holding section 15 of the information intervention system D. Since the information intervention system D distributes the information X to the information intervention system E, further the distribution history sent id-X to id-E at T5 is recorded in the distribution history holding section 15 of the information intervention system D. In response to this, the distribution history received id-X-from id-D is recorded in the distribution history holding section 15 of the information intervention system E. When distribution of the information X as shown in FIG. 20 was thus executed, the distribution histories as shown in FIG. 21 are recorded in the distribution history holding sections 15 of the information intervention systems A–F.

Next, transfer and distribution route tracing processing of the information X from the information intervention system B will be discussed with the example shown in FIG. 21. In the description that follows, assume that an information X transfer and distribution route tracing instruction is given in the information intervention system B.

When an information X transfer and distribution route tracing instruction is given in the information intervention system B, the history collection section 16 of the information intervention system B reads the distribution histories related to the information identifier id-X of the information X from the distribution histories stored in the distribution history holding section 15. In the example, the following three distribution histories received id-x from id-A sent id-X to id-C at T2 sent id-X to id-D at T3 are found.

These found distribution histories indicate that the information intervention system B received the information X from the information intervention system A and distributed it to the information intervention systems C and D at the times T2 and T3. The information intervention system B requests the information intervention systems A, C, and D to trace the transfer and distribution routes of the information X preceding and following the systems A, C, and D and report the tracing result to the information intervention system B. In addition, it stores pairs of each of the distribution histories and the system identifier id-B of the information intervention system B in the collected history holding section 17.

Each of the information intervention systems A, C, and D, which receives the request from the information intervention system B, reads the distribution histories related to the information identifier id-X of the information X from the distribution histories stored in the distribution history holding section 15. Based on the distribution histories, the information intervention systems A, C, and D request their preceding and following information intervention systems to trace the transfer and distribution routes of the information X and report the tracing result to the information intervention system B. In addition, each of the systems A, C, and D returns pairs of each of the read distribution histories and its own system identifier to the information intervention system B.

For example, the information intervention system A fetches the distribution histories recorded in the distribution history holding section 15
    sent id-X to id-B at T1
    sent id-X to id-F at T6
and requests the information intervention systems B and F to trace the transfer and distribution routes of the information X and report the tracing result to the information intervention system B. In addition, it returns the history information consisting of the distribution histories and its system identifier in pairs
    id-A: sent id-X to id-B at T1
    id-A: sent id-X to id-F at T6
to the information intervention system B.

Likewise, the information intervention system F, which receives the request from the information intervention system A, returns the history information
    id-F: received id-X from id-A
to the information intervention system B. At this time, the information intervention system F requests the information intervention system to trace the transfer and distribution route of the information X and report the tracing result to the information intervention system B. However, As described in the flowchart of the information tracing processing in the first embodiment of the invention shown in FIG. 10, the tracing instruction id is used to check a process loop, thus the information intervention system A does not perform duplicate information tracing processing, whereby an infinite loop of a request between the information intervention systems can be prevented.

Likewise, each of the information intervention systems C, D, and E returns pairs of each of the distribution histories recorded in the distribution history holding section 15 and the system identifier to the information intervention system B. The information intervention system B stores the history information sent from the information intervention systems in the collected history holding section 17. Finally, the following history information
    id-B: received id-X from id-A
    id-B: sent id-X to id-C at T2
    id-B: sent id-X to id-D at T3
    id-C: received id-X from id-B
    id-C: sent id-X to id-D at time T4
    id-D: received id-X from id-B
    id-D: received id-X from id-C
    id-D: sent id-X to id-E at time T5
    id-E: received id-X from id-D
    id-A: sent id-X to id-B at time T1
    id-A: sent id-X to id-F at time T6
    id-F: received id-X from id-A is
stored in the collected history holding section 17 of the information intervention system B.

A tracing analysis section 18 of the information intervention system B analyzes the history information, thereby determining all distribution routes of the information X and displaying the analysis result on a tracing result display section 19. An example analysis method is as follows:

As the distribution histories are recorded as described above, a history is recorded in both destination and source systems in one distribution. That is, the history information stored in the collected history holding section 17 contains duplicate information indicating the same fact. Thus, it is sufficient to use only either of them for analyzing the distribution route. For example, only the history information related to "sent" can be selected from the above-mentioned history information for use. The selected history information is as follows:
    id-B: sent id-X to id-C at T2
    id-B: sent id-X to id-D at T3
    id-C: sent id-X to id-D at time T4
    id-D: sent id-X to id-E at time T5
    id-A: sent id-X to id-B at time T1
    id-A: sent id-X to id-F at time T6
Of course, only the history information related to "received" can be selected for use.

Next, the system identifiers are extracted from the selected history information and nodes are prepared for them. Here, the six nodes id-A, id-B, id-C, id-D, id-E, and id-F can be prepared. Further, the following arcs are prepared from the history information:
    id-B → id-C at T2
    id-B → id-D at T3
    id-C → id-D at T4
    id-D → id-E at T5
    id-A → id-B at T1
    id-A → id-F at T6
The analysis is now complete and the result is displayed on the tracing result display section 19.

Figure 22:
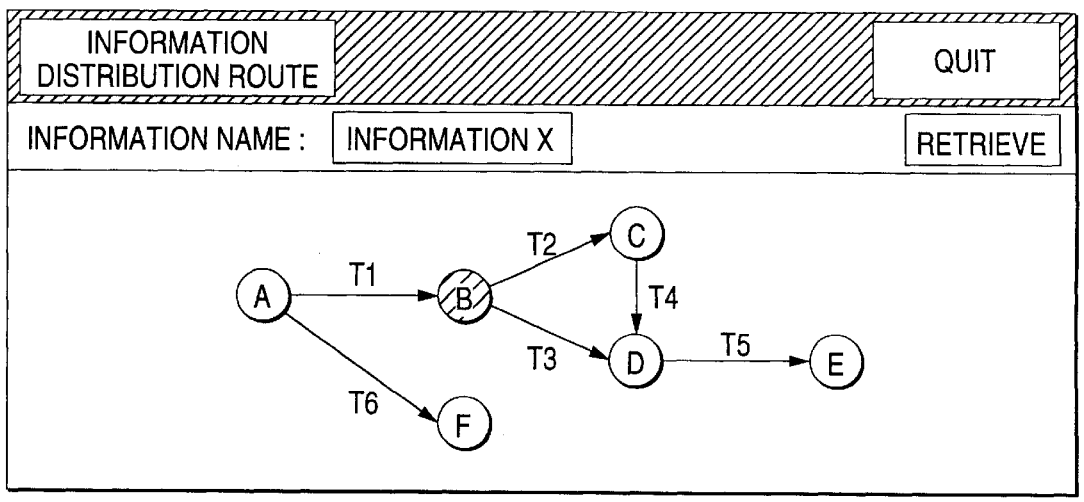
FIG. 22 is an illustration of an example of display produced by a tracing result display section in the third embodiment of the information processing system of the invention.

FIG. 22 is an illustration of an example of display of the tracing result display section in the third embodiment of the information processing system of the invention. The display form in FIG. 21 is similar to that in FIG. 15. According to the result of the analysis using the history information collected in the collected history holding section 17 of the information intervention system B as described above, for example, the distribution route of the information X can be displayed as shown in FIG. 22. Nodes are indicated by circles and arcs are indicated by arrows. The distribution time of day is displayed near each arrow. The node indicating the information intervention system B differs from other nodes in display way so that the information intervention system starting the tracing can be seen.

By seeing such display, the user can grasp the entire distribution routes and distribution ranges of the information X. The distribution time display enables the user to know the distribution timing as to whether distribution of the information X from the information intervention system D to the information intervention system E, for example, was executed after distribution from the information intervention system B or C or both systems.

Fourth embodiment:

Next, a fourth embodiment of the information processing system capable of tracing distribution information of an information distribution route, distribution range, distribution amount, etc. of the invention will be discussed. In the embodiment, histories related to information prepared or changed by the user are also recorded, whereby if information is modified in an intermediate point of distribution of the information, it can be traced throughout the information distribution route containing the modification.

The embodiments we have discussed assume that information is distributed via a large number of information intervention systems with the original information intact without modification, and the distribution route of the information is traced. However, in the fourth embodiment, if information is modified in an intermediate point of distribution of the information or new information is prepared based on several information items, not only the modified information, but also integration of the original information and the modified information can be traced.

Figure 23:
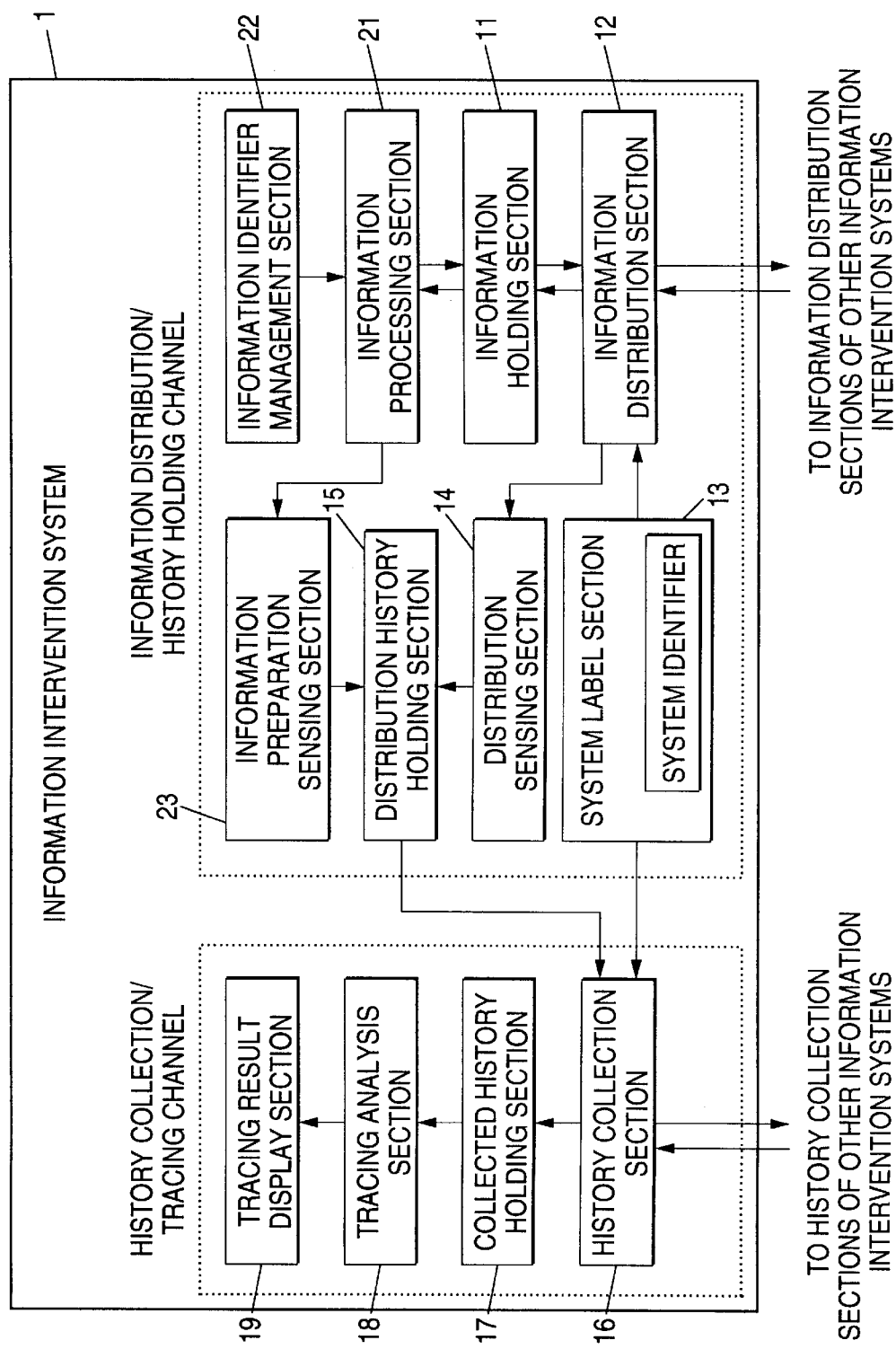
FIG. 23 is a block diagram to show a fourth embodiment of the information processing system of the invention.

FIG. 23 is block diagrams to show a fourth embodiment of the information processing system of the invention. Sections identical with or similar to those previously described with reference to FIG. 1 are denoted by the same reference numerals in FIG. 23 and will not be discussed again. In FIG. 23, numeral 21 designates an information processing section; numeral 22, an information identifier management section; and numeral 23, an information preparation sensing section. The fourth embodiment is similar to the first to third embodiments in basic configuration; the information identifier management section 22 for giving a new information identifier to information when the information is prepared or modified and the information preparation sensing section 23 for sensing information preparation or modification and storing its history information in a distribution history holding section may be added to the configuration shown in FIG. 1. The information processing section 21 is a section for generally processing information and here for preparing, modifying, etc., information.

When information is prepared or modified, the information identifier management section 22 gives a new information identifier to the information. Information identifiers are managed so that they are not duplicate with those given by other information intervention systems. As an possible information identifier management method, for example, a combination of the system identifier held in each information intervention system and a serial number given to information prepared or changed through the information intervention system is used as the information identifier of the information. For example, if the system identifier is 6892678, it is combined with the serial numbers to information prepared or changed on the information intervention system to produce 6892678-1, 6892678-2, 6892678-3, . . . used as the information identifiers, whereby duplication of the identifiers for information can be avoided.

The information preparation sensing section 23 monitors the information processing section 12 for sensing information preparation or modification, and stores its preparation history in a distribution history holding section 15. For example, if information whose information identifier is W is prepared at time T1, the following preparation history created W at T1 is stored in the distribution history holding section 15. If information whose information identifier is P is prepared based on information whose information identifier is Q at time T2, the preparation history created P from Q at T2 is stored in the distribution history holding section 15.

Figure 24:
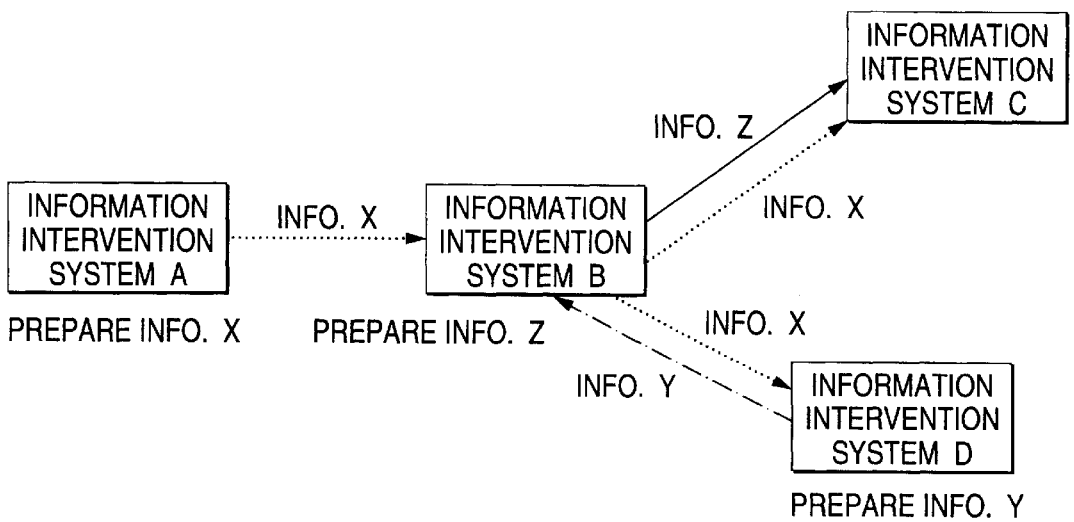
FIG. 24 is an illustration of an example of an information flow in the fourth embodiment of the information processing system of the invention.

Next, the operation in the fourth embodiment of the information processing system of the invention will be outlined. FIG. 24 is an illustration of an example of an information flow in the fourth embodiment of the information processing system of the invention, wherein the dotted lines denote a flow of information X, the alternate long and short dash line denotes a flow of information Y, and the solid line denotes a flow of information Z.

Like FIG. 4, FIG. 24 shows four information intervention systems A–D, wherein information X is prepared in the information intervention system A and is distributed from the information intervention system A to the information intervention system B from which it is distributed to the information intervention systems C and D. In the embodiment, after such distribution, the information X is modified to prepare information Y in the information intervention system D and the information Y is distributed to the information intervention system B. Further, the information Y is modified to prepare information Z in the information intervention system B and the information Z is distributed to the information intervention system C.

Figure 25:
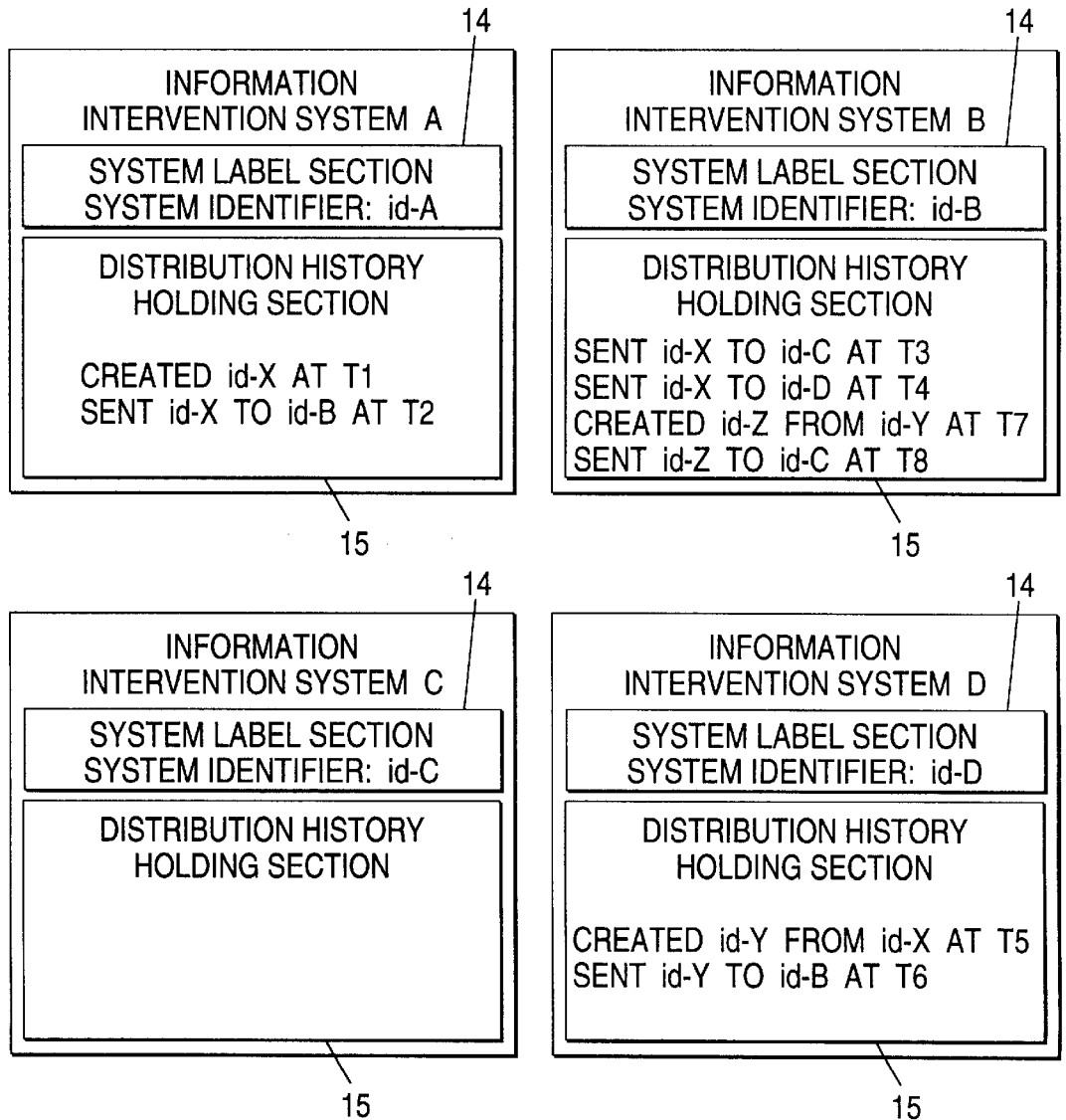
FIG. 25 is an illustration of an example after information distribution in the fourth embodiment of the information processing system of the invention.

FIG. 25 is an illustration of an example after information distribution in the fourth embodiment of the information processing system of the invention. When information distribution as shown in FIG. 24 is executed, distribution and preparation histories are recorded in the distribution history holding sections 15 of the information intervention systems A–D. At this time, the distribution histories are stored as in the first embodiment. Of course, they can also be recorded as in the second or third embodiment.

First, the information X is prepared in the information intervention system A. When the information X is prepared in the information processing section 21, the information identifier management section 22 gives information identifier id-X to the prepared information X. The information preparation sensing section 23 senses preparation of the information X in the information processing section 21, prepares the preparation history created id-X at T1 from the information identifier id-X of the information X and the preparation time T1, and records it in the distribution history holding section 15. As in the first embodiment, the distribution history of the information X sent id-X to id-B at T2 is recorded in the distribution history holding section 15 of the information intervention system A and the distribution histories of the information X sent id-X to id-C at T3
sent id-X to id-D at T4 are recorded in the distribution history holding section 15 of the information intervention system B.

Since the information Y is prepared based on the information X in the information intervention system D, the preparation history created id-Y from id-X at T5 is recorded in the distribution history holding section 15 of the information intervention system D and as the information Y is distributed to the information intervention system B, the distribution history of the information Y sent id-Y to id-B at T6 is also recorded therein.

Since the information Z is prepared based on the information Y received from the information intervention system C in the information intervention system B and is distributed to the information intervention system D, further the following preparation and distribution histories created id-Z from id-Y at T7 sent id-Z to id-D at T8 are recorded in the distribution history holding section 15 of the information intervention system B.

Finally, as shown in FIG. 25, the preparation and distribution histories are recorded in the distribution history holding sections 15 of the information intervention systems A–D.

Next, transfer and distribution route tracing processing of the information X and its modified information from the information intervention system A will be discussed with the example shown in FIG. 25. When a transfer and distribution route tracing instruction of the information X and its modified information is given in the information intervention system A, the information intervention systems perform similar processing to that shown in the first embodiment.

Only the information X is traced in the first embodiment; in the fourth embodiment, if a preparation history based on the information X exists, subsequently prepared information is also traced.

Specifically, when the information intervention system B instructs the information intervention system D to trace the information X, the information intervention system D fetches the preparation history created id-Y from id-X at T5 from the distribution history holding section 15 and fetches the distribution history related to the information identifier id-Y, then starts tracing the information Y as in the first embodiment. It instructs the information intervention system B to trace the information Y. The information intervention system B does not contain the distribution history of the information Y, but contains the preparation history based on the information Y created id-Z from id-Y at T7

A history collection section 16 of the information intervention system B fetches the preparation history from the distribution history holding section 15 and based on the preparation history, further fetches the distribution history related to the information identifier id-Z from the distribution history holding section 15 and performs tracing processing for the information Z.

After all, a collected history holding section 17 of the information intervention system A stores the following history information:

id-A: created id-X at T1 id-A: sent id-X to id-B at T2 id-B: sent id-X to id-C at T3 id-B: sent id-X to id-D at T4 id-B: created id-Z from id-Y at T7 id-B: sent id-Z to id-C at T8 id-C: null id-D: created id-Y from id-X at T5 id-D: sent id-Y to id-B at T6

FIG. 26 is an illustration of an example of the contents of the collected history holding section in the fourth embodiment of the information processing system of the invention. The history information collected in the collected history holding section 17 of the information intervention system A as described above may be recorded as character strings as shown above, but can also be recorded as binary data as shown in FIG. 8, for example. FIG. 26 shows representation of history information collected in the collected history holding section 17 as binary data. Each history information entry consists of a collection source system identifier, operation type, target information identifier, original information identifier, destination system identifier, and time.

The operation type in the embodiment is provided for distinguishing "send" from "create" and may be a 1-bit flag. When the operation type is "send," information is stored in the target information identifier, the destination system identifier, and the time. When the operation type is "create," information is stored in the target information identifier, the original information identifier, and the time. If new information is prepared, the original information identifier is made null.

After the history collection, a tracing analysis section 18 of the information intervention system A analyzes the collected history information as in the first embodiment. First, four nodes id-A, id-B, id-C, and id-D are prepared based on the system identifiers of the information intervention systems A–D. Next, arcs are prepared based on the history information having "sent" for each information identifier. The following five arcs are prepared:

id-X: id-A→id-B at T2 id-X: id-B→id-C at T3 id-X: id-B→id-D at T4 id-Z: id-B→id-C at T8 id-Y: id-D→id-B at T6

Further, information modification histories are prepared based on the history information having "created." The following modification histories are prepared:

id-A: null→id-X at T1 id-B: id-Y→id-Z at T7 id-D: id-X→id-Y at T5

The analysis is now complete, then the result is displayed on a tracing result display section 19.

Figure 27:
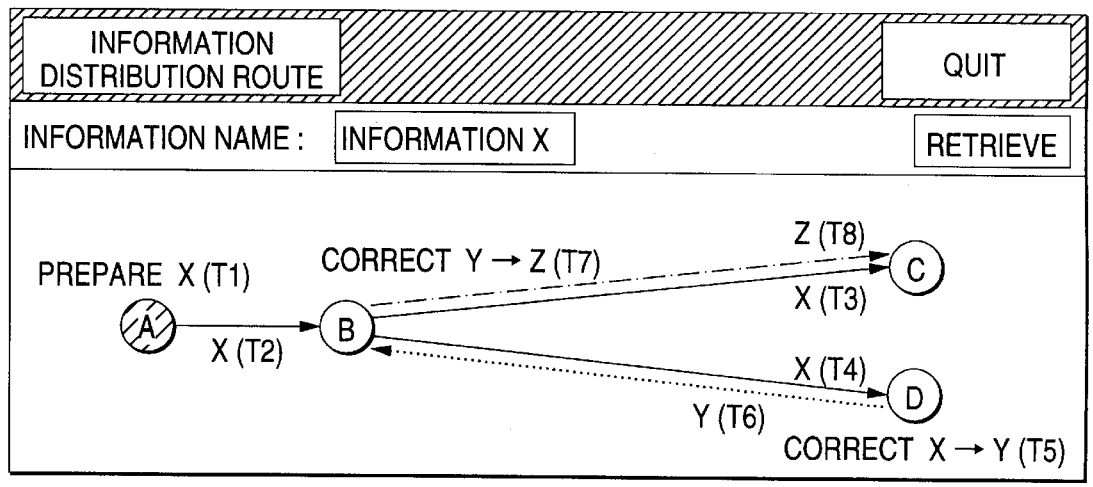
FIG. 27 is an illustration of an example of distribution route display produced by a tracing result display section in the fourth embodiment of the information processing system of the invention.
Figure 28:
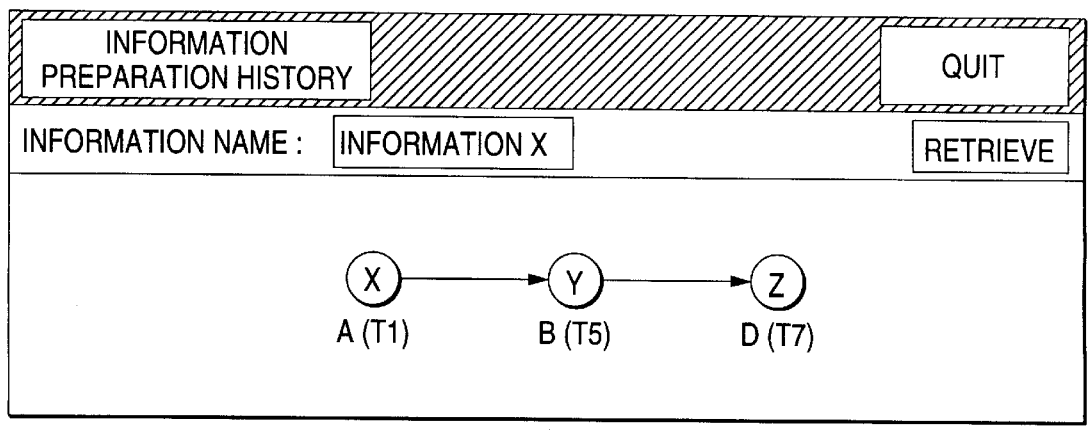
FIG. 28 is an illustration of an example of preparation process display of the tracing result display section in the fourth embodiment of the information processing system of the invention.

FIG. 27 is an illustration of an example of distribution route display of a tracing result display section in the fourth embodiment of the information processing system of the invention. FIG. 28 is an illustration of an example of preparation process display of the tracing result display section in the fourth embodiment of the information processing system of the invention. In information distribution route display, the tracing result of only a single information item is displayed in the first embodiment; the tracing result display section 19 in the fourth embodiment displays trace information and modification histories of more than one information item. Therefore, information items need to be distinguished from each other. As shown in FIG. 27, the information names, such as "X (T2)" and "Y (T6)," are displayed near the arrow lines connecting the information intervention systems, and further the information items are displayed in different line types. This is an example, and various display methods can be used, for example, different colors are used to distinguish the information items. Of course, the tracing result may be displayed separately for each information item as in the first embodiment depending on selection of the user.

As shown in FIG. 28, only information preparation and modification histories may be extracted for display. In the display example shown in FIG. 28, the information items are represented as nodes, which are circled. Information modification based on a preparation history is represented as an arc, which is denoted by an arrow. The display example shown in FIG. 28 means that the information X was prepared in the information intervention system A at the time T1, that the information Y was prepared based on the information X in the information intervention system B at the time T5, and that the information Z was prepared based on the information Y in the information intervention system D at the time T7.

The display forms can be switched whenever necessary as commanded by the user. Any other display form such as a table format may be adopted, needless to say.

In the fourth embodiment, information preparation or modification histories are also recorded in addition to information distribution histories. Further, a detailed information history may be recorded as to how which part of information is modified. In addition, a history related to use of information may be recorded. For example, such a history indicating that information was used by one application may be recorded. In doing so, use of the information by one application can be traced.

Fifth embodiment:

Next, a fifth embodiment of the information processing system capable of tracing distribution information of an information distribution route, distribution range, distribution amount, etc. of the invention will be discussed. In the embodiments we have discussed, information is provided with an information label section in which its information identifier is held. In the fifth embodiment, information does not have an information label section and consists of only an information main body, and an information identifier is calculated from the information main body as required.

Figure 29:
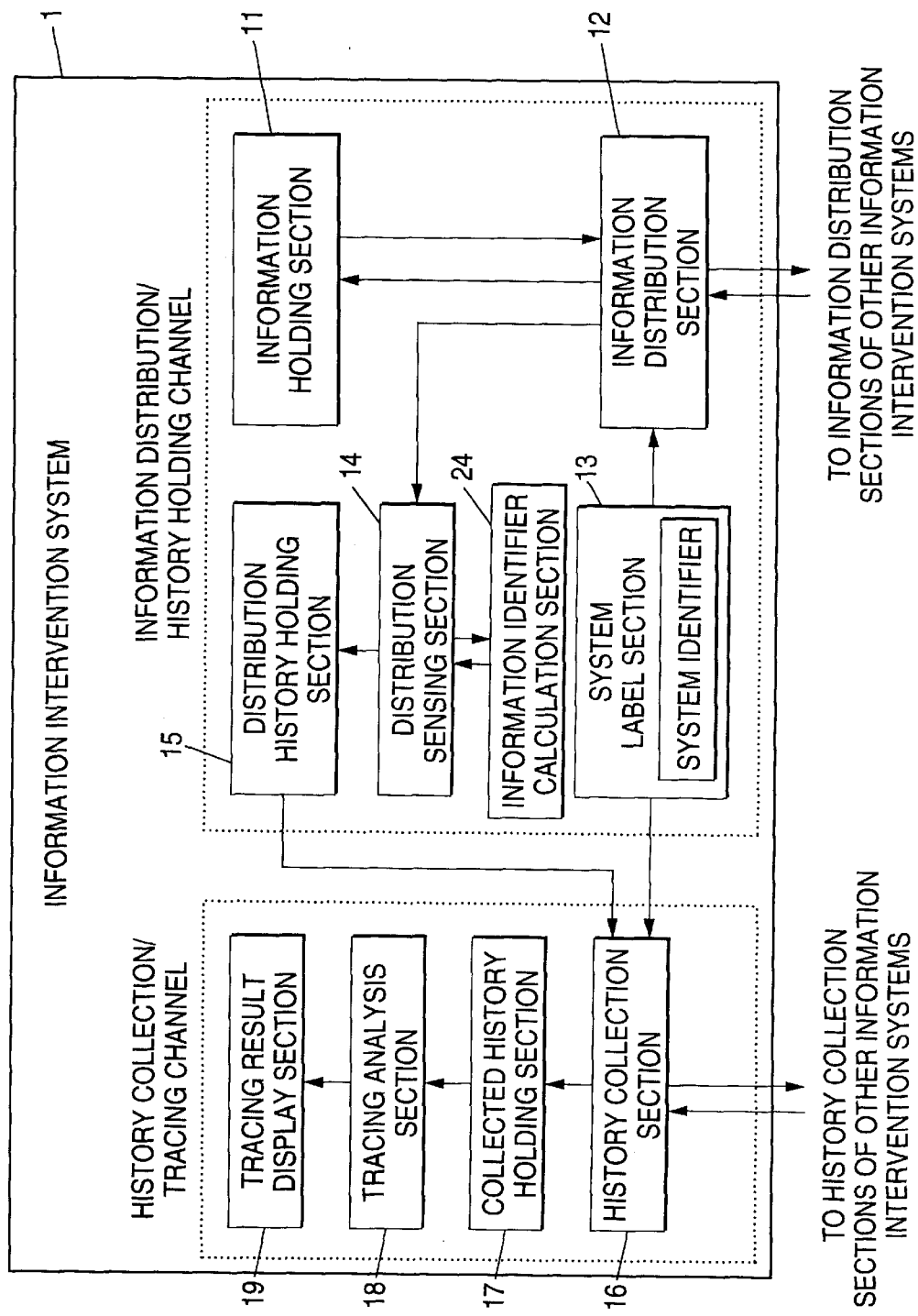
FIG. 29 is a block diagram to show a fifth embodiment of the information processing system of the invention.
Figure 30:
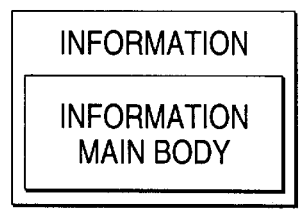
FIG. 30 is an illustration of an example of the format of information in the fifth embodiment of the information processing system of the invention.

FIG. 29 is a block diagram to show the fifth embodiment of the information processing system of the invention. FIG. 30 is an illustration of an example of the format of information in the fifth embodiment of the information processing system of the invention. Sections identical with or similar to those previously described with reference to FIG. 1 are denoted by the same reference numerals in FIG. 29 and will not be discussed again. In FIG. 29, numeral 24 designates an information identifier calculation section. An information intervention system 1 in the fifth embodiment has the information identifier calculation section 24 in addition to the configuration of the first embodiment, as shown in FIG. 29. The information identifier calculation section 24 calculates an information identifier to distinguish one information item from other information items from the information main body. On the other hand, information consists of only an information main body, as shown in FIG. 30.

In the first embodiment, when information is distributed from one system to another, the distribution sensing section 14 records the information identifier of the information in the distribution history holding section 15 of the source information intervention system together with the destination system identifier of the information. At the time, the information identifier held in the information label section of the information is used as the information identifier recorded in the distribution history holding section 15. In contrast, in the fifth embodiment, an information identifier calculated by the information identifier calculation section 24 from the information main body is used as the information identifier recorded in a distribution history holding section 15 when information is distributed.

That is, in the first embodiment, one information X has an information label section in which, for example, information identifier id-X is previously held. When the information X is distributed from the information intervention system A to the information intervention system B, the distribution sensing section 14 of the information intervention system A senses the distribution process and records the information identifier id-X of the distributed information X in the distribution history holding section 15 of the information intervention system A together with the destination system identifier id-B.

In contrast, in the fifth embodiment, information X consists of only the information main body thereof and does not hold an information identifier such as id-X. For example, when the information X is distributed from information intervention system A to information intervention system B, a distribution sensing section 14 of the information intervention system A senses the distribution process and records the information identifier of the distributed information X in the distribution history holding section 15 of the information intervention system A together with the destination system identifier id-B. At this time, the information X does not hold its information identifier, but the information identifier calculation section 24 of the information intervention system A calculates an information identifier of the information X based on the information main body thereof and records the information identifier in the distribution history holding section 15. Assuming that the information identifier of the information X calculated by the information identifier calculation section 24 is id-X', a distribution history is recorded as sent id-X' to id-B at T1 in the distribution history holding section 15 of the information intervention system A as in the first embodiment.

The information identifier calculation section 24 is adapted to calculate and output the same information identifier for the same information regardless of which information intervention system the information identifier calculation section 24 exists in, enabling the information X to be handled as if it held the information identifier id-X'.

Such a configuration enables the invention to also be applied to information having no information label section. Since information does not have an information label section, an event in which the information cannot be processed because the information main body and information label section are separated does not occur.

The information identifier calculation method in the information identifier calculation section 24 may be any if it can calculate, based on an information main body, an information identifier capable of distinguishing one information item from others in an environment to which the invention is applied. For example, a unidirectional hash function often used in cryptographic theories can be used.

The unidirectional hash function is a function for converting a bit string of any length into a bit string of a certain length, and has a feature of scarcely outputting the same value if different bit strings are input. It is often used with cryptographic theories, and has a feature of outputting different values if data is compressed to a certain length and input data is different. This feature can be used to identify information in the embodiment. For example, in OKAMOTO Eiji, "Angou Riron Nyumon (Introduction to Cryptographic Theories)" Kyouritsu Shuppan Kabushikigaisha, 1993, pp.138–140, a large number of specific unidirectional hash function examples are proposed. One of them is SHA (secure hash algorithm). According to the book, the SHA, which is a standard proposal of the unidirectional hash function indicated by Standard Bureau of Department of Commerce in the United States (NIS), outputs 160 bits as a hash value for a message (information to be transmitted) of any length (less than 264 bits). As a hash function example by the SHA, the book describes SHA output of a message consisting of ASCII code of a, b, c 01100001 01100001 01100011 becomes

0164B8A9  14CD2A5E  74C4F7FF  082C4D97  F1EDF880 in 32-bit word units.

The SHA, which is described in detail in the book, comprises the following three steps:
(1) Dividing a message by a certain length;
(2) performing operations of exclusive OR, bit shift, etc., in combination for each message division; and
(3) outputting a hash value based on the operation results at step (2) for all message divisions.

By performing such processing, the information identifier calculation section 24 calculates an information identifier from the information main body. The distribution sensing section 14 uses the information identifier calculated by the information identifier calculation section 24 to prepare a history and records the prepared history in the distribution history holding section 15. Processing of other components is basically similar to that in the first embodiment and will not be discussed again. The fifth embodiment can also be applied to the second to fourth embodiments.

Sixth embodiment:

Next, a sixth embodiment of the information processing system capable of tracing distribution information of an information distribution route, distribution range, distribution amount, etc. of the invention will be discussed. The sixth embodiment enables tracing the information transfer and distribution route and distribution range in user units rather than system units.

Figure 31:
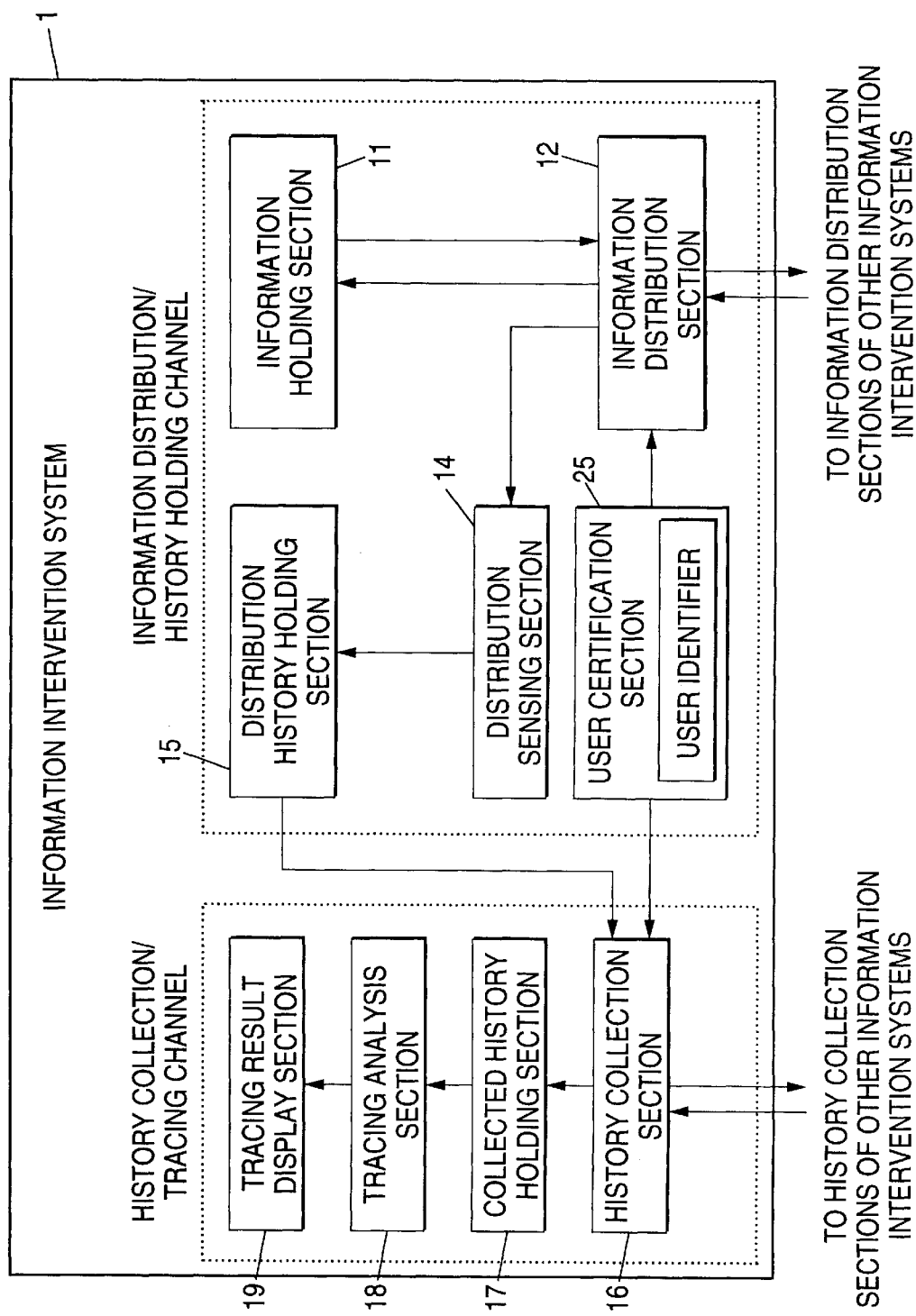
FIG. 31 is a block diagram to show a sixth embodiment of the information processing system of the invention.

FIG. 31 is a block diagram to show the sixth embodiment of the information processing system of the invention. Sections identical with or similar to those previously described with reference to FIG. 1 are denoted by the same reference numerals in FIG. 31 and will not be discussed again. In FIG. 31, numeral 25 designates a user certification section. The basic configuration of an information intervention system 1 is the same as that in the first embodiment except that it includes the user certification section 25 in place of the system label section 13 in the first embodiment.

The user certification section 25 holds the user identifier corresponding to the user. It certifies the user to be valid in an interactive mode if he or she is valid. When certification results in success, the user certification section 25 enables use of the user identifier corresponding to the user. The user certification method may use a conventional technique with passwords, ID cards, etc., for example.

The user identifiers need to be managed so that they are not duplicate with other users in a tracing assumed area. The real format of the user identifier may be similar to the format of the information or system identifier as described so far.

After a user certification process is executed in the user certification section, the subsequent information distribution process and tracing process are almost the same as those in other embodiments except that the user identifiers rather than the system identifiers are used.

Figure 32:
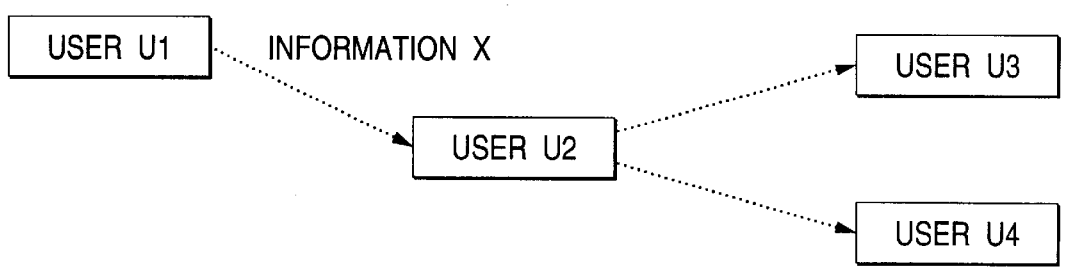
FIG. 32 is an illustration of an example of information flows in the sixth embodiment of the information processing system of the invention.

FIG. 32 is an illustration of an example of information flows in the sixth embodiment of the information processing system of the invention. It resembles the example of information flows in the first embodiment shown in FIG. 4. In the sixth embodiment, information X is distributed from user U1 to user U2 and from user U2 to users U3 and U4.

The processing flow when the user U1 distributes the information X to the user U2 will be simply discussed in relation to the first embodiment. A distribution sensing section 14 monitors an information distribution section 12 and can sense that the user U1 distributes the information X to the user U2. The distribution sensing section 14 of the user U1 senses the distribution process and records the information identifier id-X of the distributed information X in a distributed history holding section 15 of the user U1 together with the destination user identifier id-U2, for example, as a distribution history like sent id-X to id-U2 at T1

This distribution history means that the user U1 with the user identifier id-U1 distributed the information X with the information identifier id-X to the user U2 with the user identifier id-U2 at the time T1.

Next, an information tracing process flow will be simply discussed. When a transfer and distribution route tracing instruction of the information X is given from the user U1, a history collection section 16 of the user U1 reads distribution histories related to the information identifier id-X of the information X from the distribution histories stored in the distribution history holding section 15. In the example, the history information sent id-X to id-U2 at T1 is found. Then, the user U2 with the user identifier id-U2 is requested to trace the transfer and distribution route of the information X and report the tracing result to the user U1. In addition, the distribution history and the user identifier id-U1 of the user U1 are stored in a collected history holding section 17 in a pair. Such a process is repeated, whereby the history information based on the users is collected in the collected history holding section 17. The collected history information is analyzed, whereby information tracing based on the users can be executed.

Figure 33:
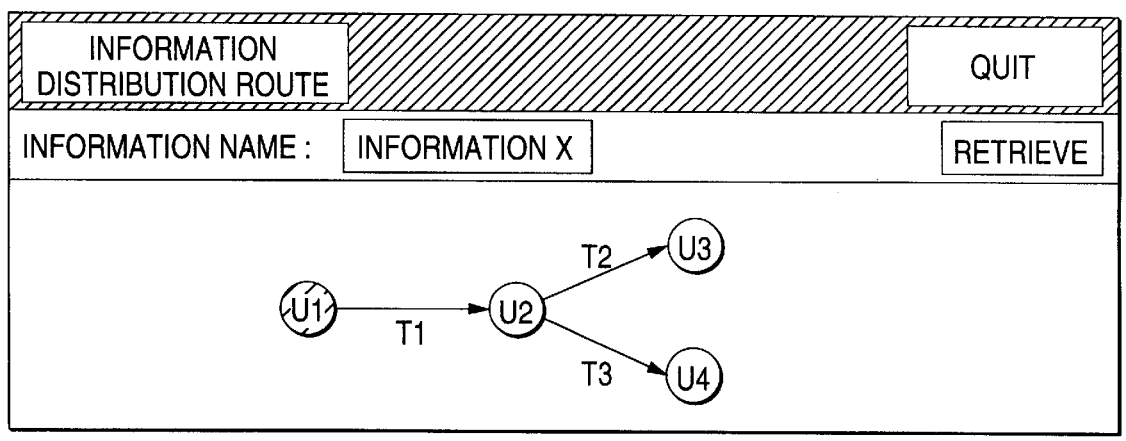
FIG. 33 is an illustration of an example of display produced by a tracing result display section in the sixth embodiment of the information processing system of the invention.

FIG. 33 is an illustration of an example of display of a tracing result display section in the sixth embodiment of the information processing system of the invention. In the sixth embodiment, the user identifiers are extracted from the history information collected in the collected history holding section 17, and are used as nodes. Arcs are prepared from the history information. Thus, the nodes represent the users as compared with the display example in the first embodiment shown in FIG. 15.

In the sixth embodiment, the information intervention systems are provided in a one-to-one correspondence with the users. However, a number of users often share a workstation, etc. In this case, a virtual information intervention system for each user may be constructed in the workstation. Such a virtual information intervention system can also be applied, for example, when the user uses a number of workstations on a network.

The configuration for using the user identifiers shown in the sixth embodiment can be applied not only to the first embodiment, but also to the second to fifth embodiments.

Seventh embodiment:

Next, a seventh embodiment of the information processing system capable of tracing distribution information of an information distribution route, distribution range, distribution amount, etc. of the invention will be discussed. In the embodiments discussed so far, information exchange connected by networks have mainly been described. However, information distribution is not limited to it. Information exchange disconnected from a network, for example, information distribution via information media disconnected from a network such as floppy disk may often be executed.

In this case, a problem is a broken link between the source and destination when information is distributed via information media. The source party can write information onto media without determining any destination and pass to nonspecific destinations. The information receiving party (destination) cannot locate the source of the information simply by seeing the information.

To solve the problem, either of the following two methods can be adopted:
(1) Information is provided with a distribution history holding section for writing a distribution history consisting of a source system identifier and time of day; or (2) A medium is provided with a distribution history holding section for writing a distribution history consisting of a source system identifier and time of day.

These two methods differ only in distribution history holding location.

Figure 34:
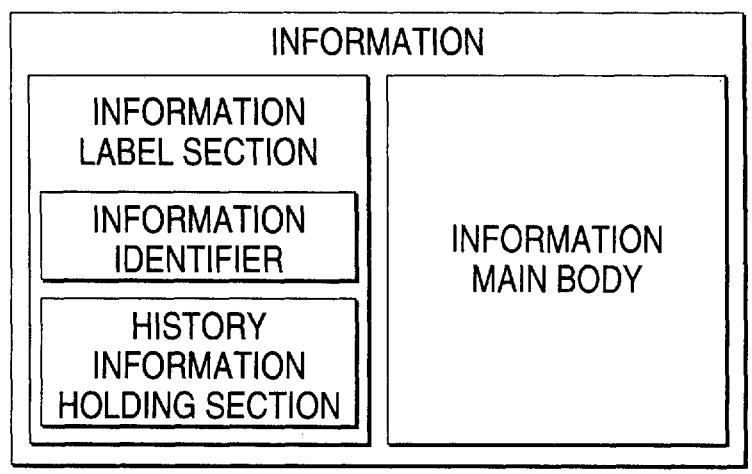
FIG. 34 is an illustration to show an example of the format of information when the information is provided with a distribution history in the seventh embodiment of the information processing system of the invention.

First, the method of providing information with a distribution history holding section for writing a distribution history consisting of a source system identifier and time of day will be discussed. FIG. 34 is an illustration to show an example of the format of information when information is provided with a distribution history in the seventh embodiment of the information processing system of the invention. To hold a distribution history in information, a history information holding section is provided in an information label section of information stored on an information medium, as in the example shown in FIG. 34. When information is recorded on an information medium, a distribution history consisting of the source system identifier and the time of day is written into the history information holding section in the information label section of the recorded information. At the destination, where the information was distributed from can be known by seeing the distribution history recorded in the history information holding section in the information label section of the information.

Figure 35:
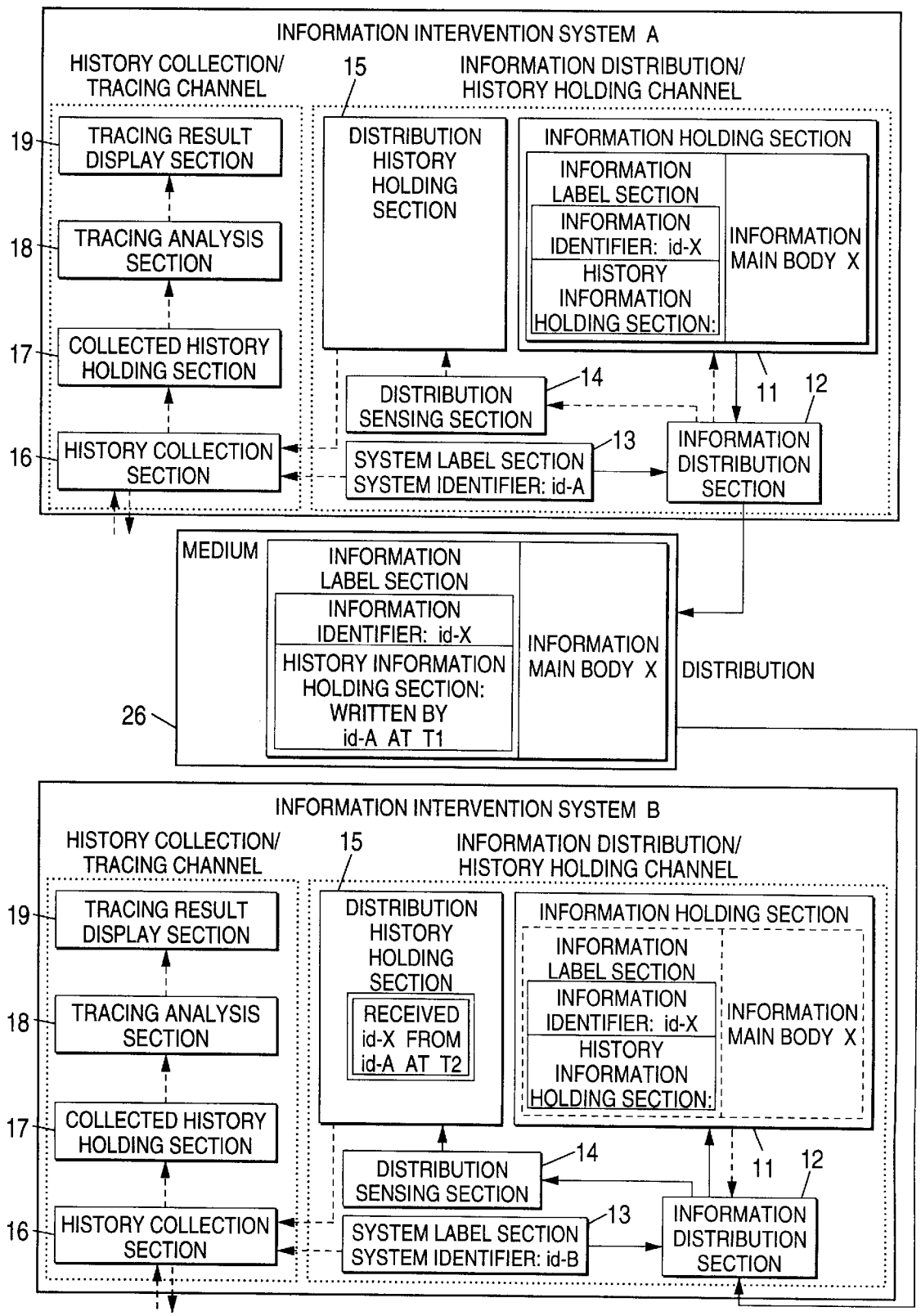
FIG. 35 is an illustration of an example of the information distribution operation when information is provided with a distribution history in the seventh embodiment of the information processing system of the invention.

FIG. 35 is an illustration of an example of the information distribution operation when information is provided with a distribution history in the seventh embodiment of the information processing system of the invention. Sections identical with or similar to those previously described with reference to FIG. 17 are denoted by the same reference numerals in FIG. 35 and will not be discussed again. In FIG. 35, numeral 26 designates an information medium. Information in the format as shown in FIG. 34 is recorded on the information medium 26.

When information is recorded on the information medium 26, a distribution sensing section 14 of the source system senses that the information is distributed to the information medium 26 and the source information intervention system writes a distribution history in the form "written by id-A at T1"

into the history information holding section of the information, where id-A is the system identifier of the source information intervention system and T1 is the time of day.

When the information is distributed from the information medium 26 to a destination information intervention system, a distribution sensing section 14 of the destination system senses that the information is distributed from the information medium 26, and sees the distribution history recorded in the history information holding section of the distributed information for knowing where the information is distributed from. Based on the known fact, for example, the distribution history "received id-X from id-A at T2"

is written into a distribution history holding section 15 of the destination information intervention system. The subsequent operation is similar to that in the second embodiment, for example.

After the information is received at the destination and the history is recorded in the distribution history holding section 15 of the destination system, the distribution history held in the history information holding section of the information may be erased. However, if there is a possibility that it will be distributed to another information intervention system, the distribution history may be left intact until the information is erased.

Figure 36:
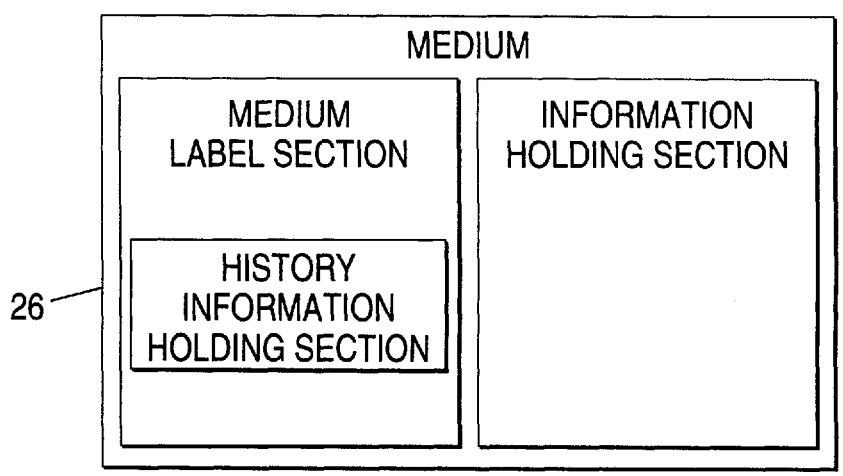
FIG. 36 is an illustration to show an example of the format of information when an information medium is provided with a distribution history in the seventh embodiment of the information processing system of the invention.

Next, the method of providing an information medium with a history information holding section for writing a distribution history consisting of a source system identifier and time of day will be discussed. FIG. 36 is an illustration to show an example of the format of information when an information medium is provided with a distribution history in the seventh embodiment of the information processing system of the invention. To hold a distribution history in an information medium 26, a medium label section is provided in the information medium 26 and a history information holding section is provided in the medium label section, for example, as shown in FIG. 36. When information is recorded on the information medium 26, a distribution history consisting of the information identifier, the source system identifier, and the time of day is written into the history information holding section in the medium label section of the information medium 26. At the destination, the distribution history recorded in the history information holding section in the medium label section of the information medium 26 is seen, whereby where which information was distributed from can be known.

Figure 37:
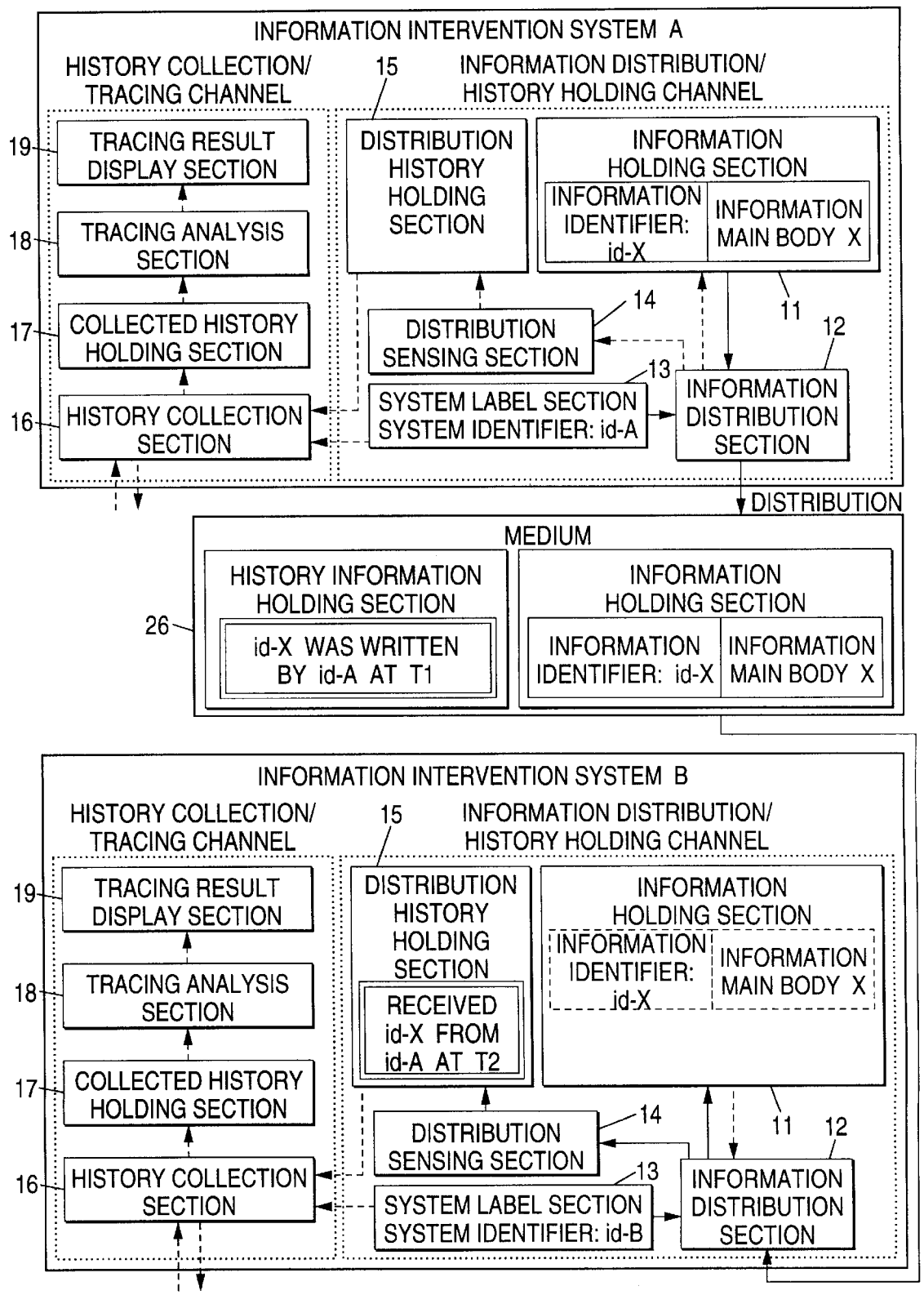
FIG. 37 is an illustration of an example of the information distribution operation when an information medium is provided with a distribution history in the seventh embodiment of the information processing system of the invention.

FIG. 37 is an illustration of an example of the information distribution operation when an information medium is provided with a distribution history in the seventh embodiment of the information processing system of the invention. Sections identical with or similar to those previously described with reference to FIG. 35 are denoted by the same reference numerals in FIG. 37. When information is recorded on an information medium 26, the distribution sensing section 14 of the source system senses that the information is recorded on the information medium 26 and the source information intervention system writes, for example, the distribution history "id-X was written by id-A at T1"

into the history information holding section of the information medium 26, where id-X is the information identifier of the information, id-A is the system identifier of the source information intervention system, and T1 is the time of day.

When the information is distributed from the information medium 26 to a destination information intervention system, the distribution sensing section 14 of the destination system senses that the information is distributed from the information medium 26, and sees the distribution history recorded in the history information holding section of the information medium 26 for knowing where the information is distributed from. For example, the distribution history "received id-X from id-A at T2"

is written into the distribution history holding section 15 of the destination information intervention system. The subsequent operation is similar to that in the second embodiment, for example.

Figure 38:
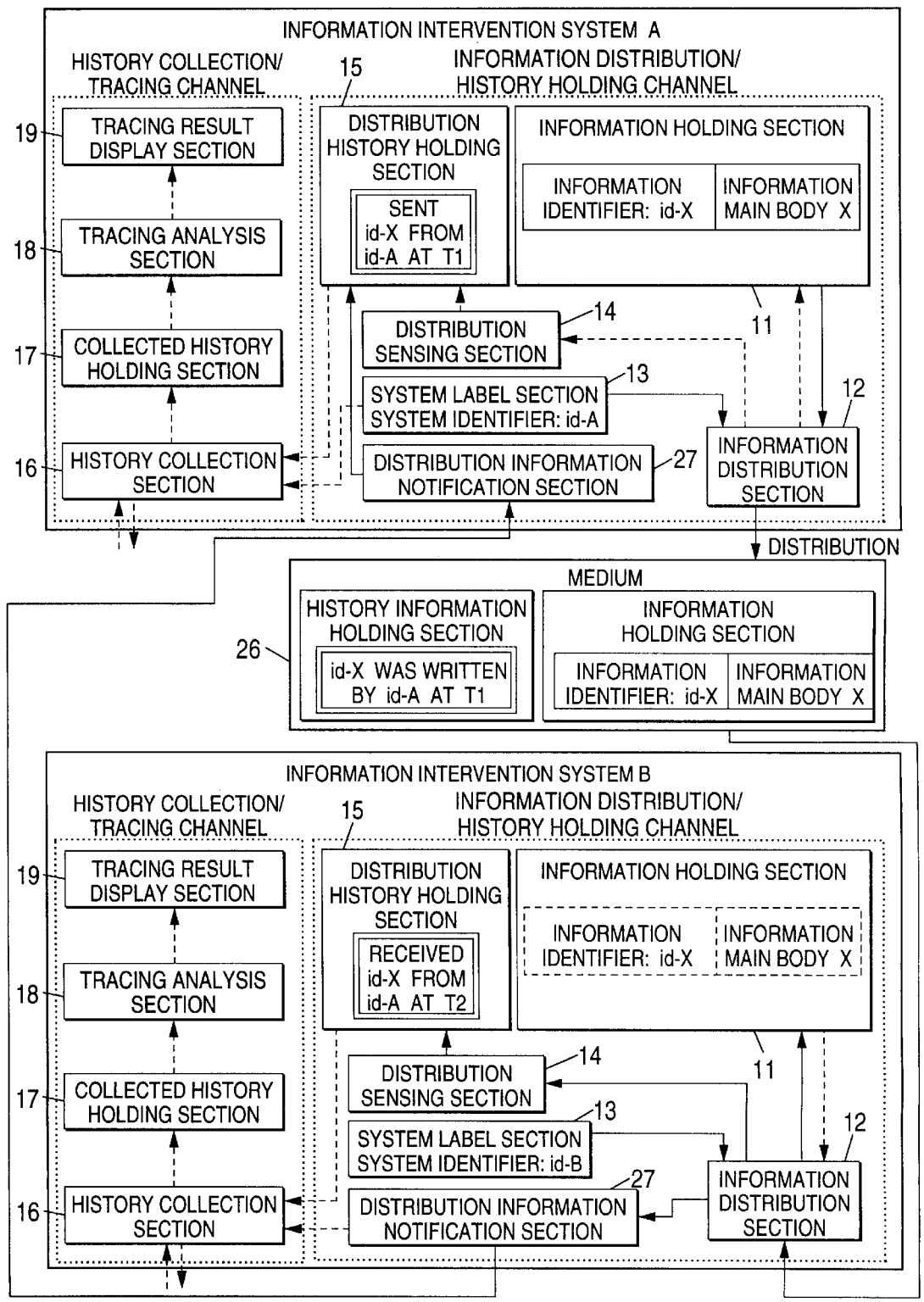
FIG. 38 is an illustration of an example of the information distribution operation in an eighth embodiment of the information processing system of the invention.

In this method, information such as the information source system identifier is written into the distribution history holding section 15 of the destination information intervention system. Then, to further record the information destination system identifier in the distribution history holding section of the source information intervention system, when information is received at the destination information intervention system, the destination information intervention system can also inform the source information intervention system of reception of the information. An example for this purpose is given below:

FIG. 38 is an illustration of an example of the information distribution operation in an eighth embodiment of the information processing system capable of tracing distribution information of an information distribution route, distribution range, distribution amount, etc. of the invention. Sections identical with or similar to those previously described with reference to FIG. 37 are denoted by the same reference numerals in FIG. 38 and will not be discussed again. In FIG. 38, numeral 27 designates a distribution information notification section. The eighth embodiment assumes that information is distributed as with the case where an information medium is provided with a distribution history in the seventh embodiment.

The distribution information notification section 27 transfers information to and from distribution information notification sections 27 of other information intervention systems. It can see a distribution history recorded in a history information holding section of an information medium 26 for knowing where the information is distributed from. Then, the distribution information notification section 27 notifies the source information intervention system of reception of the information. The distribution information notification section 27 of the source information intervention system receives the information reception notification from the distribution information notification section 27 of the destination information intervention system and stores a distribution history in a distribution history holding section 15.

Now, assume that information is distributed from an information medium 26 to a destination. As in the seventh embodiment, when the information is distributed from the information medium 26 to the destination information intervention system, a distribution sensing section 14 of the destination system senses that the information is distributed from the information medium 26, and writes, for example, the distribution history "received id-X from id-A at T2"

into a distribution history holding section 15 of the destination information intervention system. In the eighth embodiment, when sensing that the information is distributed from the information medium 26, the distribution sensing section 14 of the destination system records the distribution history in the distribution history holding section 15 and notifies the distribution information notification section 27, which then sees the distribution history recorded in the history information holding section of the information medium 26 for knowing where the information is distributed from, and notifies the source information intervention system of reception of the information.

Since the source information intervention system can know the information destination from the notification from the destination system, the distribution information notification section 27 receiving the notification writes, for example, the distribution history "sent id-X to id-B at T1"

into the distribution history holding section 15 of the source information intervention system. In this case, as in the third embodiment, the distribution information is stored in both the source and destination systems. Thus, the subsequent operation is similar to that in the third embodiment.

In the eighth embodiment, without writing a distribution history into the distribution history holding section 15 of the destination information intervention system, the distribution information notification section 27 notifies the source information intervention system of reception of information and the distribution history can also be held in the distribution history holding section 15 of the source information intervention system. In this case, the distribution history is stored in the source system, as in the first embodiment. By using the eighth embodiment, even if information is distributed to a number of information intervention systems via an information medium 26, its distribution histories are stored in the source system. In this case, the subsequent operation is similar to that in the first embodiment.

In the seventh and eighth embodiments, preparation histories can also be held, information identifiers can also be calculated from information main bodies, or user identifiers can also be used as in the fourth to sixth embodiments.

Figure 39:
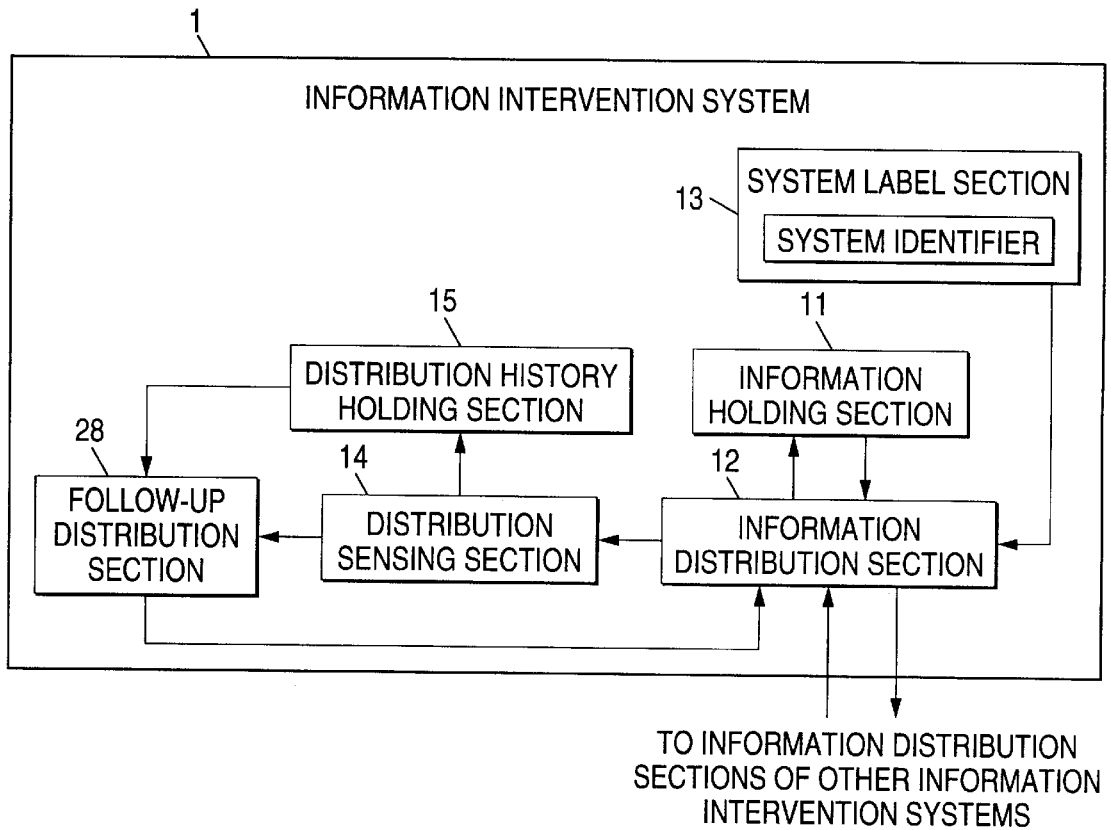
FIG. 39 is a block diagram to show a ninth embodiment of the information processing system of the invention.

FIG. 39 is a block diagram to show a ninth embodiment of the information processing system capable of tracing distribution information of an information distribution route, distribution range, distribution amount, etc. of the invention. Sections identical with or similar to those previously described with reference to FIG. 1 are denoted by the same reference numerals in FIG. 39 and will not be discussed again. In FIG. 39, numeral 28 is a follow-up distribution section. In the ninth embodiment of the invention, different information, called second information, can be distributed following already distributed information, called first information.

An information intervention system 1 has an information holding section 11, an information distribution section 12, a system label section 13, a distribution sensing section 14, a distribution history holding section 15, and a follow-up distribution section 28. The information intervention system 1 in the embodiment does not have history collection/trace channel components. Of course, it may comprise these components. As the hardware configuration, for example, the configuration as shown in FIG. 3 can be used as in the first embodiment.

The distribution sensing section 14 keeps constant watch on the information distribution section 12 as to whether or not the information distribution section 12 exchanges information with any other information intervention system. When the information distribution section 12 exchanges information, the distribution sensing section 14 senses information concerning the exchange and records it in the distribution history holding section 15 as a distribution history related to the distribution of the information. The function of the distribution sensing section 14 in the ninth embodiment is the same as that in other embodiments. In the ninth embodiment, the distribution sensing section 14 furthermore determines whether or not the sensed information is follow-up information following already distributed information and if the sensed information is follow-up information, notifies the follow-up distribution section 28 that the follow-up information has been received.

When the follow-up distribution section 28 is instructed to distribute second information following first information, it reads the distribution history concerning the first information from the distribution history holding section 15 and requests the information distribution section 12 to distribute the second information as follow-up information. When follow-up information is distributed from another information intervention system, the follow-up distribution section 28 is notified of the distribution of the follow-up information and reads the distribution history of the followed information from the distribution history holding section 15, then requests the information distribution section 12 to again distribute the distributed follow-up information.

Figure 40:
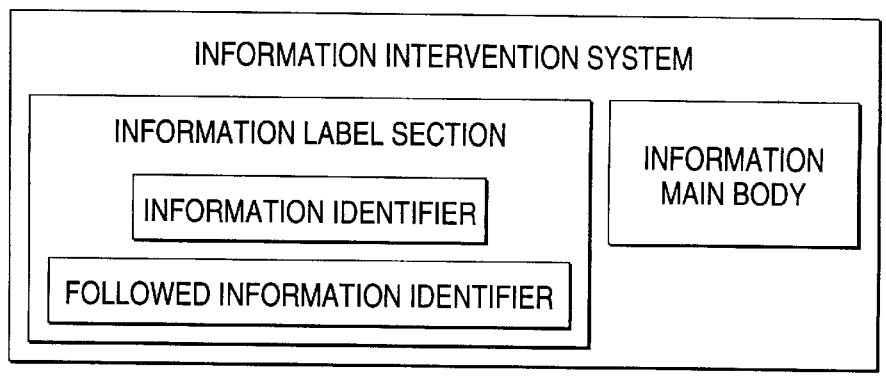
FIG. 40 is an illustration to show an example of the format of information in the ninth embodiment of the information processing system of the invention.

FIG. 40 is an illustration to show an example of the format of information in the ninth embodiment of the information processing system of the invention. As shown here, the information has an information label section for holding an information identifier to identify the information and a followed information identifier to identify the followed information as well as an information main body. The information shown in FIG. 40 is the same as that shown in FIG. 2 except that the information label section holds a followed information identifier. The followed information identifier may be any if it can distinguish the information indicated by the followed information identifier from any other information; it may be represented by a pair of machine name and file name in addition to digits, etc.

Next, the operation in the ninth embodiment of the information processing system of the invention will be outlined. Here, assume that information is distributed as shown in FIG. 4 as in the first embodiment. Information intervention system A senses distribution of information X to information intervention system B and records a distribution history of the information X in the distribution history holding section 15. Likewise, the information intervention system B senses distribution of the information X to information intervention systems C and D and records two distribution histories in the distribution history holding section 15.

Next, when an instruction for distributing information Y so as to follow the information X is given in the information intervention system A, the distribution history of the information X is read out from the distribution history holding section 15 of the information intervention system A and the information Y as information X follow-up information is distributed to the information intervention system B to which the information X was distributed. In the information intervention system B receiving the information Y, the distribution sensing section 14 determines that the information Y is information X follow-up information, reads out the distribution history of the information X from the distribution history holding section 15 of the information intervention system B, and distributes the information Y to the information intervention systems C and D to which the information X was distributed. In each of the information intervention systems C and D receiving the information Y, the distribution sensing section 14 determines that the information Y is information X follow-up information and attempts to read out the distribution history of the information X from the distribution history holding section 15 of the information intervention system B. However, the distribution history of the information X does not exist in the information intervention system C or D, thus the information Y is not distributed any more. Thus, the information Y can be distributed so as to follow the information X distributed from the information intervention system A to the information intervention system B via which to the information intervention systems C and D.

Figure 41:
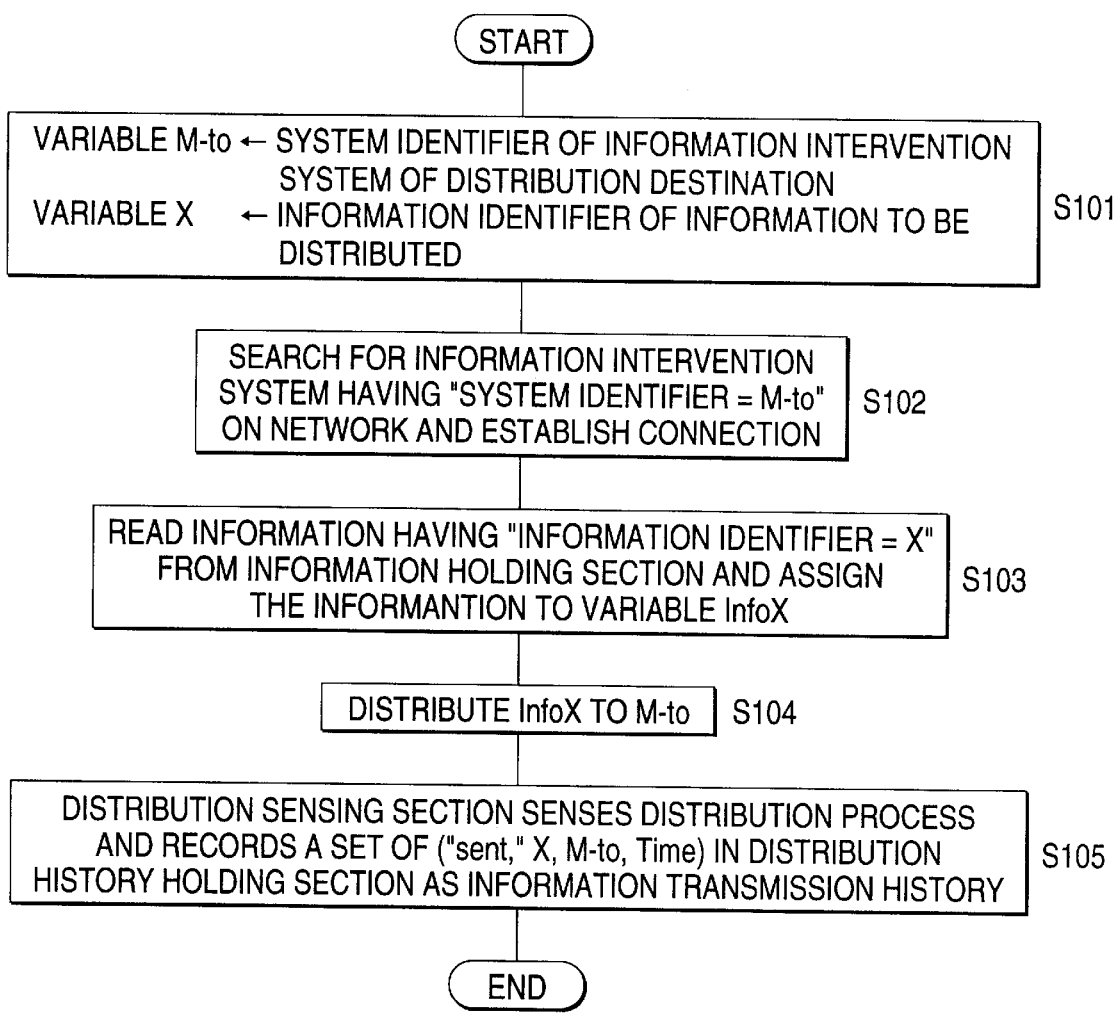
FIG. 41 is a flowchart to show an example of processing in an information mediation system of a distribution source at the information distribution time in the ninth embodiment of the information processing system of the invention.

A processing flow as described above will be discussed in detail. FIG. 41 is a flowchart to show an example of processing in an information intervention system of a distribution source at the information distribution time in the ninth embodiment of the information processing system of the invention. The information distribution process is the same as the process previously described with reference to FIG. 5 (steps S101 to S105 correspond to S41 to S45 in FIG. 5) except that a set of ("sent," X, M-to, Time) where "sent" denotes that the history is a transmission history and Time denotes the distribution time of day is recorded in the distribution history holding section 15 as an information transmission history at step S105.

Figure 42:
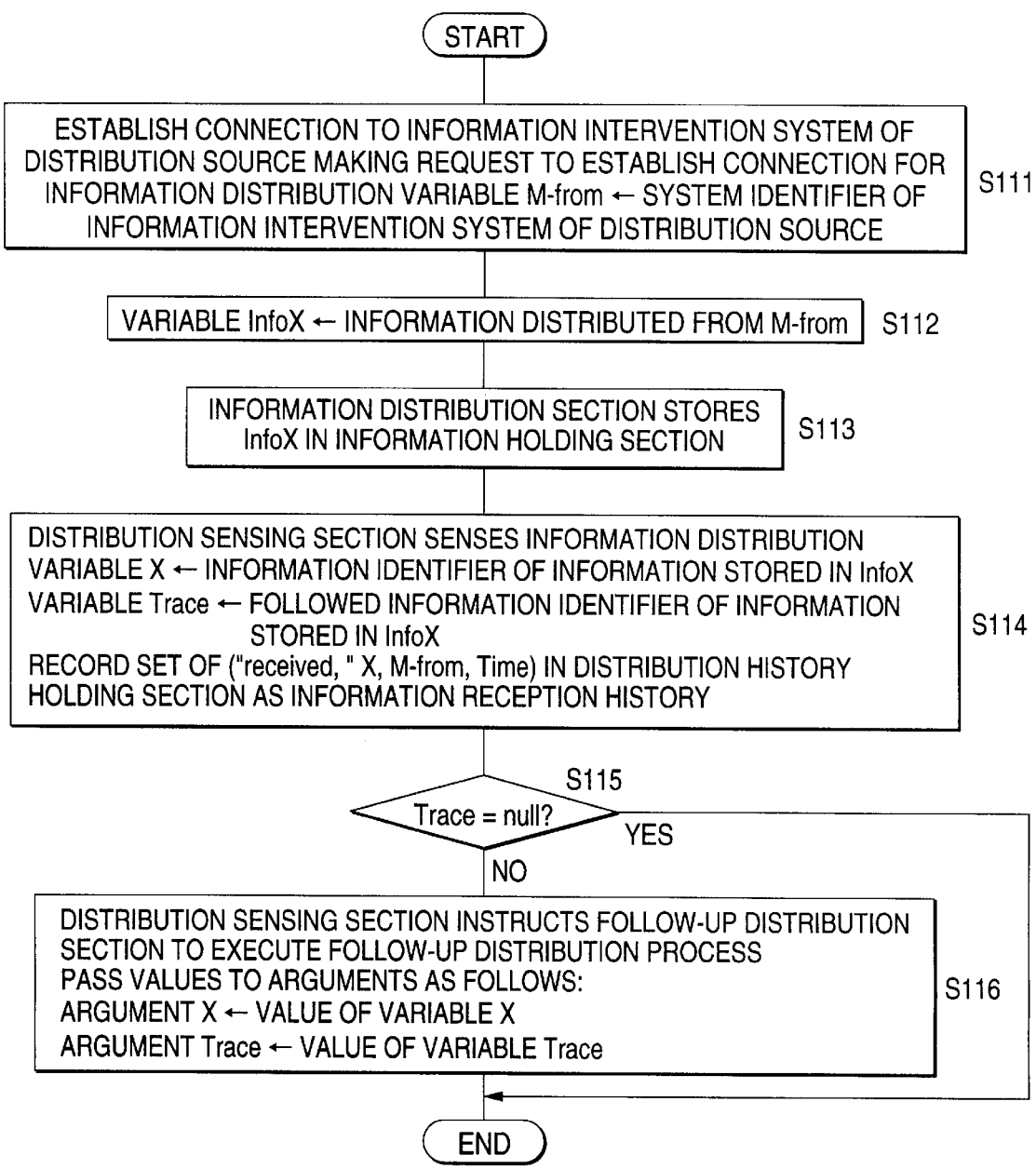
FIG. 42 is a flowchart to show an example of processing in an information mediation system of a distribution destination at the information distribution time in the ninth embodiment of the information processing system of the invention.

FIG. 42 is a flowchart to show an example of processing in an information intervention system of a distribution destination at the information distribution time in the ninth embodiment of the information processing system of the invention. Upon reception of a request to establish connection for information distribution, the information intervention system of the distribution destination assigns the system identifier of the information intervention system of the distribution source making the request to variable M-from and establishes connection at step S111. Next, upon distribution of information from the information intervention system having the system identifier stored in the variable M-from, the distributed information is assigned to variable InfoX at step S112. The information distribution section 12 stores the information stored in the variable InfoX in the information holding section 11 at step S113.

The distribution sensing section 14 senses the information distribution, assigns the information identifier and the followed information identifier of the information stored in the variable InfoX to variables X and Trace respectively, and records a set of ("received," X, M-from, Time) where "received" denotes that the history is a transmission history of the information and Time denotes the distribution time of day in the distribution history holding section 15 as a reception history of the information at step S114. The distribution sensing section 14 checks whether or not the value stored in the variable Trace is null at step S115. If the value is null, the process is terminated.

If the value of the variable Trace is not null, the distribution sensing section 14 instructs the follow-up distribution section 28 to execute a follow-up distribution process at step S116. At this time, the value of the variable X as an argument corresponding to the information identifier of the distributed information and the value of the variable Trace as an argument corresponding to the followed information identifier are passed to arguments to call the follow-up distribution process. As the follow-up distribution process is complete, the main routine is terminated.

Figure 43:
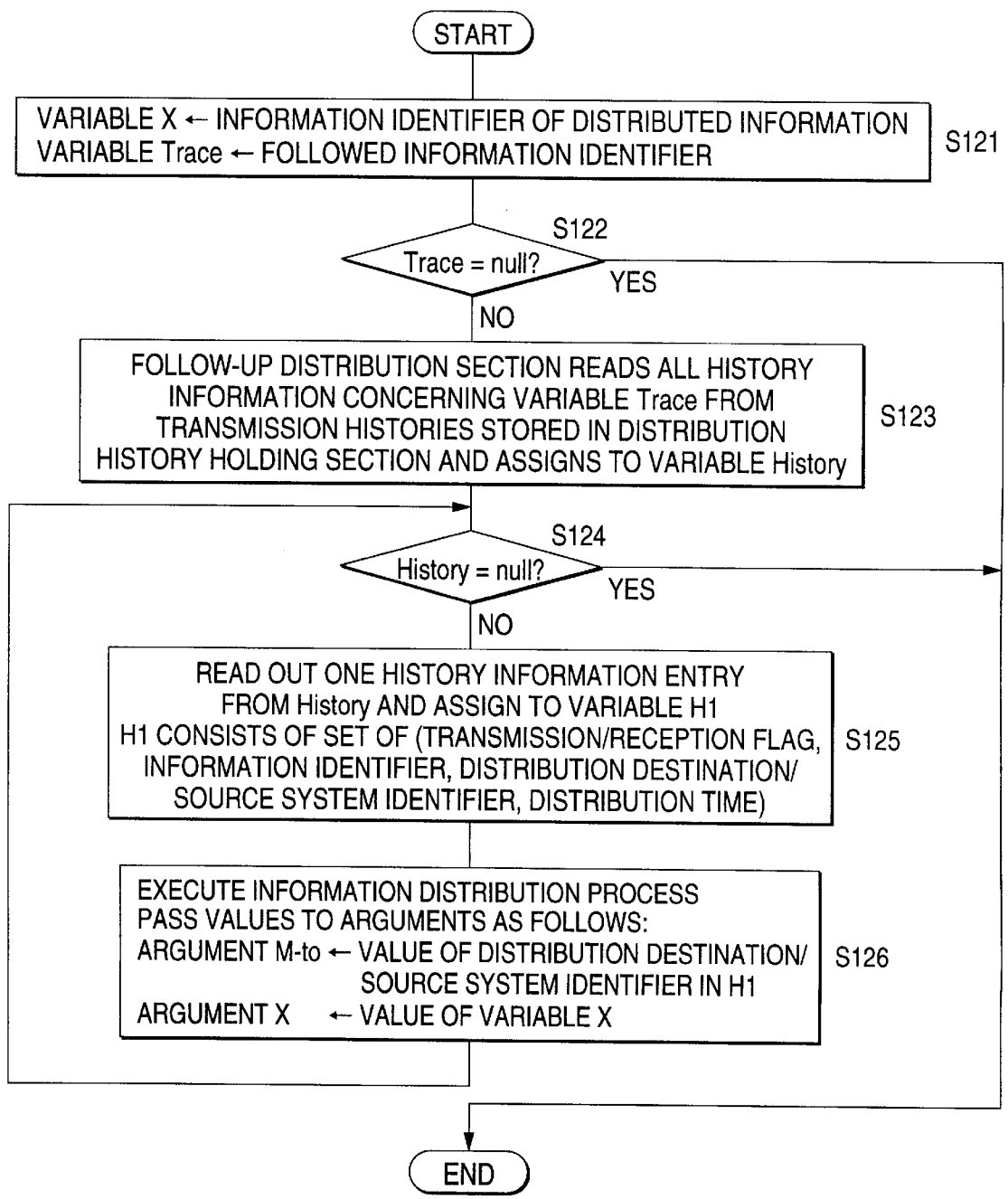
FIG. 43 is a flowchart to show an example of a follow-up distribution process of information in the ninth embodiment of the information processing system of the invention.

FIG. 43 is a flowchart to show an example of the follow-up distribution process of information in the ninth embodiment of the information processing system of the invention. The follow-up distribution section 28 executes the follow-up distribution process. The follow-up distribution process is called with the information identifier of the distributed information and the followed information identifier, which is the information identifier of the followed information, as arguments.

The follow-up distribution section 28 assigns the information identifier of the distributed information to the variable X and the followed information identifier to the variable Trace at step S121. It checks whether or not the value stored in the variable Trace is null at step S122 and if the value is null, terminates the process. If the value of the variable Trace is not null, the follow-up distribution section 28 reads all history information concerning the information identifier stored in the variable Trace from the histories recorded as transmission histories in the history information stored in the distribution history holding section 15 and assigns the read history information to variable History at step S123. It checks whether or not the value stored in the variable History is null at step S124 and if the value is null, terminates the process.

If the value of the variable History is not null, the follow-up distribution section 28 reads out one history information entry from the variable History and assigns the history information to variable H1. The history information stored in the variable History provides the transmission histories of the information to be followed. It consists of sets of (transmission/reception flag, information identifier, distribution destination/source system identifier, distribution time) and such a set is also assigned to the variable H1. The transmission/reception flag indicates whether the history is a transmission or reception history, and is "sent," "received," etc., described above.

The follow-up distribution section 28 executes the information distribution process shown in FIG. 41 at step S126 to send the information indicated by the information identifier stored in the variable X as follow-up information to the system indicated by the distribution destination/source system identifier stored in the variable H1. At this time, the distribution destination/source system identifier stored in the variable H1 as an argument corresponding to the system identifier of the information intervention system of the distribution destination and the information identifier stored in the variable X as an argument corresponding to the information identifier of the distributed information are assigned to arguments to execute the information distribution process. Upon completion of the information distribution process, control returns to step S124 and a distribution process is again executed based on another history information entry.

Figure 44:
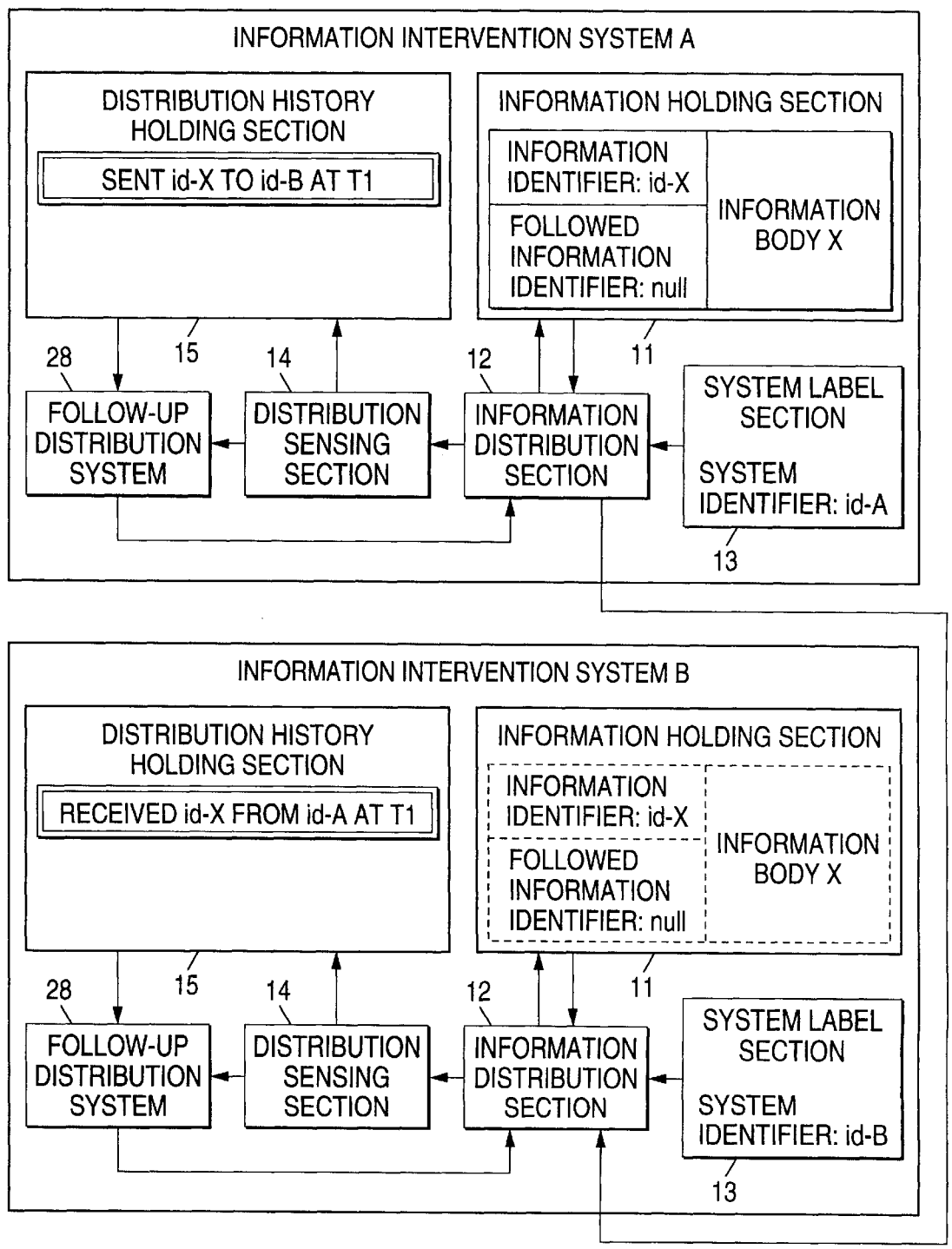
FIG. 44 is an illustration of an example of the information distribution operation in the ninth embodiment of the information processing system of the invention.

FIG. 44 is an illustration of an example of the information distribution operation in the ninth embodiment of the information processing system of the invention. The operation examples shown in FIGS. 41 to 43 will be discussed specifically. Here, distribution of information having information identifier id-X from information intervention system A to information intervention system B will be discussed. At this time, the information intervention system of the distribution source is the information intervention system A and the information intervention system of the distribution destination is the information intervention system B. The system identifiers of the information intervention systems A and B are id-A and id-B respectively. The example shown in FIG. 44 assumes that the information holding section 11 of the information intervention system A stores information having information identifier id-X and followed information identifier null.

FIG. 44 shows a state after distribution of the information having the information identifier id-X from the information intervention system A to the information intervention system B. In the state before the distribution of the information, data is not stored in the distribution history holding section 15 of the information intervention system A or the distribution history holding section 15 or the information holding section 11 of the information intervention system B. First, processing in the information intervention system A of the distribution source will be discussed starting at the state before the distribution of the information with reference to FIGS. 41 and 44. In the example, the information intervention system A, which intends to distribute the information having the information identifier id-X to the information intervention system B, assigns the system identifier id-B of the information intervention system B of the distribution destination to variable M-to and the information identifier id-X of the information to be distributed to the information intervention system B to variable X at step S101 in FIG. 41. Next, the information distribution section 12 of the information intervention system A searches through the network for the information intervention system B having the system identifier id-B and establishes connection to the information distribution section 12 of the information intervention system B at step S102. It reads the information having the information identifier id-X from the information holding section 11 and assigns the information to variable InfoX at step S103. Further, the information distribution section 12 of the information intervention system A distributes the information stored in the variable InfoX to the information distribution section 12 of the information intervention system B at step S104. The distribution sensing section 14 of the information intervention system A senses the distribution process and records a set of ("sent," information identifier id-X, distribution destination system identifier id-B, Time)

in the distribution history holding section 15 of the information intervention system A as a transmission history of the information at step S105. In FIG. 44, this record is represented as sent id-X to id-B at T1 where T1 is the distribution time of day. The record means that the information having the information identifier id-X was sent to the information intervention system having the system identifier id-B at the time T1. The information intervention system A thus distributes the information and records the distribution history in the distribution history holding section 15.

Next, processing in the information intervention system of the distribution destination will be discussed with reference to FIGS. 42 to 44. First, upon reception of the request for establishing connection from the information intervention system A at step S102 in FIG. 41, the information intervention system B of the distribution destination establishes the connection and assigns the system identifier id-A of the information intervention system A of the distribution source to variable M-from at step S111 in FIG. 42. Next, the information distribution section 12 of the information intervention system B receives the information having the information identifier id-X distributed from the information distribution section 12 of the information intervention system A at step S104 in FIG. 41 and assigns the information to variable InfoX at step S112. The information distribution section 12 of the information intervention system B stores the information stored in the variable InfoX in the information holding section 11 of the information intervention system B at step S113.

The distribution sensing section 14 of the information intervention system B senses the distribution process and assigns the information identifier id-X and the followed information identifier of the information X stored in the variable InfoX to variables X and Trace respectively at step S114. Here, since the followed information identifier of the information X is null, null is assigned to the variable Trace. The distribution sensing section 14 records a set of ("received," information identifier id-X, distribution source system identifier id-A, Time) in the distribution history holding section 15 of the information intervention system B as a reception history of the information.
In FIG. 44, this record is represented as received id-X from id-A at T1 where T1 is the distribution time of day. The record means that the information having the information identifier id-X was received from the information intervention system having the system identifier id-A at the time T1.

The distribution sensing section 14 of the information intervention system B checks whether or not the value stored in the variable Trace is null at step S115. If the value is null, the process is terminated; otherwise, control goes to step S116. Now, the value stored in the variable Trace is null, thus the process is terminated. The information intervention system B thus receives the information and records the reception history in the distribution history holding section 15. The information distribution processing in the ninth embodiment of the information processing system of the invention is now complete.

FIG. 45 is an illustration of an example of the distribution history held in the distribution history holding section in the ninth embodiment of the information processing system of the invention. The distribution history is almost the same as that in the first embodiment shown in FIG. 8 except that a transmission/reception flag column is added for writing the information indicating whether the history is a transmission or reception history.

In FIG. 44, for example, the distribution history is represented as sent id-X to id-B at T1

The actual contents of the distribution history holding section 15 may be recorded as character strings as shown here, and can also be recorded as binary data. FIG. 45 shows representation of the distribution history as binary data. The transmission/reception flag corresponds to the information indicating whether the history is a transmission or reception history; "1" denotes a transmission history and "0" denotes a reception history as "sent" and "received" respectively in FIG. 44. The target information identifier corresponds to "id-X," the distribution destination/source system identifier to "id-B," and the distribution time to "T1."

One row in FIG. 45 represents one distribution history. For example, the information on the top row means a transmission history indicating that "the information having the information identifier "679840-176" was sent to the system having the system identifier "800287" at 12 hours 9 minutes 4 seconds 41 on Mar. 10, 1995". Therefore, such a distribution history is added to the distribution history holding section each time one information item is distributed.

Figure 46:
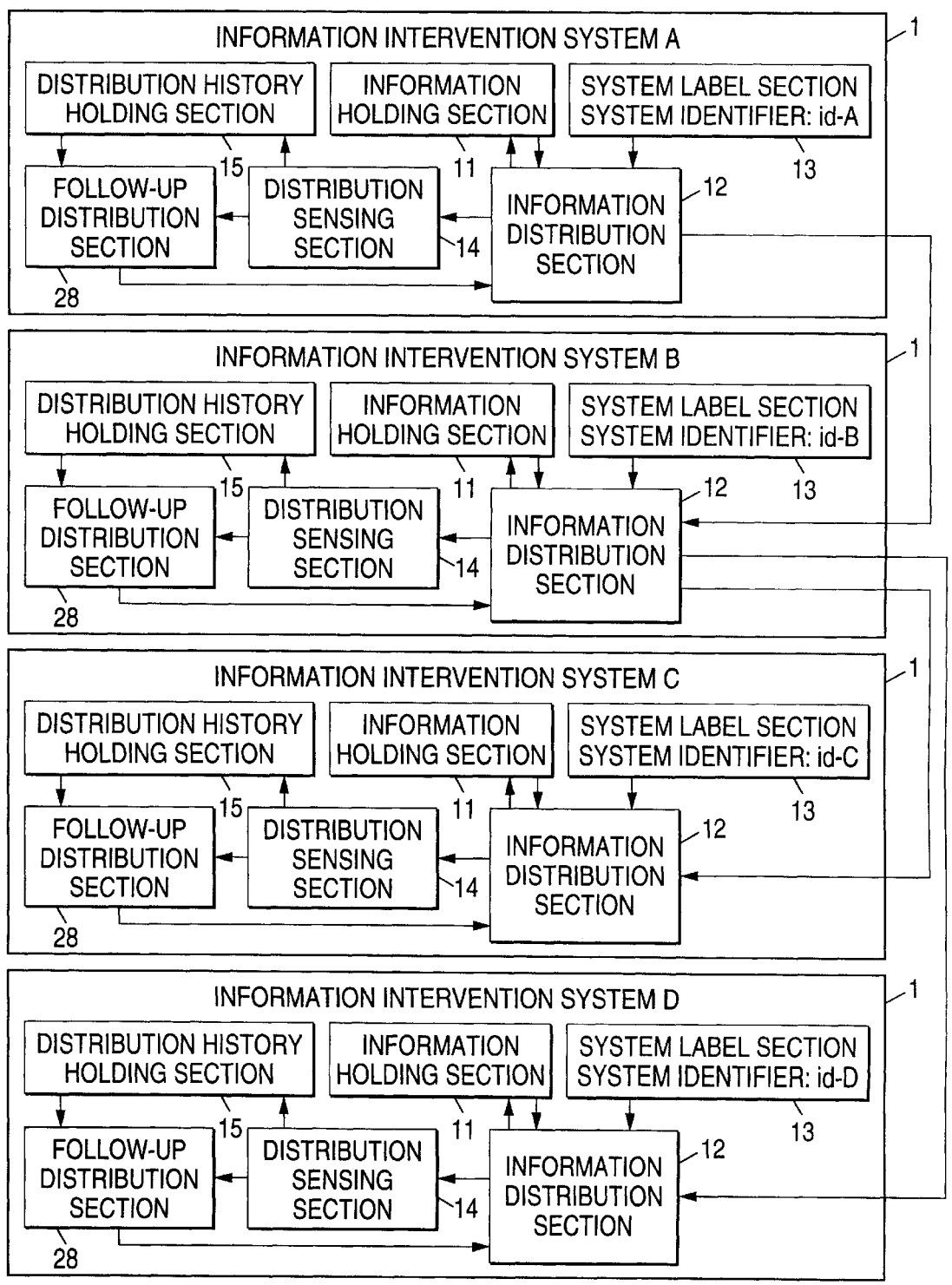
FIG. 46 is an illustration of an example after information distribution in the ninth embodiment of the information processing system of the invention.
Figure 47:
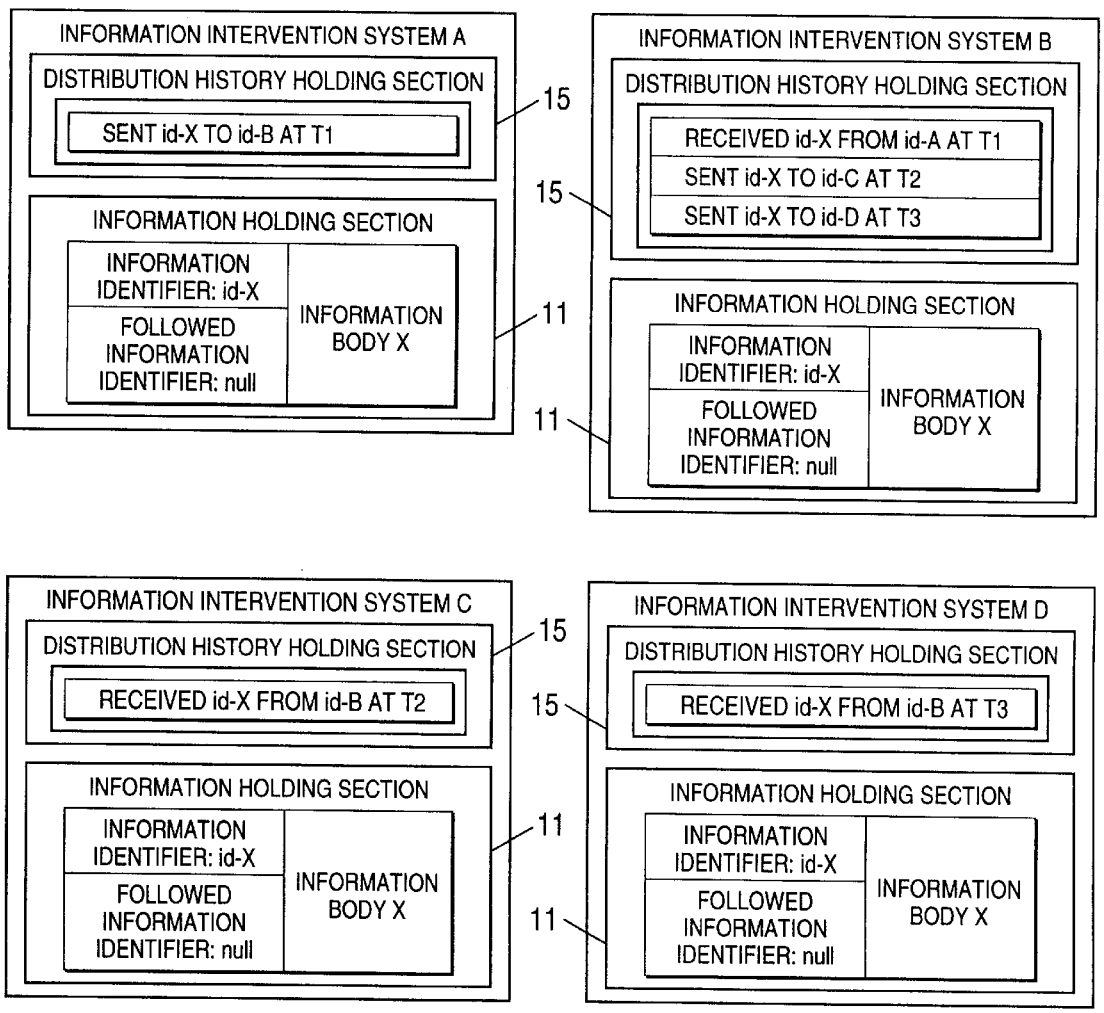
FIG. 47 is an illustration of an example of the contents of information holding sections and distribution history holding sections after information distribution in the ninth embodiment of the information processing system of the invention.

FIGS. 46 and 47 are illustrations of examples after information distribution in the ninth embodiment of the information processing system of the invention. FIG. 46 shows the configurations of the information intervention systems and the information flow shown in FIG. 4 and FIG. 47 shows the contents of the information holding sections and the distribution history holding sections 15 of the information intervention systems after information distribution.

Now, the information having the information identifier id-X has been distributed from the information intervention system A to the information intervention system B, as described above. After this, for example, if the information flows as shown in FIG. 4, it is furthermore distributed from the information intervention system B to the information intervention systems C and D. FIG. 46 shows information distribution route as shown in FIG. 4 and FIG. 47 shows the distribution history holding sections 15 of the information intervention systems after such distribution of the information. Here, the system identifiers of the information intervention systems C and D are id-C and id-D respectively.

As a result of the distribution of the information from the information intervention system B to the information intervention system C like the information distribution from the information intervention system A to the information intervention system B described above, the distribution history sent id-X to id-C at T2 is recorded in the distribution history holding section 15 of the information intervention system B, as shown in FIG. 47, and the distribution history received id-X from id-B at T2 is recorded in the distribution history holding section 15 of the information intervention system C, as shown in FIG. 47. Likewise, as a result of the distribution of the information from the information intervention system B to the information intervention system D, the distribution history sent id-X to id-D at T3 is recorded in the distribution history holding section 15 of the information intervention system B. as shown in FIG. 47, and the distribution history received id-X from id-B at T3 is recorded in the distribution history holding section 15 of the information intervention system D, as shown in FIG. 47.

Whenever the information is distributed, its distribution history is thus recorded in the distribution history holding section 15.

Next, information following processing will be discussed with reference to FIGS. 41–48. As described above, the contents of the information holding sections 11 and the distribution history holding sections 15 shown in FIG. 47 are the contents of the information holding sections 11 and the distribution history holding sections 15 after the distribution of the information X having the information identifier id-X from the information intervention system A to the information intervention system B from which to the information intervention systems C and D. This example assumes that an instruction for distributing information Y so as to follow the information X having the information identifier id-X is given in the information intervention system A. The information Y has id-Y as the information identifier and id-X as the followed information identifier.

When an instruction for distributing the information Y so as to follow the information X is given in the information intervention system A, the follow-up distribution section 28 of the information intervention system A executes the follow-up distribution process shown in FIG. 43. It calls the follow-up distribution process with id-Y as the information identifier of the distributed information and id-X as the followed information identifier, which is the information identifier of the followed information, as arguments.

The follow-up distribution section 28 of the information intervention system A assigns the information identifier id-Y of the distributed information to the variable X and the followed information identifier id-X to the variable Trace at step S121. It checks whether or not the value stored in the variable Trace is null at step S122. Since the value is not null, control goes to step S123.

At step S123, the follow-up distribution section 28 of the information intervention system A reads all history information concerning the information identifier id-X stored in the variable Trace from the histories recorded as transmission histories in the history information stored in the distribution history holding section 15 and assigns the read history information to the variable History. The transmission history concerning the value id-X stored in the variable Trace is only the following one entry sent id-X to id-B at T1 in the histories stored in the distribution history holding section 15 of the information intervention system A shown in FIG. 47. Then, the follow-up distribution section 28 of the information intervention system A assigns the transmission history to the variable History.

Next, the follow-up distribution section 28 of the information intervention system A checks whether or not the value stored in the variable History is null at step S124 and if the value is null, terminates the process; otherwise, control goes to step S125. Now, since the value stored in the variable History is not null, control goes to step S125.

At step S125, the follow-up distribution section 28 of the information intervention system A reads out one history information entry from the variable History and assigns the history information to variable H1. Now, the history information sent id-X to id-B at T1 is read out from the variable History and is assigned to the variable H1.

Next, the follow-up distribution section 28 of the information intervention system A executes the information distribution process shown in FIG. 41 at step S126. At this time, the distribution destination system identifier id-B of the history information stored in the variable H1 as an argument corresponding to the system identifier of the information intervention system of the distribution destination and the information identifier id-Y stored in the variable X as an argument corresponding to the information identifier of the distributed information are assigned to arguments to execute the information distribution process.

When the information intervention system A executes the information distribution process shown in FIG. 41, it assigns the system identifier id-B of the information intervention system of the distribution destination to the variable M-to and the information identifier id-Y of the distributed information to the variable X at step S101 in FIG. 41. Then, steps S102 to S105 are executed for transmitting the information Y having the information identifier id-Y from the information intervention system A to the information intervention system B having the system identifier id-B, and the information distribution process terminates.

Next, control goes to S124 from S126 in FIG. 43. At step S124, the follow-up distribution section 28 of the information intervention system A checks whether or not the value stored in the variable History is null. Since the value is null, the process is terminated. The information following processing in the information intervention system A of the information source is now complete.

Next, the information following processing in the information intervention system B of the information destination will be discussed with reference to FIGS. 42 to 44. The first half of the processing in the information intervention system B of the information destination is similar to the processing in the information intervention system B of the information destination at the information distribution time described above. First, upon reception of a request to establish connection from the information intervention system A at step S102 in FIG. 41, the information intervention system B of the distribution destination establishes connection and assigns the system identifier id-A of the information intervention system A of the distribution source to the variable M-from at step S111. Next, the information distribution section 12 of the information intervention system B receives the information Y having the information identifier id-Y distributed from the information distribution section 12 of the information intervention system A at step S104 in FIG. 41 and assigns the information Y to the variable InfoX at step S112. The information distribution section 12 of the information intervention system B stores the information stored in the variable InfoX in the information holding section 11 of the information intervention system B at step S113. The distribution sensing section 14 of the information intervention system B senses the distribution process, assigns the information identifier id-Y and the followed information identifier id-X of the information Y stored in the variable InfoX to the variables X and Trace respectively, and records received id-Y from id-A at T4 in the distribution history holding section 15 of the information intervention system B as a reception history of the information at step S114.

Figure 48:
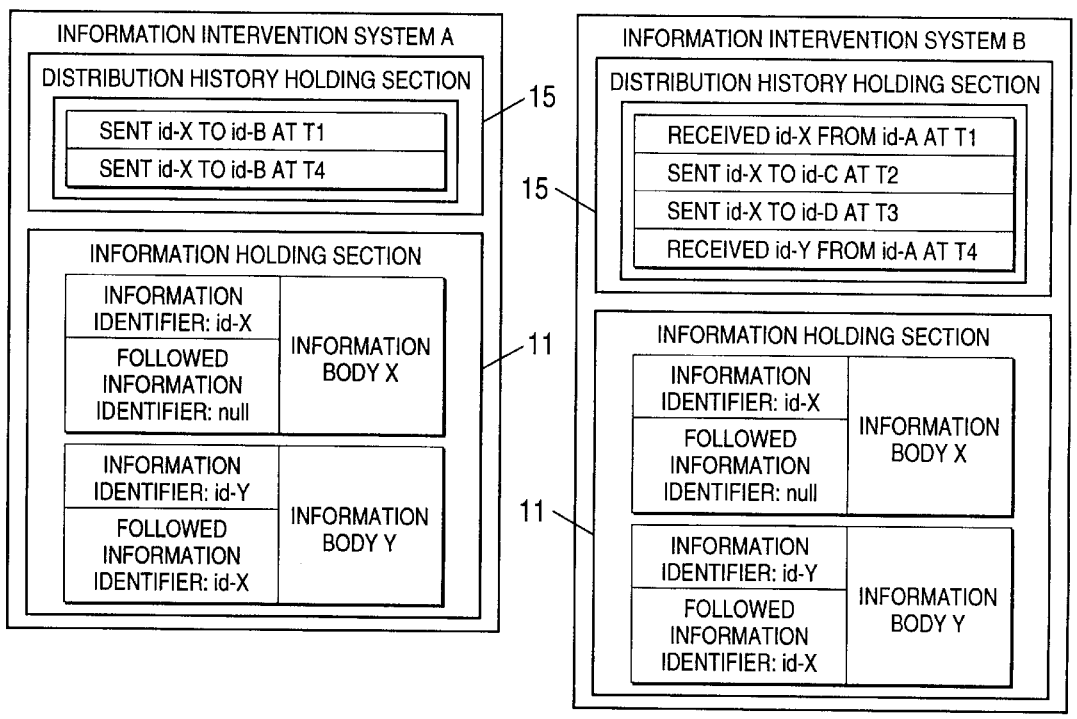
FIG. 48 is an illustration to show an example of the contents of the information holding sections and the distribution history holding sections after distribution of information Y following information X from information mediation system A to information mediation system B in the ninth embodiment of the information processing system of the invention.
Figure 48:
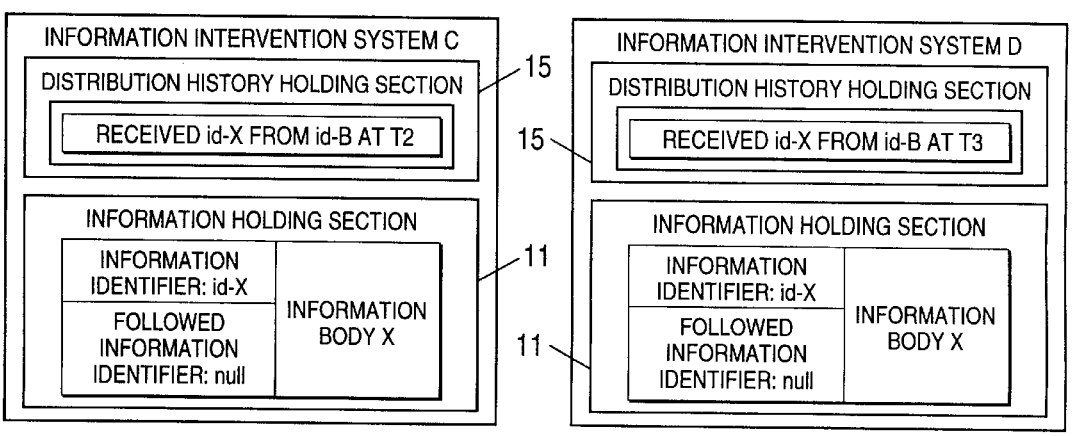

FIG. 48 is an illustration to show an example of the contents of the information holding sections and the distribution history holding sections after the distribution of the information Y following the information X from the information intervention system A to the information intervention system B in the ninth embodiment of the information processing system of the invention. When the information Y has been distributed following the distribution of the information X from the information intervention system A to the information intervention system B, the transmission history related to the information Y sent id-Y to id-B at T4 is added to the distribution history holding section 15 of the information intervention system A as shown in FIG. 48, and further the reception history related to the information Y received id-Y from id-A at T4 is added to the distribution history holding section 15 of the information intervention system B as shown in FIG. 48.

Next, the distribution sensing section 14 of the information intervention system B checks whether or not the value stored in the variable Trace is null at step S115. If the value is null, the process is terminated; otherwise, control goes to step S116. Now, since the value stored in the variable Trace is not null, control goes to step S116.

At step S116, the distribution sensing section 14 of the information intervention system B instructs the follow-up distribution section 28 to execute the follow-up distribution process shown in FIG. 43. At this time, the information identifier stored in the variable X as an argument corresponding to the information identifier of the distributed information and the followed information identifier stored in the variable Trace as an argument corresponding to the followed information identifier are assigned to arguments to execute the follow-up distribution process. In the example, the information identifier id-Y stored in the variable X is assigned as the argument corresponding to the information identifier of the distributed information and the followed information identifier id-X stored in the variable Trace is assigned as the argument corresponding to the followed information identifier, and the follow-up distribution process is called.

In FIG. 43, the follow-up distribution process is called as described above and the information identifier id-Y is assigned to the variable X and the followed information identifier id-X is assigned to the variable Trace at step S121 in FIG. 43. Then, the information intervention system B executes the follow-up distribution process described above. In FIG. 48, the history information concerning the value id-X stored in the variable Trace is the following two entries sent id-X to id-C at T2 sent id-X to id-D at T3 in the transmission histories stored in the distribution history holding section 15 of the information intervention system B. Then, these two transmission histories are assigned to the variable History at step S123. Steps S124 to S126 are repeated twice for transmitting the information Y having the information identifier id-Y from the information intervention system B to the information intervention system C having the system identifier id-C and the information intervention system D having the system identifier id-D, then the process is terminated. The information following processing in the information intervention system B of the information destination is now complete.

When the distribution sensing sections 14 of the information intervention systems C and D sense distribution of the information, the information intervention systems C and D also perform similar processing to the information following processing of the information intervention system B. However, the information intervention systems C and D do not contain any transmission histories of the information X of the followed information, thus simply record a reception history of the information Y in their respective distribution history holding sections 15 and terminate the process. The information following processing is now complete.

Figure 49:
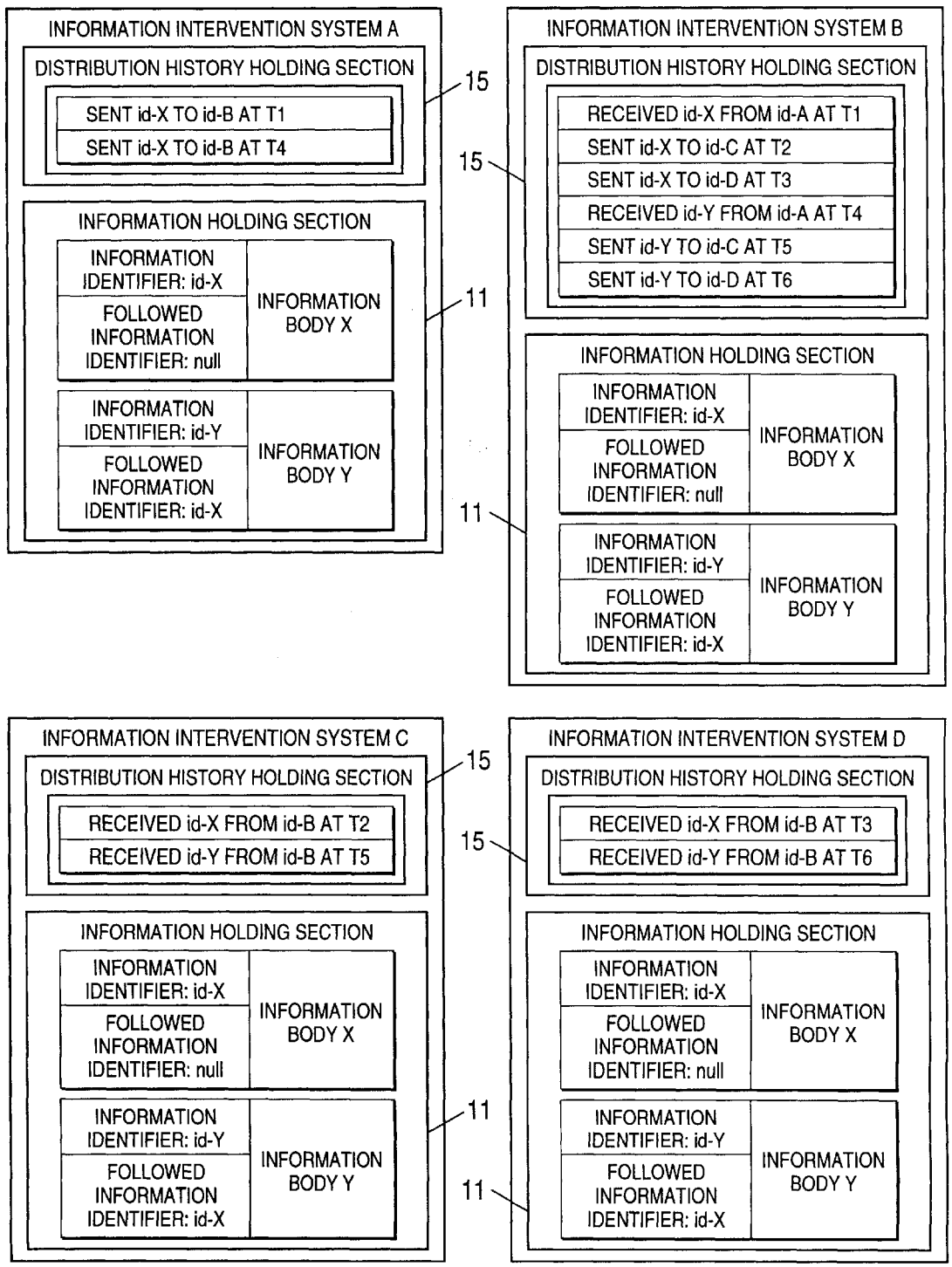
FIG. 49 is an illustration to show an example of the contents of the information holding sections and the distribution history holding sections after completion of follow-up distribution of the information Y in the ninth embodiment of the information processing system of the invention.
Figure 50:
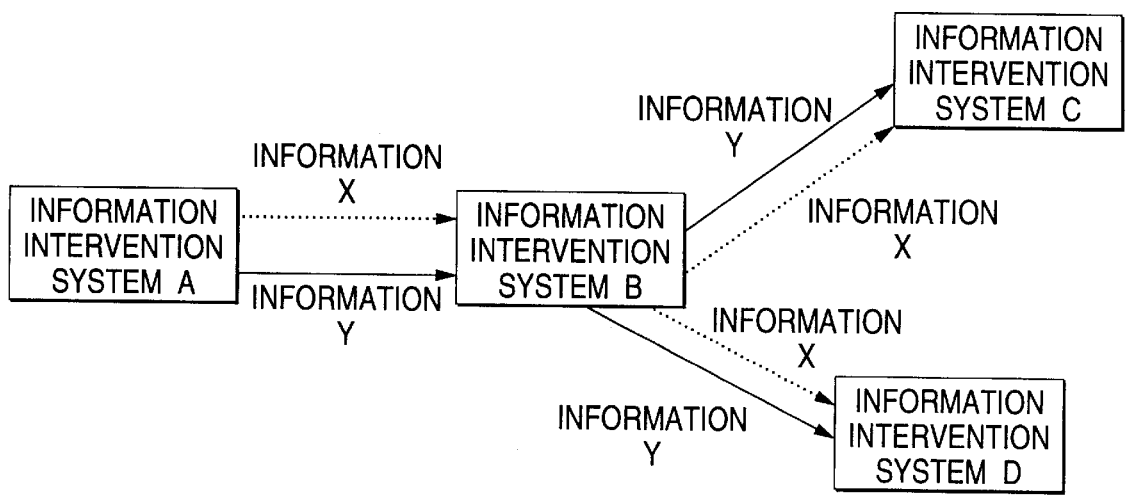
FIG. 50 is an illustration of an example of a flow of the information X and a flow of the information Y following the information X in the ninth embodiment of the information processing system of the invention.

FIG. 49 is an illustration to show an example of the contents of the information holding sections and the distribution history holding sections after completion of the follow-up distribution of the information Y in the ninth embodiment of the information processing system of the invention. FIG. 50 is an illustration of an example of a flow of the information X and a flow of the information Y following the information X in the ninth embodiment of the information processing system of the invention. The information Y having the information identifier id-Y is thus distributed so as to follow the distribution of the information X having the information identifier id-X from the information intervention system A via the information intervention system B to the information intervention systems C and D, as shown in FIG. 50, whereby the information identifier id-Y together with the information identifier id-X is stored in the information holding sections 11 of the information intervention systems, as shown in FIG. 49.

As we have discussed, the ninth embodiment enables the information Y to be distributed to all information intervention systems to which the information X was distributed following the information X.

In the example, when information is received, a reception history of the information is recorded in the information holding section 11. However, when follow-up information is distributed in the same direction as the followed information was distributed, the reception history logs are not necessarily required and no reception histories may be recorded as in the first embodiment, etc. In contrast, for example, the information Y can be distributed following the information X from the information intervention system C or D to another information intervention system containing the information X by making use of the reception histories. For example, to distribute the information Y following the information X from the information intervention system C, the information Y may be distributed to the information intervention system B of the distribution source from the reception history in the information intervention system C and may be distributed to the information intervention systems A and D from the transmission and reception histories related to the information X held in the distribution history holding section 15 of the information intervention system B. At this time, there is a possibility that the information Y may be distributed duplicately, but duplicate distribution can be avoided by checking whether or not the information Y is already distributed to the information intervention system of the distribution destination.

Next, a tenth embodiment of the information processing system capable of tracing distribution information of an information distribution route, distribution range, distribution amount, etc. of the invention will be discussed. In the ninth embodiment described above, after one information is distributed, any other information can be distributed as follow-up information in the same order as and on the same route as that information is distributed. In the tenth embodiment, when follow-up information is distributed, it can also be distributed in the reverse order to how the previous information was distributed, and the user can specify the following direction.

The tenth embodiment is the same as the ninth embodiment in basic configuration, shown in FIG. 39 and therefore the sections will not be discussed again in detail. The tenth embodiment differs from the ninth embodiment basically in information format and processing of follow-up distribution section 28.

Figure 51:
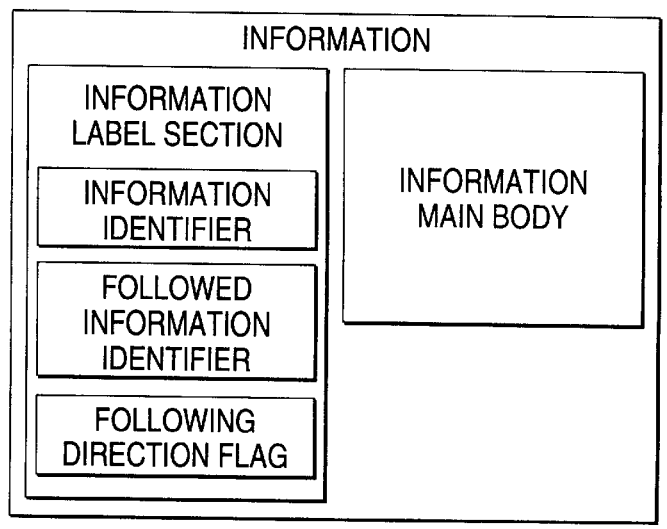
FIG. 51 is an illustration to show an example of the format of information in a tenth embodiment of the information processing system of the invention.

FIG. 51 is an illustration to show an example of the format of information in the tenth embodiment of the information processing system of the invention. As shown in FIG. 51, the information in the tenth embodiment has an information label section for holding an information identifier to identify the information, a followed information identifier to identify the followed information, and a following direction flag to indicate the information following direction as well as an information main body. The information following direction is any of the following three: "Forward direction" for following the previously distributed information in the same order as the information was distributed, "reverse direction" for following the previously distributed information in the reverse order to how the information was distributed, and "both directions" for combining both the "forward direction" and "reverse direction." The following direction flag is stored when the user specifies the following direction and gives a following command; for example, when the user specifies the "forward direction," the following direction flag is set to "01," when the user specifies the "reverse direction," "10," or when the user specifies the "both directions," "11."

A follow-up distribution section 28 in the tenth embodiment has a function of changing the information follow-up distribution direction in response to the value of the following direction flag of the information label section when a follow-up distribution process is executed in addition to the functions described in the ninth embodiment.

Next, the operation in the tenth embodiment of the information processing system of the invention will be outlined. Here, a case where information X flows into six information intervention systems A–F as shown in FIG. 20 used in the description of the third embodiment is taken as an example in the description that follows.

The information intervention system A senses distribution of the information X to the information intervention systems B and F and records their distribution histories in a distribution history holding section 15. The information intervention system B senses distribution of the information X from the information intervention system A and distribution of the information X to the information intervention systems C and D and records their distribution histories in a distribution history holding section 15. Likewise, the information intervention system C records a reception history from the information intervention system B and a transmission history to the information intervention system D; the information intervention system D records reception histories from the information intervention systems B and C and a transmission history to the information intervention system E; the information intervention system E records a reception history from the information intervention system D; and the information intervention system F records a reception history from the information intervention system A.

Next, assume that an instruction for distributing information Y following the information X in the "reverse direction" to how the information X was distributed is given in the information intervention system D. In this case, first the distribution history of the information X is read out from the distribution history holding section 15 of the information intervention system D. At this time, the follow-up distribution section 28 of the information intervention system D reads out the reception logs from the distribution histories because the "reverse direction" is specified in the instruction. Then, the follow-up distribution section 28 of the information intervention system D distributes the information Y as follow-up information of the information X to the information intervention systems B and C of the distribution sources of the information X. In the information intervention system C receiving the information Y, a distribution sensing section 14 determines that the information Y is follow-up information of the information X, and since the "reverse direction" is specified in the instruction, the follow-up distribution section 28 reads out the reception history of the information X from the distribution history holding section 15 of the information intervention system C and distributes the information Y to the information intervention system B of the distribution source of the information X. Likewise, in the information intervention system B receiving the information Y from the information intervention system D, a distribution sensing section 14 determines that the information Y is follow-up information of the information X, and since the "reverse direction" is specified in the instruction, the follow-up distribution section 28 reads out the reception history of the information X from the distribution history holding section 15 of the information intervention system B and distributes the information Y to the information intervention system A of the distribution source of the information X.

On the other hand, the information intervention system B also receives the information Y from the information intervention system C. In the information intervention system B receiving the information Y from the information intervention system C, likewise the distribution sensing section 14 determines that the information Y is follow-up information of the information X, and since the "reverse direction" is specified in the instruction, the follow-up distribution section 28 reads out the reception history of the information X from the distribution history holding section 15 of the information intervention system B and attempts to distribute the information Y to the information intervention system A of the distribution source of the information X. However, before the distribution of the information Y, the information Y is checked for duplicate distribution to see if the information Y was distributed between the information intervention systems B and A. A history of previously distributing the information Y from the information intervention system B to the information intervention system A is found, thus the distribution of the information Y is canceled.

In the information intervention system A receiving the information Y, the distribution sensing section 14 determines that the information Y is follow-up information of the information X, and since the "reverse direction" is specified in the instruction, the follow-up distribution section 28 attempts to read out the reception history of the information X from the distribution history holding section 15 of the information intervention system A. However, since the information intervention system A does not contain any reception history of the information X, the information Y is not distributed any more.

The information Y can be thus distributed in the reverse order to how the information X was distributed from the information intervention system A via the information intervention systems B and C to the information intervention system D.

A processing flow as described above will be discussed in detail. An information distribution process in an information intervention system of an information distribution source in the tenth embodiment of the information processing system of the invention is executed according to the flowchart shown in FIG. 41 as in the ninth embodiment.

Figure 52:
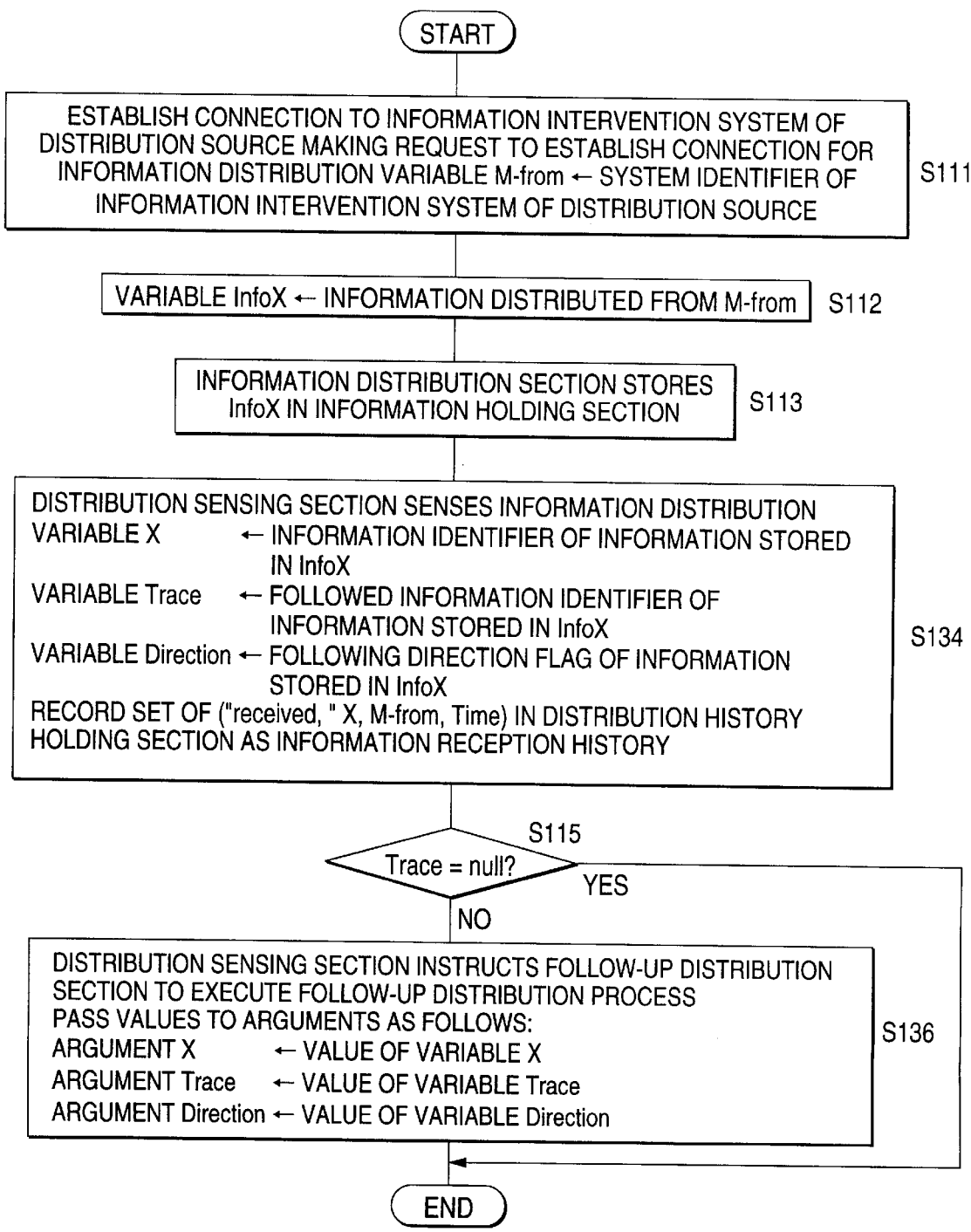
FIG. 52 is a flowchart to show an example of an information reception process in an information mediation system of an information distribution destination in the tenth embodiment of the information processing system of the invention.

FIG. 52 is a flowchart to show an example of an information reception process in an information intervention system of an information distribution destination in the tenth embodiment of the information processing system of the invention. The flowchart shown in FIG. 52 is the same as that shown in FIG. 42 (the same reference numerals are assigned to the steps having the same process contents) except that S114 and S116 shown in FIG. 42 are changed to S134 and S136 in FIG. 52 respectively.

At step S134, the distribution sensing section 14 assigns the following direction flag of the information stored in variable InfoX to variable Direction in addition to the process at step S114 in FIG. 42.

At step S136, a follow-up distribution process shown in FIG. 53 discussed just below is instructed to be executed, and the value of the variable Direction is passed to an argument corresponding to the following direction flag indicating the information following direction.

Figure 53:
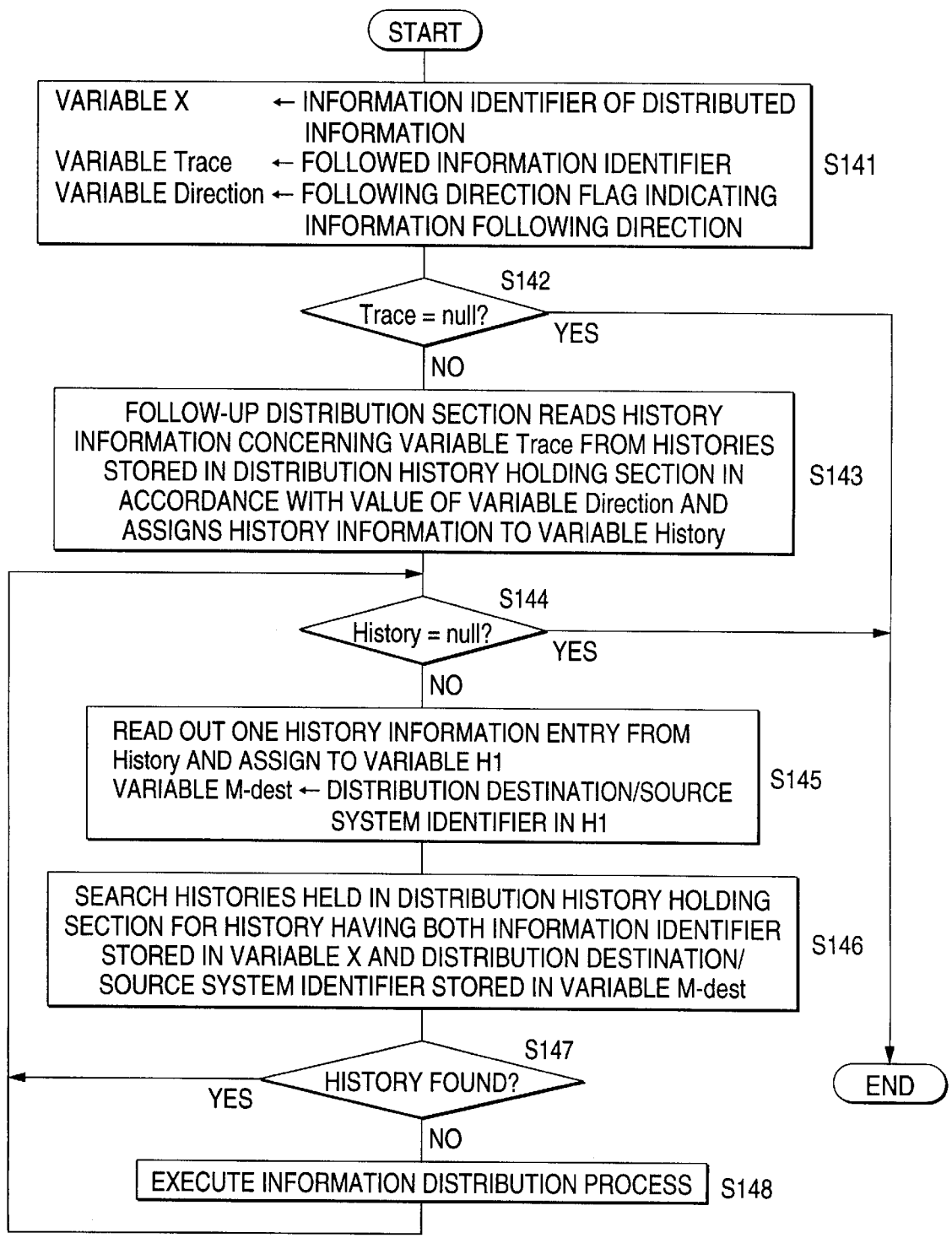
FIG. 53 is a flowchart to show- an example of a follow-up distribution process of information in the tenth embodiment of the information processing system of the invention.

FIG. 53 is a flowchart to show an example of the follow-up distribution process of information in the tenth embodiment of the information processing system of the invention. The flowchart shown in FIG. 53 is almost similar to that shown in FIG. 43. The follow-up distribution process is called with the information identifier of the distributed information, the followed information identifier, which is the information identifier of the followed information, and the following direction flag indicating the information following direction as arguments.

The follow-up distribution section 28 assigns the information identifier of the distributed information to the variable X, the followed information identifier to the variable Trace, and the following direction flag to the variable Direction at step S141.

The follow-up distribution section 28 checks whether or not the value stored in the variable Trace is null at step S142. If the value is null, the process is terminated. If the value of the variable Trace is not null, control goes to step S143 at which the follow-up distribution section 28 reads all history information concerning the variable Trace from the histories stored in the distribution history holding section 15 and assigns the read history information to variable History at step S143. At this time, the type of read history is changed depending on the value of the variable Direction as follows: When the value of the variable Direction is "01," it indicates following in the "forward direction" and transmission histories are read; when the value of the variable Direction is "10," it indicates following in the "reverse direction" and reception histories are read; or when the value of the variable Direction is "11," it indicates following in "both directions" and both transmission and reception histories are read.

Whether or not the value stored in the variable History is null is checked at step S144. If the value is null, the process is terminated. If the value is not null, control goes to step S145 at which one history information entry is read out from the variable History and is assigned to variable H1. The history information stored in the variable History provides the histories of the information to be followed. It consists of sets of (transmission/reception flag, information identifier, distribution destination/source system identifier, distribution time) and such a set is also assigned to the variable H1. The transmission/reception flag indicates whether the history is a transmission or reception history, and is "sent," "received," etc., described above. It can also be represented as a value of "1" or "0" as shown in FIG. 45. The value of the distribution destination/source system identifier in the variable Hi is assigned to variable M-dest.

A process for checking for duplicate distribution is executed at step S146 to prevent follow-up distribution of the same information more than once when the follow-up information is already distributed from the information intervention system to another information intervention system in the follow-up distribution process. In contrast, when the follow-up information is already distributed to the information intervention system from another information intervention system, follow-up distribution of the same information more than once is also prevented. The follow-up distribution section 28 searches the histories stored in the distribution history holding section 15 for a transmission or reception history of the information having the information identifier stored in the variable X to or from the information intervention system having the distribution destination/ source system identifier stored in the variable M-dest. That is, whether or not the same information as the information to be distributed as follow-up information in the information distribution process at step S148 is already received at the information intervention system to which the information is to be distributed is checked. If the corresponding history is found at step S147 as a result of searching at step S146, control is returned to step S144 to avoid duplicate distribution. If the corresponding history is not found, control goes to step S148.

At step S148, the follow-up distribution section 28 executes the information distribution process shown in FIG. 41 to send the information indicated by the information identifier stored in the variable X as the follow-up information to the information intervention system having the distribution destination/source system identifier stored in the variable M-dest. At this time, the distribution destination/source system identifier stored in the variable M-dest as an argument corresponding to the system identifier of the information intervention system of the distribution destination and the information identifier stored in the variable X as an argument corresponding to the information identifier of the distributed information are assigned to arguments to execute the information distribution process. Upon completion of the information distribution process, control goes to step S144.

Steps S144–S148 are thus executed for every entry of the history information stored in the variable History and the follow-up distribution process is complete.

Figure 54:
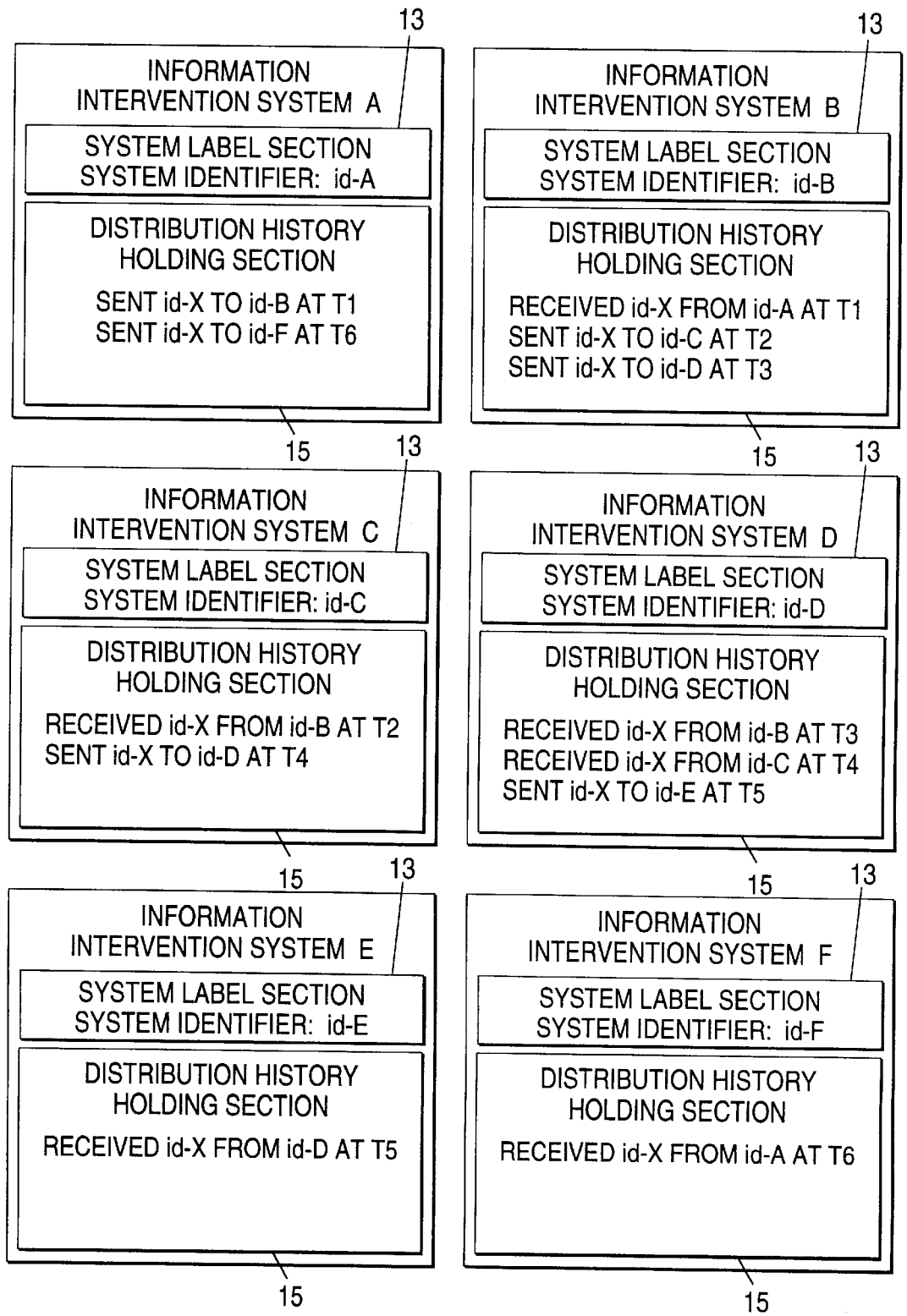
FIG. 54 is an illustration to show an example of the contents of distribution history holding sections of the information mediation systems after the information distribution in the tenth embodiment of the information processing system of the invention.

The operation examples shown in FIGS. 41, 52, and 53 will be discussed specifically. First, the information distribution processing will be described. The distribution process of the information X is executed according to the flowchart shown in FIG. 41 as in the ninth embodiment. FIG. 54 is an illustration to show an example of the contents of the distribution history holding sections of the information intervention systems after the information distribution in the tenth embodiment of the information processing system of the invention. FIG. 54 shows only the system label sections 13 and the distribution history holding sections 15 as the components of the information intervention systems. The information X having the information identifier id-X has been distributed on the route as shown in FIG. 20, whereby distribution histories as shown in FIG. 54 are stored in the distribution history holding sections 15 of the information intervention systems.

Next, the information following processing in the tenth embodiment of the information processing system of the invention will be discussed in detail. Assume that an instruction for distributing information Y following the information X in the "reverse direction" to how the information X was distributed is given in the information intervention system D shown in FIG. 20. The following processing of the information will be discussed.

Figure 55:
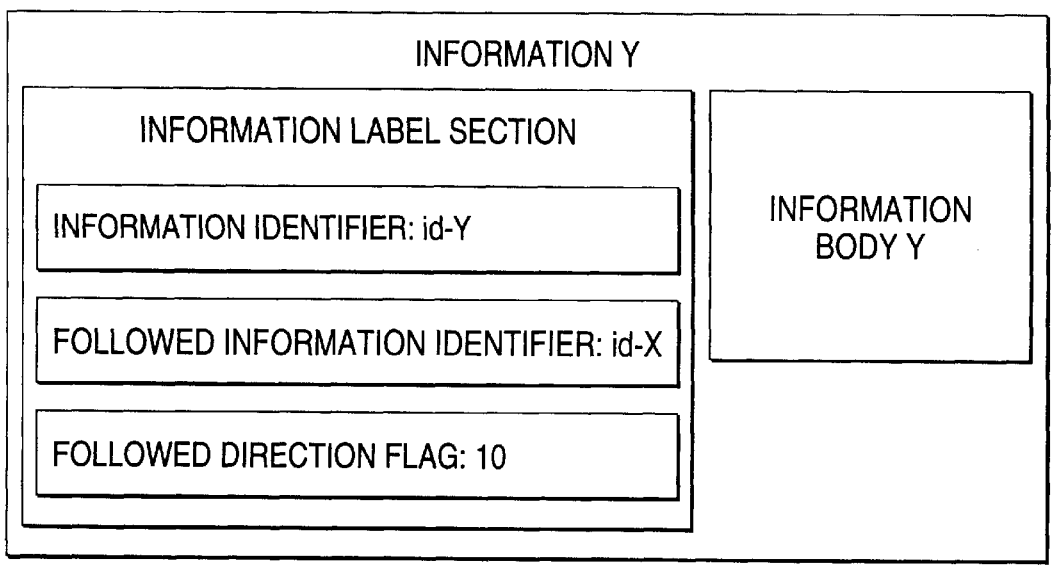
FIG. 55 is an illustration to show an example of the format of information Y distributed as follow-up information in the tenth embodiment of the information processing system of the invention.

FIG. 55 is an illustration to show an example of the format of the information Y distributed as follow-up information in the tenth embodiment of the information processing system of the invention. The information Y distributed as follow-up information has id-Y as the information identifier, id-X as the followed information identifier, and "10" indicating the "reverse direction" as the following direction flag. As described above, the following direction flag is stored when the user specifies the following direction and gives a following command; for example, when the user specifies the "forward direction," the following direction flag is set to "01," when the user specifies the "reverse direction," "10," or when the user specifies the "both directions," "11."

When an instruction for distributing information Y following the information X in the "reverse direction" to how the information X was distributed is given in the information intervention system D, the follow-up distribution section 28 of the information intervention system D executes the follow-up distribution process shown in FIG. 53.

In this example, the follow-up distribution section 28 of the information intervention system D assigns the information identifier id-Y of the distributed information to the variable X, the followed information identifier id-X to the variable Trace, and the following direction flag "10" denoting that the following direction is the "reverse direction" to the variable Direction at step S141. The follow-up distribution section 28 checks whether or not the value stored in the variable Trace is null at step S142. Since the value is not null, control goes to step S143.

At step S143, the follow-up distribution section 28 of the information intervention system D reads all history information concerning the variable Trace from the histories stored in the distribution history holding section 15 and assigns the read history information to variable History. At this time, the type of read history is changed depending on the value of the variable Direction. Now, the variable Direction has the value "10" meaning the "reverse direction" and the reception histories are read. That is, all the reception histories related to id-X stored in the variable Trace are read and assigned to the variable History. In FIG. 54, the history information concerning id-X is the following two entries received id-X from id-B at T3 received id-X from id-C at T4 in the reception histories stored in the distribution history holding section 15 of the information intervention system D. Then, the follow-up distribution section 28 of the information intervention system D assigns these two reception histories to the variable History at step S143.

Next, the follow-up distribution section 28 of the information intervention system D checks whether or not the value stored in the variable History is null is checked at step S144. If the value is null, the process is terminated. If the value is not null, control goes to step S145. Now, the value stored in the variable History is not null and control goes to step S145.

At S145, the follow-up distribution section 28 of the information intervention system D reads out one history information entry from the variable History and assigns it to the variable H1. Now, the reception history received id-X from id-B at T3 is read out from the variable History and is assigned to the variable H1. The follow-up distribution section 28 assigns the distribution destination/source system identifier id-B in the variable H1 to the variable M-dest.

Next, based on the history, the information Y having the information identifier id-Y is sent to the information intervention system B having the system identifier id-B in the "reverse direction" to how the information X having the information identifier id-X was distributed. Before the information is sent, a process is executed at step S146 for checking for duplicate distribution to see if the information Y is already distributed to the information intervention system B. At step S146, the follow-up distribution section 28 of the information intervention system D searches the histories stored in the distribution history holding section 15 of the information intervention system D for a history having both the information identifier id-Y stored in the variable X and the distribution destination/source system identifier id-B stored in the variable M-dest. The history information stored in the distribution history holding section 15 of the information intervention system D in FIG. 54 does not contain any history having both id-Y and id-B. Then, control- goes to step S148 from S147.

Next, at step S148, the follow-up distribution section 28 of the information intervention system D executes the information distribution process shown in FIG. 41. At this time, the distribution destination/source system identifier id-B stored in the variable M-dest as an argument corresponding to the system identifier of the information intervention system of the distribution destination and the information identifier id-Y stored in the variable X as an argument corresponding to the information identifier of the distributed information are assigned to the arguments to execute the information distribution process.

When the information distribution process is thus executed, the system identifier id-B of the information intervention system of the distribution destination is assigned to the variable M-to and the information identifier id-Y of the distributed information is assigned to the variable X at step S101 in FIG. 41. Then, steps S102 to S106 are executed for transmitting the information Y having the information identifier id-Y from the information intervention system D to the information intervention system B having the system identifier id-B, and the information distribution process terminates.

Next, control goes to S144 from S148 in FIG. 53. At step S144, the follow-up distribution section 28 of the information intervention system D checks whether or not the value stored in the variable History is null. Since the value is not null, control goes to step S145 at which the follow-up distribution section 28 of the information intervention system D reads out the history information received id-X from id-C at T4 from the variable History and assigns the history information to the variable H1 and assigns the distribution destination/source system identifier id-C in the variable H1 to the variable M-dest.

At step S146, a process for checking for duplicate distribution is executed. Now, a search is made for a history having both id-Y and id-C, but such a history is not found. Then, control goes to step S148 from S147. At step S148, likewise the information distribution process is executed for transmitting the information Y having the information identifier id-Y from the information intervention system D to the information intervention system C having the system identifier id-C, and the information distribution process terminates.

Again, control goes to S144 from S148 in FIG. 53. At step S144, the follow-up distribution section 28 of the information intervention system D checks whether or not the value stored in the variable History is null. Since the value is null, control goes to step S149 and the process is terminated. The information following processing in the information intervention system D of the follow-up distribution source of the information Y having the information identifier id-Y is now complete.

Figure 56:
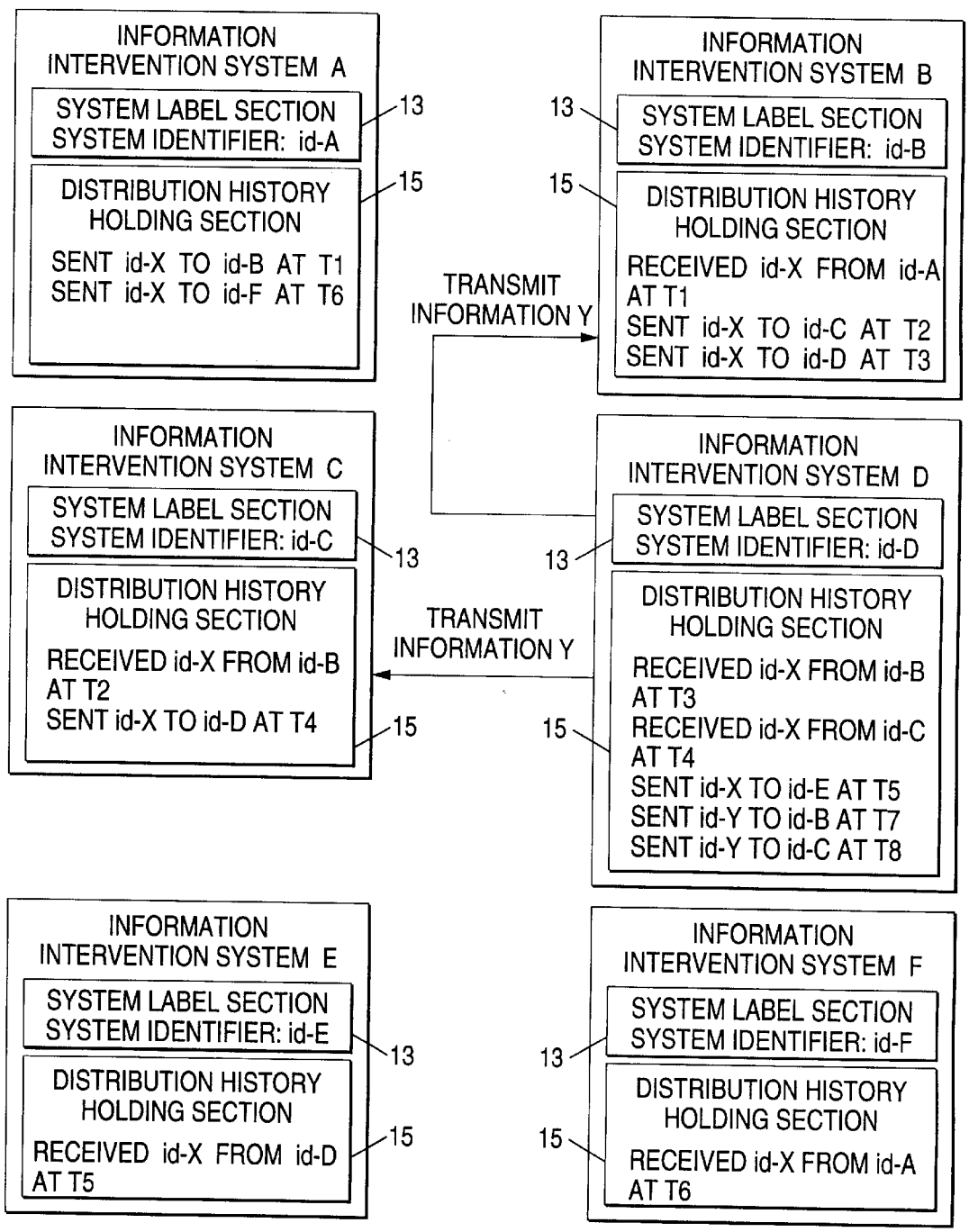
FIG. 56 is an illustration to show an example of the contents of the distribution history holding sections of the information mediation systems at the completion of follow-up processing of the information Y in the information mediation system D in the tenth embodiment of the information processing system of the invention.

FIG. 56 is an illustration to show an example of the contents of the distribution history holding sections of the information intervention systems at the completion of the follow-up processing of the information Y in the information intervention system D in the tenth embodiment of the information processing system of the invention. It also shows only the system label sections 13 and the distribution history holding sections 15 as the components of the information intervention systems. The information intervention system D transmits the information Y having the information identifier id-Y to the information intervention systems B and C by performing follow-up processing of the information Y having the information identifier id-Y in the information intervention system D as described above, in association with which two transmission histories related to the information Y are stored in the distribution history holding section 15 of the information intervention system D.

Next, information reception processing in the information intervention system B to which the follow-up information Y has been sent from the information intervention system D at the information following time will be discussed with reference to FIGS. 52 and 56. It is similar to the processing in the information intervention system B described in the ninth embodiment.

First, upon reception of a request to establish connection from the information intervention system A at step S102 in FIG. 41, the information intervention system B of the distribution destination of the follow-up information Y establishes the connection and assigns the system identifier id-D of the information intervention system D of the distribution source to the variable M-from at step Sill. Next, the information distribution section 12 of the information intervention system B receives the information Y having the information identifier id-Y distributed from the information distribution section 12 of the information intervention system D at step S104 in FIG. 41 and assigns the received information Y to the variable InfoX at step S112. It stores the information Y stored in the variable InfoX in the information holding section 11 of the information intervention system B at step S113. The distribution sensing section 14 of the information intervention system B senses the distribution process, assigns the information identifier id-Y, the followed information identifier id-X, and the following direction flag "10" of the information Y stored in the variable InfoX to the variables X, Trace, and Direction respectively, and records received id-Y from id-D at T7 in the distribution history holding section 15 of the information intervention system B as a reception history of the information at step S114.

Next, the distribution sensing section 14 of the information intervention system B checks whether or not the value stored in the variable Trace is null at step S115. If the value is null, the process is terminated. If the value is not null, control goes to step S136. Now, the value stored in the variable Trace is not null and control goes to step S136.

At step S136, the distribution sensing section 14 of the information intervention system B instructs the follow-up distribution section 28 to execute the follow-up distribution process shown in FIG. 53. At this time, the information identifier id-Y stored in the variable X as an argument corresponding to the information identifier of the distributed information, the followed information identifier id-X stored in the variable Trace as an argument corresponding to the followed information identifier, and the value "10" stored in the variable Direction as an argument corresponding to the following direction flag are assigned to the arguments to execute the follow-up distribution process.

In FIG. 53, the follow-up distribution process is called as described above and the information identifier id-Y is assigned to the variable X, the followed information identifier id-X to the variable Trace, and the following direction flag "10" to the variable Direction at step S141 in FIG. 53. Then, the information intervention system B performs processing like the follow-up distribution processing in the information intervention system D described above.

In FIG. 56, the history information concerning the value id-X stored in the variable Trace is only the following one entry received id-X from id-A at T1 in the reception histories stored in the distribution history holding section 15 of the information intervention system B. Then, the reception history is assigned to the variable History at step S143. Steps S144 to S146 are executed for transmitting the information Y having the information identifier id-Y from the information intervention system B to the information intervention system A having the system identifier id-A, then the process is terminated. The information following processing in the information intervention system B of the information destination is now complete.

Figure 57:
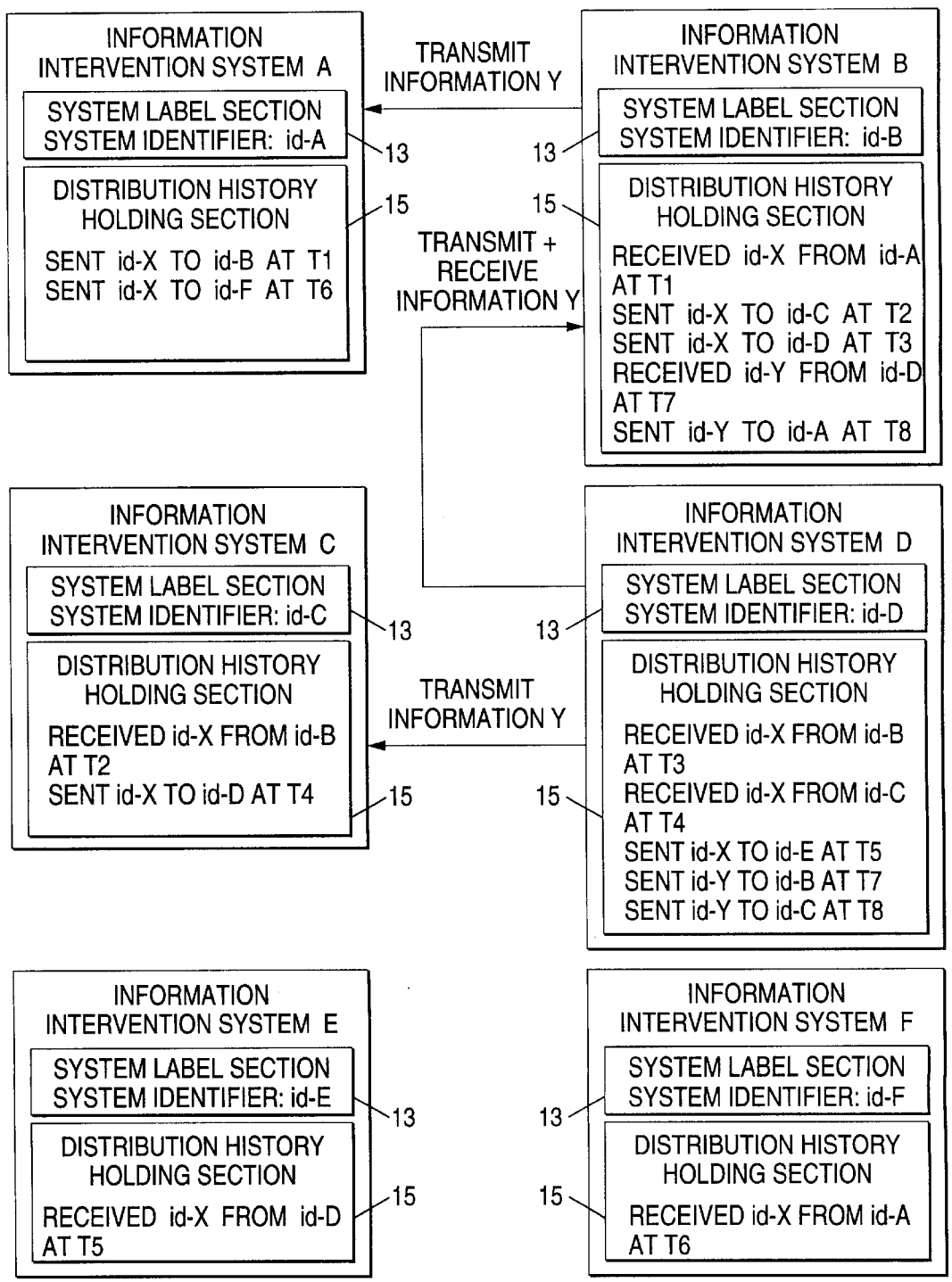
FIG. 57 is an illustration to show an example of the contents of the distribution history holding sections of the information mediation systems at the completion of follow-up processing of the information Y in the information mediation system B in the tenth embodiment of the information processing system of the invention.

FIG. 57 is an illustration to show an example of the contents of the distribution history holding sections of the information intervention systems at the completion of the follow-up processing of the information Y in the information intervention system B in the tenth embodiment of the information processing system of the invention. It also shows only the system label sections 13 and the distribution history holding sections 15 as the components of the information intervention systems. The information intervention systems B and C receive the information Y having the information identifier id-Y sent by performing the following processing in the information intervention system D as described above, in association with which one reception history is stored in the distribution history holding section 15 of each of the information intervention systems B and C.

Further, the information Y having the information identifier id-Y is distributed from the information intervention system B to the information intervention system A by performing following processing from the information intervention system B as described above, in association with which one transmission history is furthermore stored in the distribution history holding section 15 of the information intervention system B.

On the other hand, the follow-up information Y has also been distributed to the information intervention system C from the information intervention system D. The information intervention system C also starts the information reception process shown in FIG. 52 and records received id-Y from id-D at T8 in the distribution history holding section 15 of the information intervention system C as a reception history of the information. After this, the follow-up distribution process shown in FIG. 53 is started and the following history received id-X from id-B at T2 is read as the transmission history related to the information X from the distribution history holding section 15 of the information intervention system C and is assigned to the variable History. The information Y is transmitted from the information intervention system C to the information intervention system B and the process is terminated.

At this point in time, again the information intervention system B starts the information reception process shown in FIG. 52 and records received id-Y from id-C at T10 in the distribution history holding section 15 of the information intervention system B as a reception history of the information. At this point in time, the following six histories are stored in the distribution history holding section 15 of the information intervention system B:

received id-X from id-A at T1 sent id-X to id-C at T2 sent id-X to id-D at T3 received id-Y from id-D at T7 sent id-Y to id-A at T8 received id-Y from id-C at T10

The information intervention system B again starts the follow-up distribution process shown in FIG. 53 and reads the following history received id-X from id-A at T1 as the transmission history related to the-information X and assigns the history to the variable History. Next, the information intervention system B checks for duplicate distribution at step S146. The follow-up distribution section 28 of the information intervention system B searches the history information stored in the distribution history holding section 15 of the information intervention system B for a history having both the information identifier id-Y stored in the variable X and the distribution destination/source system identifier id-A in the variable H1, and finds the history sent id-Y to id-A at T8

Thus, the transmission process at step S148 is not performed, then control goes to step S144 from S147 and the process is terminated, thereby avoiding duplicate distribution of the follow-up information from the information intervention system B to the information intervention system A.

The information intervention system A receiving the follow-up information Y from the information intervention system B also performs the information reception process shown in FIG. 52 as described above. However, the following processing terminates because there is no reception log related to the information X.

Figure 58:
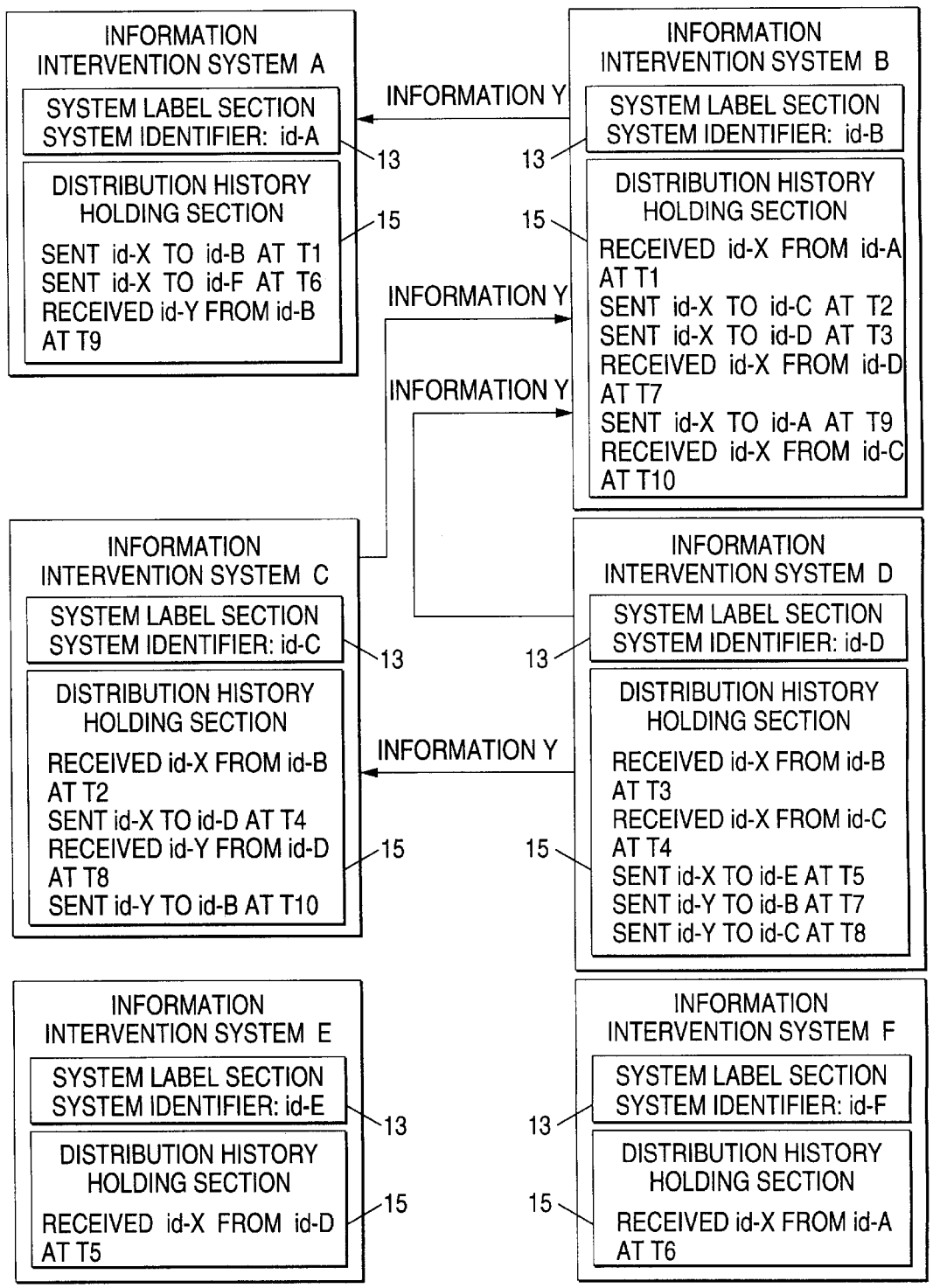
FIG. 58 is an illustration to show an example of the contents of the distribution history holding sections of the information mediation systems at the completion of the follow-up processing of the information Y in the "reverse direction" in the tenth embodiment of the information processing system of the invention.

FIG. 58 is an illustration to show an example of the contents of the distribution history holding sections of the information intervention systems at the completion of the follow-up processing of the information Y in the "reverse direction" in the tenth embodiment of the information processing system of the invention. It also shows only the system label sections 13 and the distribution history holding sections 15 as the components of the information intervention systems. From the state shown in FIG. 57, the information intervention system A performs reception processing of the information Y having the information identifier id-Y and stores a reception history of the information Y in the distribution history holding section 15 of the information intervention system A. The information Y having the information identifier id-Y is distributed to the information intervention system B by performing follow-up processing of the information Y having the information identifier id-Y in the information intervention system C, in association with which a transmission history is stored in the distribution history holding section 15 of the information intervention system C and a reception history is stored in the distribution history holding section 15 of the information intervention system B.

Figure 59:
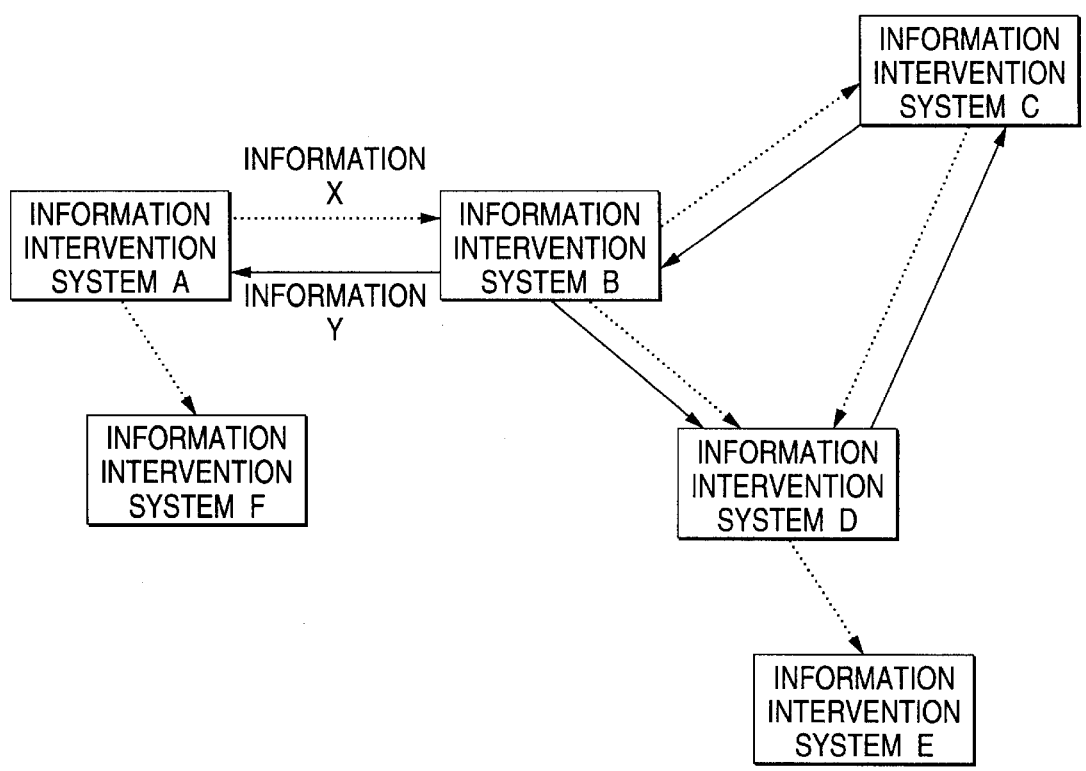
FIG. 59 is an illustration to show an example of information flows after follow-up distribution in the "reverse direction" in the tenth embodiment of the information processing system of the invention.

The follow-up information Y can be thus distributed following the information X from the information intervention system D in the "reverse direction" to how the information X was distributed. FIG. 59 is an illustration to show an example of information flows after the follow-up distribution in the "reverse direction" in the tenth embodiment of the information processing system of the invention. In FIG. 59, the dotted line denotes a flow of the information X and the solid line denotes a flow of the information Y following the information X in the "reverse direction" from the information intervention system D. As shown here, the information Y is distributed to the information intervention systems A, B, and C following the information X in the reverse direction to the flow of the information. The contents shown in FIG. 58 are stored in the distribution history holding sections 15 of the information intervention systems by executing the follow-up distribution.

Next, another example in the tenth embodiment of the information processing system of the invention will be discussed. In the above-described example, the "reverse direction" is specified as the follow-up information direction. In the example given below, "both directions" are specified as the follow-up information direction. Although the follow-up information Y is not distributed to the information intervention system E or F in the above-described example, it can be distributed to all the information intervention systems to which the information X was distributed by specifying "both directions" as the following directions.

In the description to follow, assume that after the information X was distributed as shown in FIG. 20, an instruction for distributing the follow-up information Y following the information X in "both directions" as the following directions is given in the information intervention system D.

Distribution processing of the information X is performed as that in the "reverse direction" as the following direction. That is, it is performed according to the flowchart in FIG. 41 and the information X having the information identifier id-X is distributed on the routes as shown in FIG. 20. The contents of the distribution history holding sections 15 of the information intervention systems after the distribution are as shown in FIG. 54.

Next, information following processing will be discussed in detail. When an instruction for distributing the follow-up information Y following the information X in "both directions" as the following directions is given in the information intervention system D, the information Y thus specified has id-Y as the information identifier, id-X as the followed information identifier, and "11" as the following direction flag. As described above, the following direction flag is stored when the user specifies the following direction and gives a following command; when the user specifies the "forward direction," the following direction flag is set to "01," when the user specifies the "reverse direction," "10," or when the user specifies the "both directions," "11."

When an instruction for distributing the information Y following the distribution of the information X in "both direction" as the following directions is given in the information intervention system D, the follow-up distribution section 28 of the information intervention-system D executes the follow-up distribution process shown in FIG. 53.

In the example, the follow-up distribution section 28 of the information intervention system D assigns the information identifier id-Y of the distributed information to the variable X, the followed information identifier id-X to the variable Trace, and the following direction flag "11" denoting that the following direction is "both directions" to the variable Direction at step S141. Since the value stored in the variable Trace is not null at step S142, the follow-up distribution section 28 goes to step S143.

At step S143, the follow-up distribution section 28 of the information intervention system D reads all history information concerning the variable Trace from the histories stored in the distribution history holding section 15 and assigns the read history information to variable History. At this time, the type of read history is changed depending on the value of the variable Direction. At this time, the variable Direction has the value "11" meaning "both directions" and both transmission and reception histories are read. That is, all the histories related to id-X stored in the variable Trace are read and assigned to the variable History although only the reception histories related to id-X were read when the following direction is the "reverse direction."

In FIG. 54, the history information concerning id-X is the following three entries received id-X-from id-B at T3 received id-X from id-C at T4 sent id-X to id-E at T5 in the histories stored in the distribution history holding section 15 of the information intervention system D. The follow-up distribution section 28 of the information intervention system D assigns these three histories to the variable History at step S143.

Steps S144 to S148 are repeated for each of the three histories for distributing the information Y to the information intervention systems B, C, and E, and the process in the information intervention system D terminates. Processing starts in the information intervention systems B, C, and E to which the information Y has been distributed.

Next, information reception processing in the information intervention system B to which the follow-up information Y has been sent from the information intervention system D at the information following time will be discussed. It is similar to the processing performed in the information intervention system B in the example where the following direction is the "reverse direction" described above. The information intervention system B executes steps S111–S113 and S134 shown in FIG. 52. The different point is only in that the value assigned to the variable Direction at step S134.is "11." In the distribution history holding section 15 of the information intervention system B, received id-Y-from id-D at T7 is recorded as a reception history of the information.

The information intervention system B executes steps S115 and S136 in FIG. 52 and calls the follow-up distribution process shown in FIG. 53. It executes steps S141, S142, and S143. The history information concerning id-X is the following three entries received id-X from id-A at T1 sent id-X to id-C at T2 sent id-X to id-D at T3 in the histories stored in the distribution history holding section 15 of the information intervention system B. The follow-up distribution section 28 of the information intervention system B assigns these three histories to the variable History at step S143.

Steps S144 to S148 are repeated for each of the three histories. Steps S144 to S148 are executed for the first two histories received id-X from id-A at T1 sent id-X to id-C at T2 for distributing the information Y to the information intervention systems A and C. At this point in time, the following histories are stored in the distribution history holding section 15 of the information intervention system B:

received id-X from id-A at T1 sent id-X to id-C at T2 sent id-X to id-D at T3 received id-Y from id-D at T7 sent id-Y to id-A at T10 sent id-Y to id-C at T11

Next, at step S145 sent id-X to id-D at T3 is read out from the variable History and is assigned to the variable H1 and the distribution destination/source system identifier id-D is assigned to the variable M-dest. Next, at step S146, the follow-up distribution section 28 of the information intervention system B searches the histories stored in the distribution history holding section 15 of the information intervention system B for a history having both the information identifier id-Y stored in the variable X and the distribution destination/source system identifier id-D stored in the variable M-dest, and finds the history received id-Y from id-D at T7

Thus, control goes to step S144 from S147 and the process is terminated without distributing the information to the information intervention system D. The search process checks for duplicate distribution such that the follow-up information distributed from the information intervention system D to the information intervention system B is again distributed from the information intervention system B to the information intervention system D. When the following direction is set to "both directions," such duplicate distribution is prone to occur, thus such a check mechanism needs to be provided.

Figure 60:
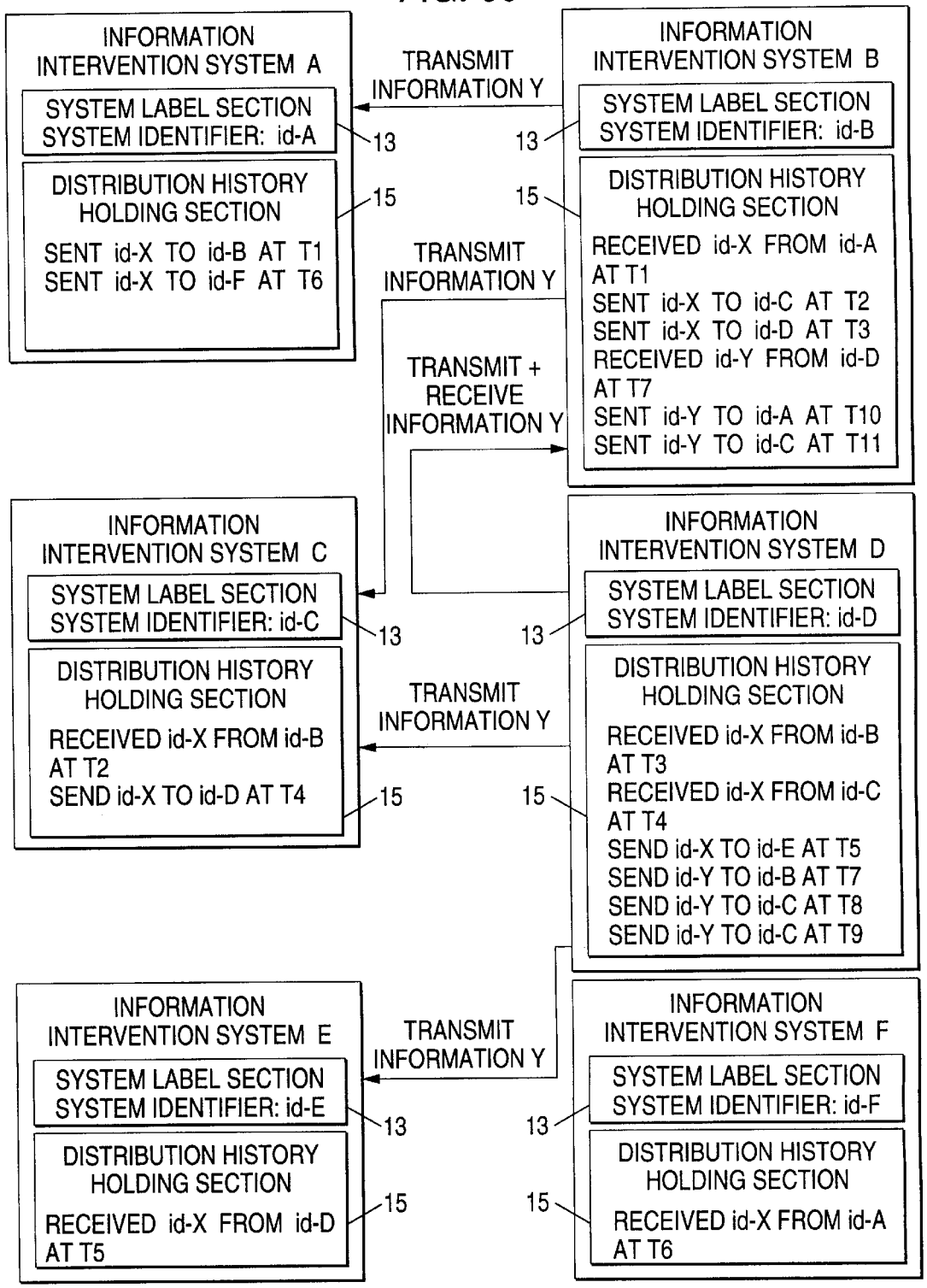
FIG. 60 is an illustration to show an example of the contents of the distribution history holding sections of the information mediation systems at the completion of the follow-up processing of the information Y in "both directions" in the information mediation systems D and B in the tenth embodiment of the information processing system of the invention.

FIG. 60 is an illustration to show an example of the contents of the distribution history holding sections of the information intervention systems at the completion of the follow-up processing of the information Y in "both directions" in the information intervention systems D and B in the tenth embodiment of the information processing system of the invention. It also shows only the system label sections 13 and the distribution history holding sections 15 as the components of the information intervention systems. The information Y having the information identifier id-Y is distributed from the information intervention system D to the information intervention systems B, C, and E and from the information intervention system B to the information intervention system A by performing follow-up processing of the information Y having the information identifier id-Y in the information intervention system D and reception and follow-up processing in the information intervention system B receiving the distribution of the information Y from the information intervention system D as described above, in association with which three transmission histories are stored in the distribution history holding section 15 of the information intervention system D and a reception history and two transmission histories are stored in the distribution history holding section 15 of the information intervention system B.

Each of the information intervention- systems A, C, and E receiving the distribution of the information Y repeats similar reception and follow-up processing. The information intervention system A further distributes the follow-up information Y to the information intervention system F, which then performs reception processing of the follow-up information Y. A check is made for duplicate distribution and resultantly the follow-up information Y is not distributed from the information intervention system C to the information intervention system B or D.

The follow-up processing performed in response to the instruction given in the information intervention system D for distributing the follow-up information Y following the information X in "both direction" as the following directions is thus complete. Thus, the follow-up information Y can be distributed following the distribution of the information X in "both direction" as the following directions.

Figure 61:
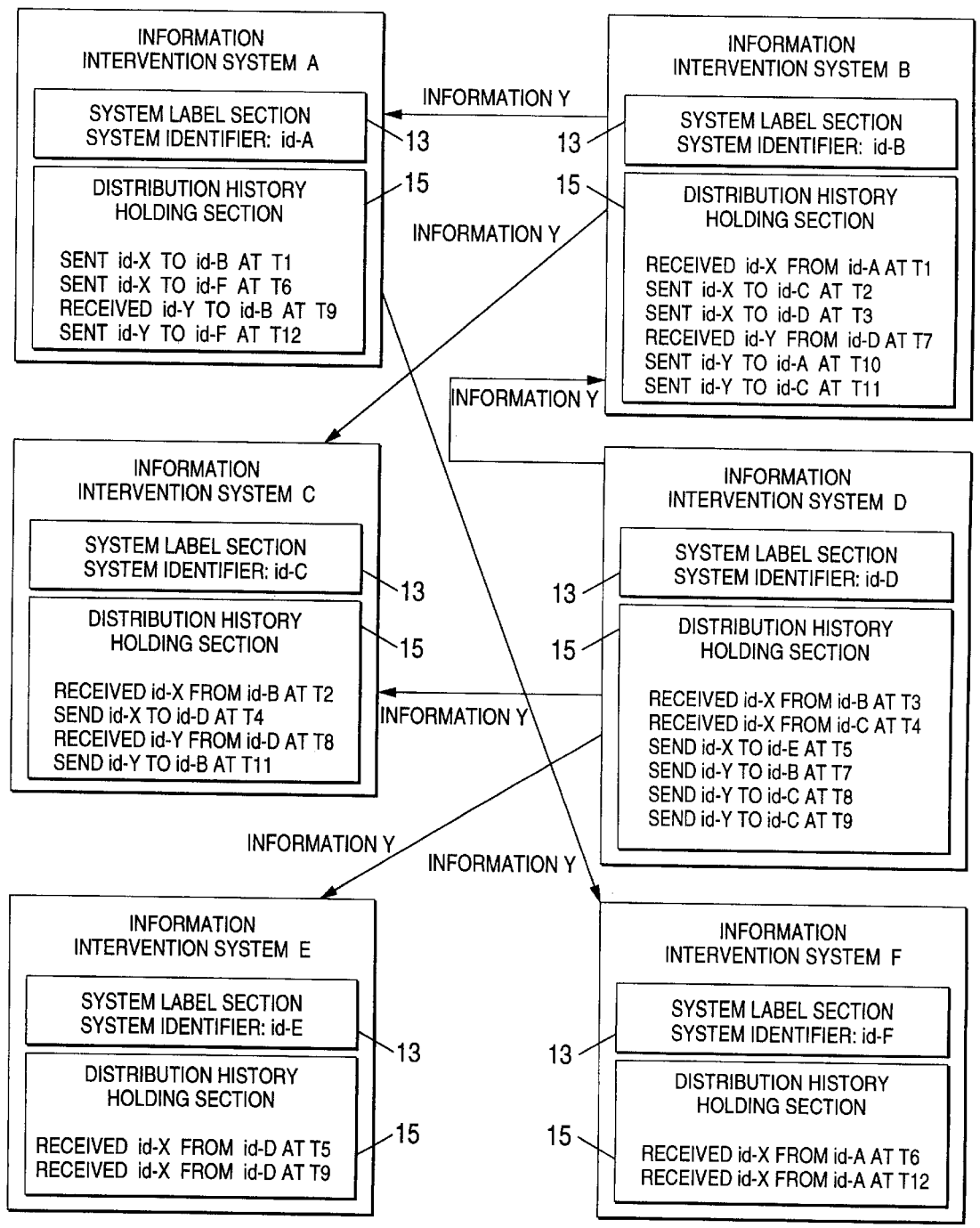
FIG. 61 is an illustration to show an example of the contents of the distribution history holding sections of the information mediation systems at the completion of the follow-up processing of the information Y in "both direction" in the tenth embodiment of the information processing system of the invention.

FIG. 61 is an illustration to show an example of the contents of the distribution history holding sections of the information intervention systems at the completion of the follow-up processing of the information Y in "both direction" in the tenth embodiment of the information processing system of the invention. It also shows only the system label sections 13 and the distribution history holding sections 15 as the components of the information intervention systems. From the state shown in FIG. 60, the information intervention systems A, C, and E perform reception processing of-the information Y having the information identifier id-Y and store a reception history (or histories) of the information Y in their respective distribution history holding sections. Since the information intervention system C receives the distribution of the information Y from the information intervention systems B and D, two reception histories are stored in the distribution history holding section 15 of the information intervention system C. The information Y having the information identifier id-Y is distributed to the information intervention system F by performing follow-up processing of the information Y having the information identifier id-Y in the information intervention system A, in association with which a transmission history is stored in the distribution history holding section 15 of the information intervention system A and a reception history is stored in the distribution history holding section 15 of the information intervention system F.

Figure 62:
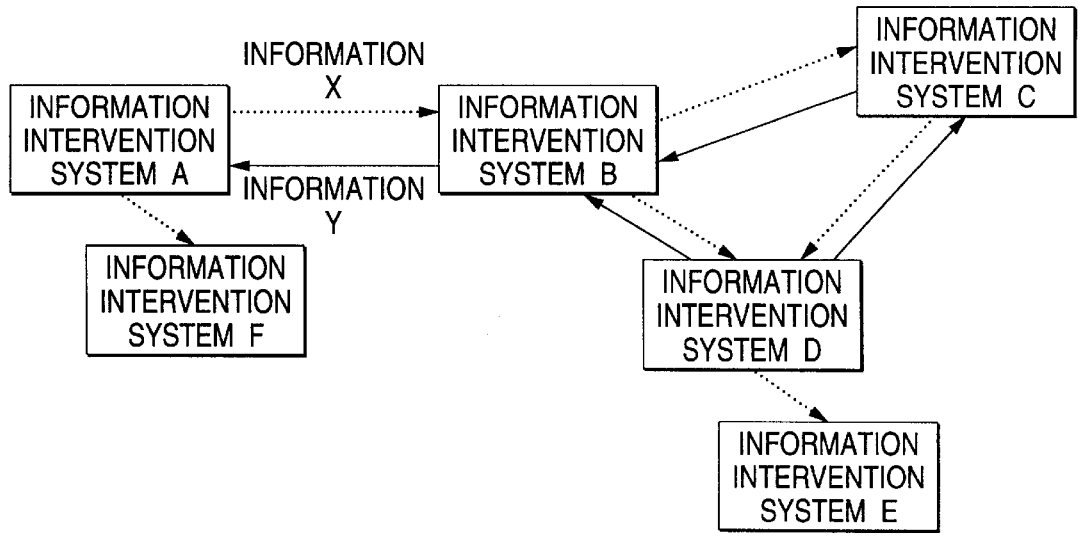
FIG. 62 is an illustration to show an example of information flows after the follow-up-distribution in "both directions" in the tenth embodiment of the information processing system of the invention.

The follow-up information Y can be thus distributed following the information X on the routes from the information intervention system D in "both directions" of the distribution of the information X. FIG. 62 is an illustration to show an example of information flows after the follow-up distribution in "both directions" in the tenth embodiment of the information processing system of the invention. In FIG. 62, the dotted line denotes a flow of the information X and the solid line denotes a flow of the follow-up information Y following the information X in "both directions" from the information intervention system D. As shown here, the information Y follows the information X along the routes in both the directions of the distribution of the information X and is distributed to all the information intervention systems to which the information X was distributed. The contents shown in FIG. 61 are stored in the distribution history holding sections 15 of the information intervention systems by executing the follow-up distribution.

The checking mechanism for duplicate distribution described in the tenth embodiment of the invention may be unable to prevent some information intervention systems from distributing follow-up information to each other depending on the processing timing in each information intervention system particularly when the following direction is "both directions."However, once the information intervention systems distribute the follow-up information to each other, the duplicate distribution terminates and a duplicate distribution loop is not made.

Other duplicate duplication checking mechanisms than the one discussed here are also possible. For example, when follow-up information is distributed, the distribution history holding section 15 of the information intervention system to which the follow-up information is to be distributed is checked to see if the information to be distributed has been already distributed. Thus, any other method may be used to check for duplicate distribution.

Next, an eleventh embodiment of the information processing system capable of tracing distribution information of an information distribution route, distribution range, distribution amount, etc. of the invention will be discussed. In the ninth and tenth embodiments, we have discussed how to distribute information so as to follow already distributed information. However, in the embodiments, the follow-up information simply follows the followed information and the user of each information intervention system may not see whether the information distributed following any other information is newly distributed information or information distributed following any other information. Then, when follow-up information is distributed to each information intervention system and a distribution sensing section 14 of the information intervention system senses the distribution, a mechanism may inform the user that the follow-up information has been distributed; such a mechanism can also be added to each information intervention system.

After follow-up distribution processing of follow-up information following information once terminates, the user of one information intervention system can also distribute the followed information additionally. In such a case, the follow-up information cannot additionally follow the followed information. For example, assume that the followed information is a software product containing bugs and that the follow-up information is a patch program for correcting the bugs. Although the creator of the patch program distributes the patch program for correcting the bugs following the original software product, if one user again distributes only the software product containing bugs without the patch program after the termination of the follow-up distribution of the patch program, the software product will again spread. To avoid such an accident, each information intervention system can also be provided with a function for automatically merging follow-up information and followed information or replacing the followed information with the follow-up information when the follow-up information catches up with the followed information. The eleventh embodiment of the invention discussed here has a mechanism for automatically merging follow-up information and followed information when the follow-up information catches up with the followed information.

Figure 63:
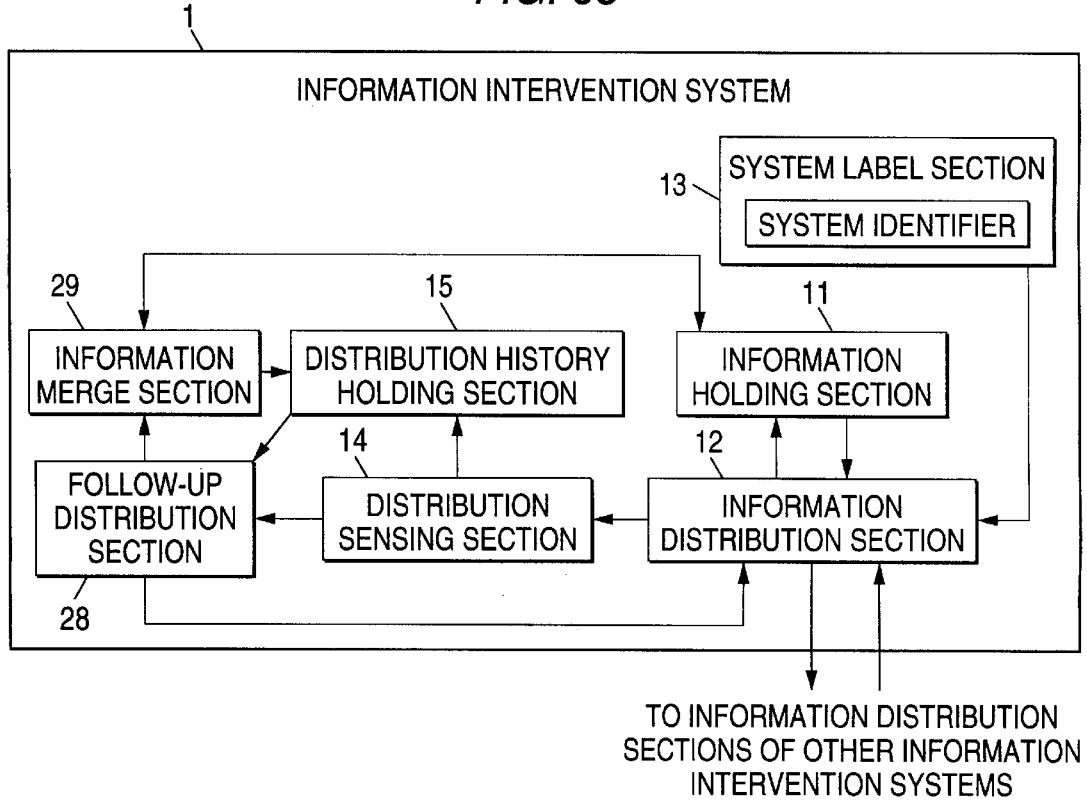
FIG. 63 is a block diagram to show an eleventh embodiment of the information processing system of the invention.

FIG. 63 is a block diagram to show an eleventh embodiment of the information processing system of the invention. Sections identical with or similar to those previously described with reference to FIG. 39 are denoted by the same reference numerals in FIG. 63 and will not be discussed again. In FIG. 63, numeral 29 is an information merge section. After a follow-up distribution section 28 completes follow-up distribution processing in response to a notification (request) from a distribution sensing section 14, the information merge section 29 reads followed information from an information holding section 11 and automatically merges follow-up information and the followed information.

The operation in the eleventh embodiment of the information processing system of the invention will be outlined. The operation outline in the eleventh embodiment is similar to that in the tenth embodiment. Information distribution and reception processes are the same as those shown in FIGS. 41 and 52 respectively.

Figure 64:
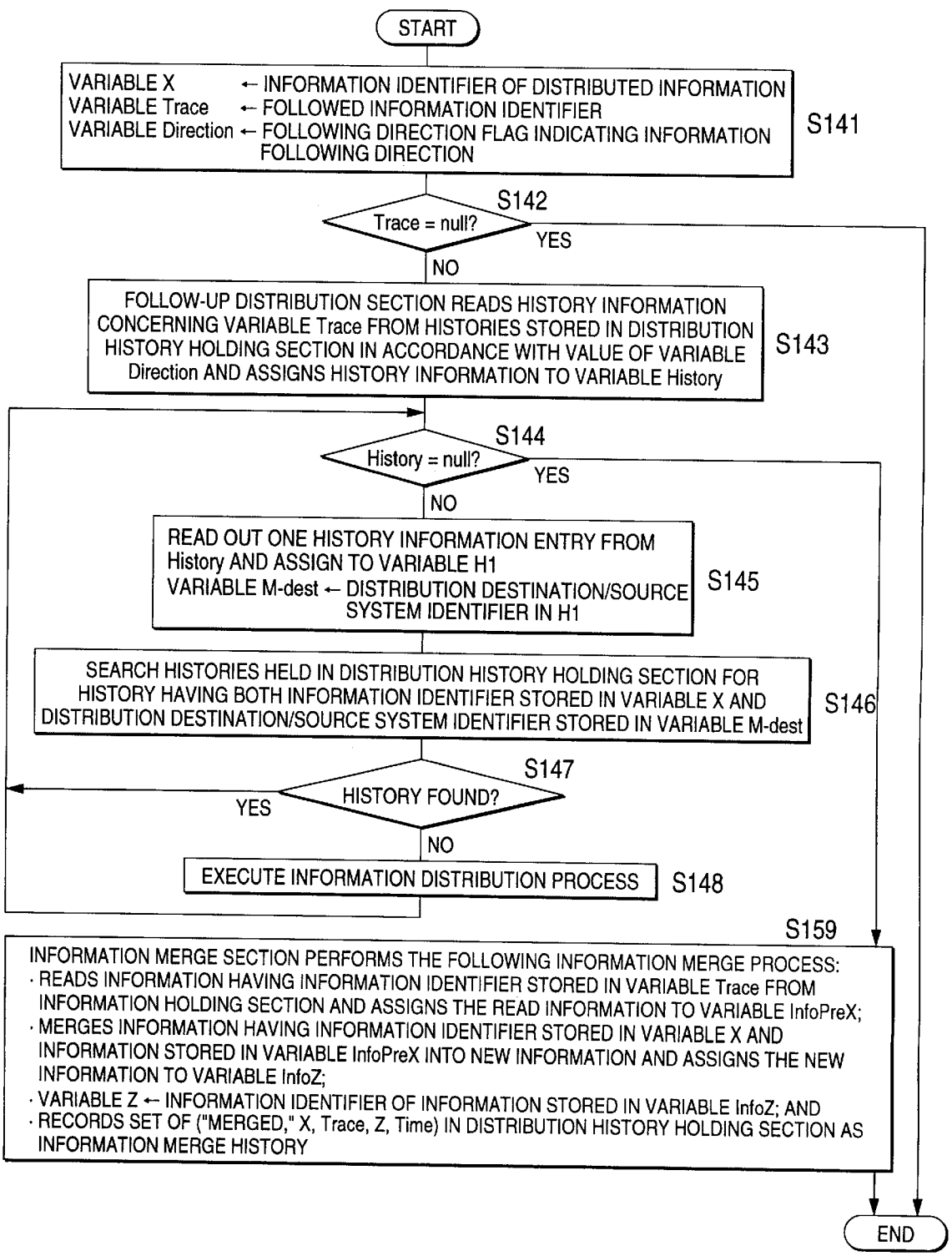
FIG. 64 is a flowchart to show an example of a follow-up distribution process of information in the eleventh embodiment of the information processing system of the invention.

FIG. 64 is a flowchart to show an example of a follow-up distribution process of information in the eleventh embodiment of the information processing system of the invention. Steps identical with those previously described with reference to FIG. 53 are denoted by the same reference numerals in FIG. 64 and will not be discussed again. In the flowchart shown in FIG. 64, an information merge process shown as step S159 is inserted following step S148 in FIG. 53.

Before control shifts to step S159, a history related to followed information is read out in accordance with the following direction based on the history information stored in a distribution history holding section 15 and follow-up information is distributed based on the read history. If more than one history related to the followed information is read out, a follow-up distribution process is executed for each of the histories. At this time, if the follow-up information is already distributed, distribution of the follow-up information is suppressed.

At step S159, the information merge section 29 performs the following information merge process: First, it reads information having the information identifier stored in variable Trace from the information holding section 11 and assigns the information to variable InfoPreX. Then, the information merge section 29 merges information having the information identifier stored in variable X and the information stored in the variable InfoPreX into new information and assigns the new information to variable InfoZ and stores the information in the information holding section 11. Also, it assigns the information identifier of the information stored in the variable InfoZ to variable Z and records a set of ("merged," variable X, variable Trace, Variable Z, variable Time) in the distribution history holding section 15 as an information merge history where ("merged," variable X, variable Trace, Variable Z, variable Time) is a merge history indicating that the information having the information identifier X and the information having the information identifier Trace were merged into information having the information identifier Z at the time Time.

An example of the operation in the eleventh embodiment of the information processing system of the invention will be discussed specifically. In the eleventh embodiment like the tenth embodiment, assume that after distribution of information X having information identifier id-X on routes as shown in FIG. 20, an instruction for distributing information Y following the distribution of the information X in the "reverse direction" to how the information X was distributed is given in information intervention system D.

Information distribution processing is the same as that in the tenth embodiment. At the termination of the distribution, the contents of the distribution history holding sections 15 of the information intervention systems are as shown in FIG. 54. When an instruction for distributing information Y following the distribution of the information X in the "reverse direction" to how the information X was distributed is given in the information intervention system D, the follow-up distribution section 28 of the information intervention system D executes the follow-up distribution process shown in FIG. 64 as in the tenth embodiment. Last, the information merge section 29 executes an information merge process at step S159.

At step S141 in FIG. 64, the followed information identifier id-X is stored in the variable Trace and the information identifier id-Y of the distributed information is stored in the variable X. Control goes to step S143 from step S142 and steps S144–S148 are repeated twice for transmitting the follow-up information to the information intervention systems B and C. Control goes to step S159 through step S144.

At step S159, the information merge-section 29 of the information intervention system D reads the information X having the information identifier id-X stored in the variable Trace from the information holding section 11 and assigns the information X to the variable InfoPreX. Next, it merges the information having the information identifier id-Y stored in the variable X and the information X stored in the variable InfoPreX into new information and assigns the new information to the variable InfoZ and stores the information in the information holding section 11. In this example, the new information is called information M, which has id-M as its information identifier. To "merge" mentioned here is to create new information having the two types of original information intact and assign a new information identifier to the new information.

Figure 65:
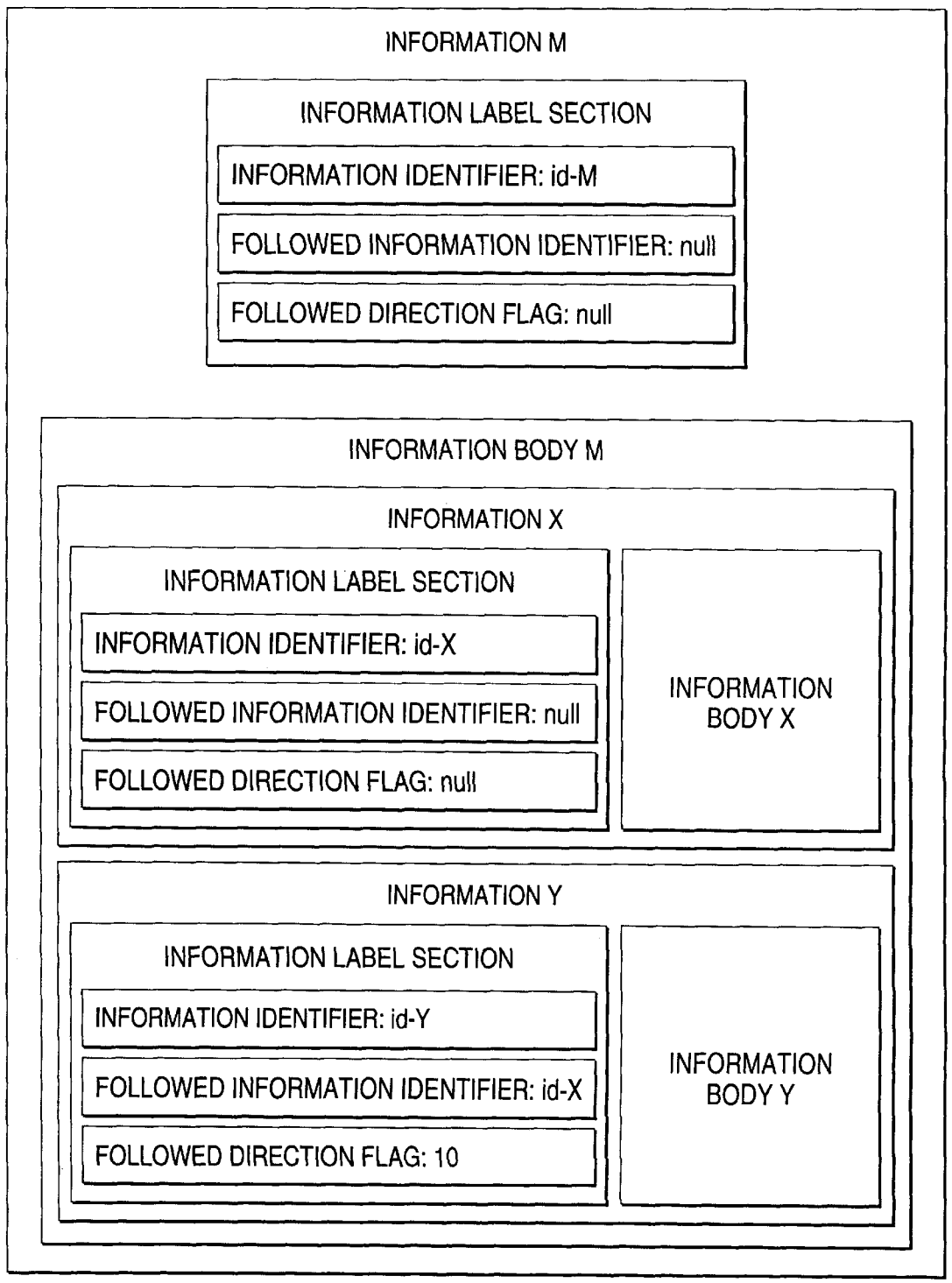
FIG. 65 is an illustration to show an example of the format of information into which two types of information are merged in the eleventh embodiment of the information processing system of the invention.

FIG. 65 is an illustration to show an example of the format of information into which two types of information are merged in the eleventh embodiment of the information processing system of the invention. It shows an example of the new information M into which the information X and the information Y are merged. The information M has a main body storing the information X and the information Y merged into the information M and an information label section storing the information identifier id-M of the information M, etc.

At step S159 in FIG. 64, further the information merge section 29 of the information intervention system D assigns the information identifier id-M of-the information M prepared by the merging as described above to the variable Z and records a set of ("merged," information identifier id-X, information identifier id-Y, information identifier id-Z of information provided by merging, Time) in the distribution history holding section 15 as a merge history of the information.

Figure 66:
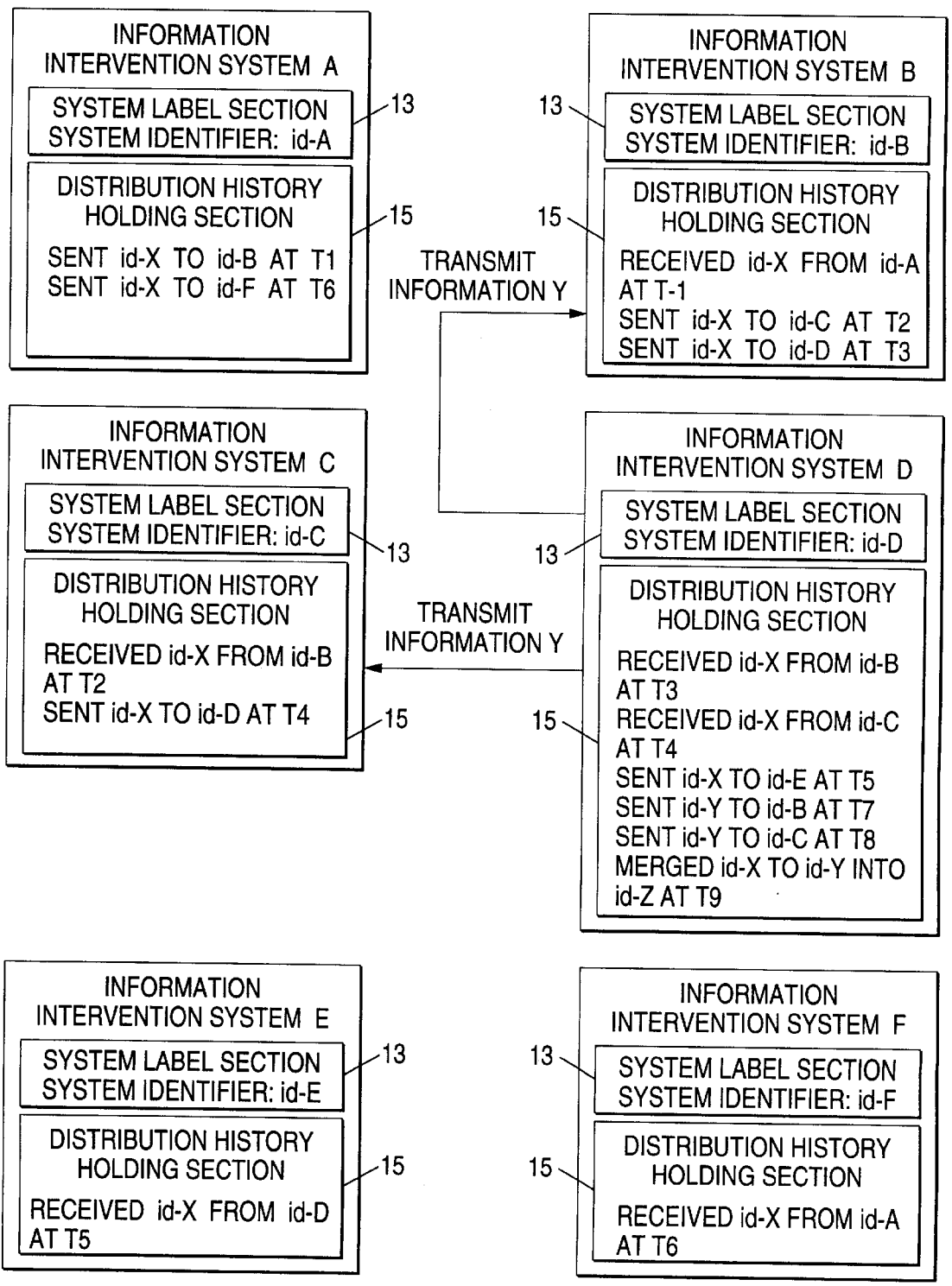
FIG. 66 is an illustration to show an example of the contents of distribution history holding sections of information mediation systems at the completion of follow-up processing of information Y and merge processing in information mediation system D in the eleventh embodiment of the information processing system of the invention.

FIG. 66 is an illustration to show an example of the contents of the distribution history holding sections of the information intervention systems at the completion of the follow-up processing of the information Y and the merge processing in the information intervention system D in the eleventh embodiment of the information processing system of the invention. The follow-up information Y is sent to the information intervention systems B and C by performing the follow-up processing in the information intervention system D and two transmission histories are stored in the distribution history holding section 15 of the information intervention system D. By performing the subsequent merge processing, the followed information X and the follow-up information Y are merged in the information intervention system D and the following merge history merged id-X and id-Y into id-Z at T9 is stored in the distribution history holding section 15 of the information intervention system D. This merge history means that the information X having the information identifier id-X and the information Y having the information identifier id-Y were merged into the information M having the information identifier id-M at the time T9. The follow-up distribution process and merge process in the information intervention system D are now complete.

The processing described above is also performed in each information intervention system to which the follow-up information has been distributed, whereby the follow-up information is distributed following the followed information as in the tenth embodiment and each time the follow-up information catches up with the followed information, they are merged into new information.

Here, we have discussed the information merge example. However, fusion or replacement can also be executed for the purpose of the eleventh embodiment. To merge means to merge the original information into information containing the original information intact, for example, as shown in FIG. 65; the information M is the merge result. The fusion means preparation of new information into which the information main bodies of two types of information are fused, in which case the original information is lost. The replacement means replacing the followed information with the follow-up information, in which case the followed information is deleted and only the follow-up information is left. They can be easily carried out by changing the information merge process executed by the information merge section 29.

The merge process contents in the information merge section 29 can also be selected. In this case, a merge process type is added to the information label section of follow-up information and the information merge section 29 may reference the merge process type and change the process in response to the merge process type. Alternatively, information pointing to a program or the program itself is written as a fusion process and the program may be initiated at the fusion process time, whereby when a patch program is distributed as follow-up information, for example, automatically the patch can be applied to the original program containing bugs as followed information to prepare a correct program.

In the ninth to eleventh embodiments, the system identifiers are used to hold information distribution histories for performing the follow-up distribution processing. For example, as shown in the sixth embodiment, the user identifiers can also be used or both the system and user identifiers may be used. As shown in the seventh and eighth embodiments, information may be distributed with media; if information is distributed with media in the follow-up route, follow-up information can be automatically distributed to the media. When a medium on which follow-up information is stored is loaded into another system and distribution to the system is executed, the follow-up information can be distributed to systems preceding the system.

The ninth to eleventh embodiments do not have history collection/trace channel components. Each of the embodiments can also comprise these components for tracing information distribution. Since the follow-up information is also distributed information, the follow-up state of the follow-up information can also be traced.

The embodiments we have discussed assume that if information is distributed between the information intervention systems, the information identifier of the information is not changed when the information is not modified. However, the invention is not limited to it. The invention can also be embodied so that whenever information is distributed between the information intervention systems, the information identifier of the information is changed and that information having the same information identifier does not exist. In this case, an information identifier change history together with a distribution history may be stored in the distribution history holding section 15.

In the first to eighth embodiments, the three information pieces of time, a distribution destination/source system identifier, and an information identifier are used as a distribution history and the four information pieces of these three plus history transmission or reception type are used in the ninth and tenth embodiments. However, the history information pieces are not limited to them. For example, if the time information is not required, the time need not be recorded. Both system and user identifiers may be recorded to trace a detailed distribution route as to information was distributed from what user of which information intervention system to what user of which information intervention system.

Further, in the embodiments we have discussed, distribution histories are stored in the distribution history holding section 15 of each information intervention system, but the invention is not limited to it. For example, information is provided with a distribution history holding portion apart from the information main body and time information, modification histories, etc., may be stored in the distribution history holding section 15 of the information.

As we have discussed, according to the invention, when information is distributed, a distribution history of the information is recorded and recorded histories are analyzed, whereby the distribution information of the distribution route, distribution range, distribution amount, etc., of the information can be traced later. Not only distribution histories, but also information preparation and user histories are recorded, whereby wider tracing is enabled. The invention can be used to locate information distribution, distribution route, distribution range, etc. Thus, a distributor or distribution route of illegal information can be located, for example. The invention can be used for distribution of every kind of digitalized information including text information, images, voice, and programs.

According to the invention, based on histories recorded when one information item was distributed, another information item can be distributed following that information item, whereby another information item can be distributed to all users receiving distribution of one information item, for example. At this time, the distribution destinations of one information item need not previously be known.

Further, previously distributed information and information distributed following that information can also be merged into new information, thereby preventing the previously distributed information from being again distributed solely.

What is claimed is:

1. An information tracing system comprising:

distribution sensing means for sensing information distribution from a first information tracing system as an information distribution source to a second information tracing system as an information distribution destination;

a plurality of distribution history storing means for storing histories representing an information distribution sensed by said distribution sensing means; and follow-up distribution means for distributing second information after first information is distributed, based on a distribution history of the first information stored in said distribution history storing means, the second information being distributed identically to a distribution of the first information.

2. An information tracing system as claimed in claim 1, further comprising information merge means for merging the second information distributed by said follow-up distribution means and the first information distributed preceding the second information into merged information.

3. An information tracing system as claimed in claim 2, wherein said distributed first or second information contains an information label, which is a label concerning said first or second information, and said distribution history storage means stores said information label as the history related to distribution.

4. An information tracing method comprising the steps of:

sensing a distribution of first information from a first information tracing system as a distribution source to a second information tracing system as a distribution destination;

storing distribution information representing the distribution; and distributing second information different from the first information based on the stored distribution information representing the distribution, the second information receiving a distribution identical to the distribution of the first information.

5. An information tracing system comprising:

distribution sensing means for sensing information distribution from a first information tracing system as an information distribution source to a second information tracing system as an information distribution destination;

distribution history storing means for storing histories representing an information distribution sensed by said distribution sensing means, the histories including at least a destination identifier; and follow-up distribution means for distributing second information after first information based on a distribution history of the first information stored in said distribution history storing means, the second information receiving distribution at least in part identical to a distribution of the first information.

* * * * *